US010595077B2

(12) United States Patent
Thomas et al.

(10) Patent No.: US 10,595,077 B2
(45) Date of Patent: Mar. 17, 2020

(54) USER INTERFACE WITH CONTENT FILTERING AND/OR SOCIAL NETWORKING INTEGRATION

(71) Applicant: Time Warner Cable Enterprises LLC, New York, NY (US)

(72) Inventors: Jay Thomas, Denver, CO (US); Fee Chin, Lafayette, CO (US); James Kasanin, Mamaroneck, NY (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

(21) Appl. No.: 14/797,094

(22) Filed: Jul. 11, 2015

(65) Prior Publication Data

US 2016/0066021 A1   Mar. 3, 2016

Related U.S. Application Data

(60) Provisional application No. 62/041,834, filed on Aug. 26, 2014, provisional application No. 62/069,127, filed on Oct. 27, 2014.

(51) Int. Cl.
*H04N 21/431* (2011.01)
*H04N 21/61* (2011.01)
(Continued)

(52) U.S. Cl.
CPC ....... *H04N 21/4312* (2013.01); *A63F 13/335* (2014.09); *A63F 13/533* (2014.09); *A63F 13/795* (2014.09); *H04L 67/22* (2013.01); *H04N 21/2187* (2013.01); *H04N 21/25866* (2013.01); *H04N 21/4781* (2013.01);
(Continued)

(58) Field of Classification Search
CPC .... A63F 13/335; A63F 13/338; A63F 13/533; A63F 13/795; H04L 67/22; H04N 21/2187; H04N 21/25866; H04N 21/4312; H04N 21/47202; H04N 21/4781; H04N 21/4788; H04N 21/482; H04N 21/6125
See application file for complete search history.

(56) References Cited

U.S. PATENT DOCUMENTS 6,999,083 B2   2/2006   Wong et al.
7,792,963 B2   9/2010   Gould
(Continued)

OTHER PUBLICATIONS

Blink's Guide to Metro Design. Downloaded from https://web.archive.org/web/20130927104234/http://www.blinkux.com/metro/ on Jul. 11, 2015, p. 1 dated Sep. 27, 2013 I.
(Continued)

*Primary Examiner* — Rong Le
(74) *Attorney, Agent, or Firm* — Otterstedt, Wallace & Kammer, LLP

(57) ABSTRACT

On a device with an internet protocol network connection, an application is provided that allows a user to watch internet protocol television on the device. While the user is watching a first live internet protocol television program via the application on the device, an accurate current list of second through Nth live internet protocol television programs that are available to be watched by the user is displayed. The device could include, for example, a gaming console, a media streamer, or the like.

6 Claims, 43 Drawing Sheets

(51) Int. Cl.

| | |
|---|---|
| *H04N 21/4788* | (2011.01) |
| *H04N 21/2187* | (2011.01) |
| *A63F 13/533* | (2014.01) |
| *H04N 21/258* | (2011.01) |
| *H04N 21/472* | (2011.01) |
| *H04N 21/482* | (2011.01) |
| *A63F 13/30* | (2014.01) |
| *G06F 3/0482* | (2013.01) |
| *H04L 29/08* | (2006.01) |
| *H04N 21/478* | (2011.01) |
| *A63F 13/795* | (2014.01) |
| *A63F 13/335* | (2014.01) |
| *A63F 13/338* | (2014.01) |

(52) U.S. Cl.
CPC ... *H04N 21/4788* (2013.01); *H04N 21/47202* (2013.01); *H04N 21/482* (2013.01); *H04N 21/6125* (2013.01); *A63F 13/338* (2014.09)

(56) References Cited

U.S. PATENT DOCUMENTS

| | | | |
|---|---|---|---|
| 2002/0120925 A1* | 8/2002 | Logan | A23L 2/52 725/9 |
| 2006/0121989 A1* | 6/2006 | O'Kelley, II | A63F 13/10 463/42 |
| 2006/0130107 A1 | 6/2006 | Gonder et al. | |
| 2007/0217436 A1 | 9/2007 | Markley et al. | |
| 2009/0248794 A1 | 10/2009 | Helms | |
| 2010/0058402 A1 | 3/2010 | Hasek | |
| 2010/0313236 A1 | 12/2010 | Straub | |
| 2014/0214920 A1* | 7/2014 | Wong | H04N 21/47202 709/203 |
| 2014/0282772 A1 | 9/2014 | Chen et al. | |
| 2015/0189388 A1 | 7/2015 | Devassykutty et al. | |

OTHER PUBLICATIONS

Developing Games for Xbox, Windows, Web, and Windows Phone. Downloaded from http://www.xbox.com/en-US/developers on Jul. 10, 2014. pp. 1-2.

Wikipedia, IPTV. Downloaded from http://en.wikipedia.org/wiki/Iptv on Aug. 14, 2014. pp. 1-15.

Microsoft's Xbox Live TV implementation powered by Silverlight. Downloaded from http://www.winrumors.com/microsofts-xbox-live-tv-implementation-powered-by-silverlight/ on Jul. 10, 2014. pp. 1-6.

My Channels. Downloaded from https://www.timewarnercable.com/en/tv/my-channels.html on Oct. 27, 2014. pp. 1-3.

Wikipedia, Xbox. Downloaded from https://en.wikipedia.org/wiki/Xbox on Aug. 11, 2014. pp. 1-10.

Wikipedia, Xbox 360. Downloaded from https://en.wikipedia.org/wiki/Xbox_360 on Aug. 11, 2014. pp. 1-15.

Wikipedia, Xbox 360 Controller. Downloaded from https://en.wikipedia.org/wiki/Xbox_360_Controller on Aug. 11, 2014. pp. 1-10.

Wikipedia, Xbox Live. Downloaded from https://en.wikipedia.org/wiki/Xbox_Live on Aug. 11, 2014. pp. 1-23.

Jeff Andrews, Nick Baker. Xbox 360 System Architecture. Published by the IEEE Computer Society, Mar.-Apr. 2006. pp. 25-37.

Wikipedia, Roku, Downloaded from https://en.wikipedia.org/wiki/Roku on Jun. 15, 2015, pp. 1-5.

The Escapist : Forums : The News Room : Xbox One Can See, But Not Speak to, Xbox 360 Friends, Posted Aug. 13, 2013, downloaded Sep. 7, 2017 from http://www.escapistmagazine.com/forums/read/7.825195-Xbox-One-Can-See-But-Not-Speak-To-Xbox-360-Friends, pp. 1-7.

Xbox Live—Xbox 360 Wiki Guide—IGN, Last Edit: Mar. 17, 2014, downloaded Sep. 7, 2017 from http://www.ign.com/wikis/xbox-360/Xbox_Live, pp. 1-10.

\* cited by examiner

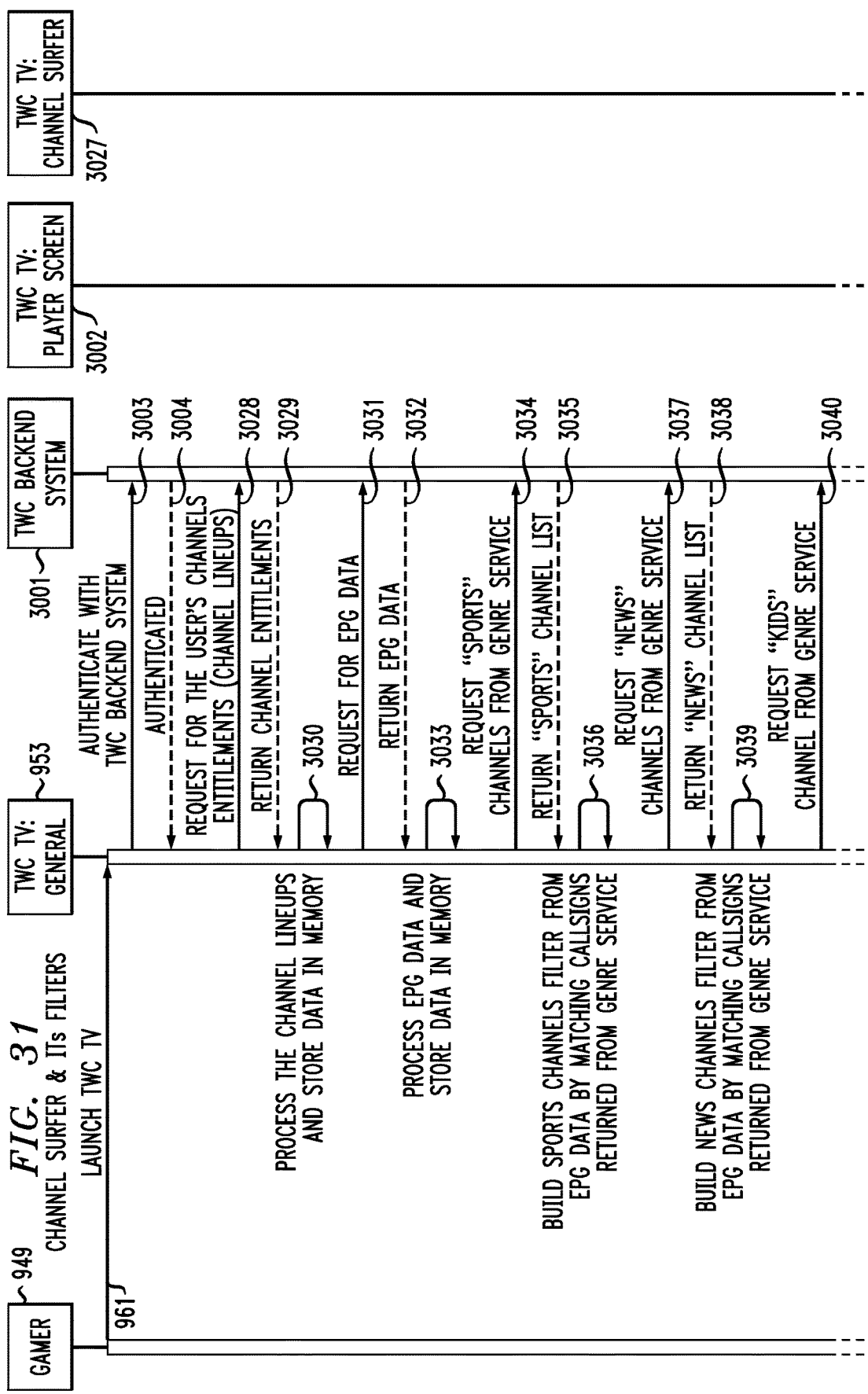

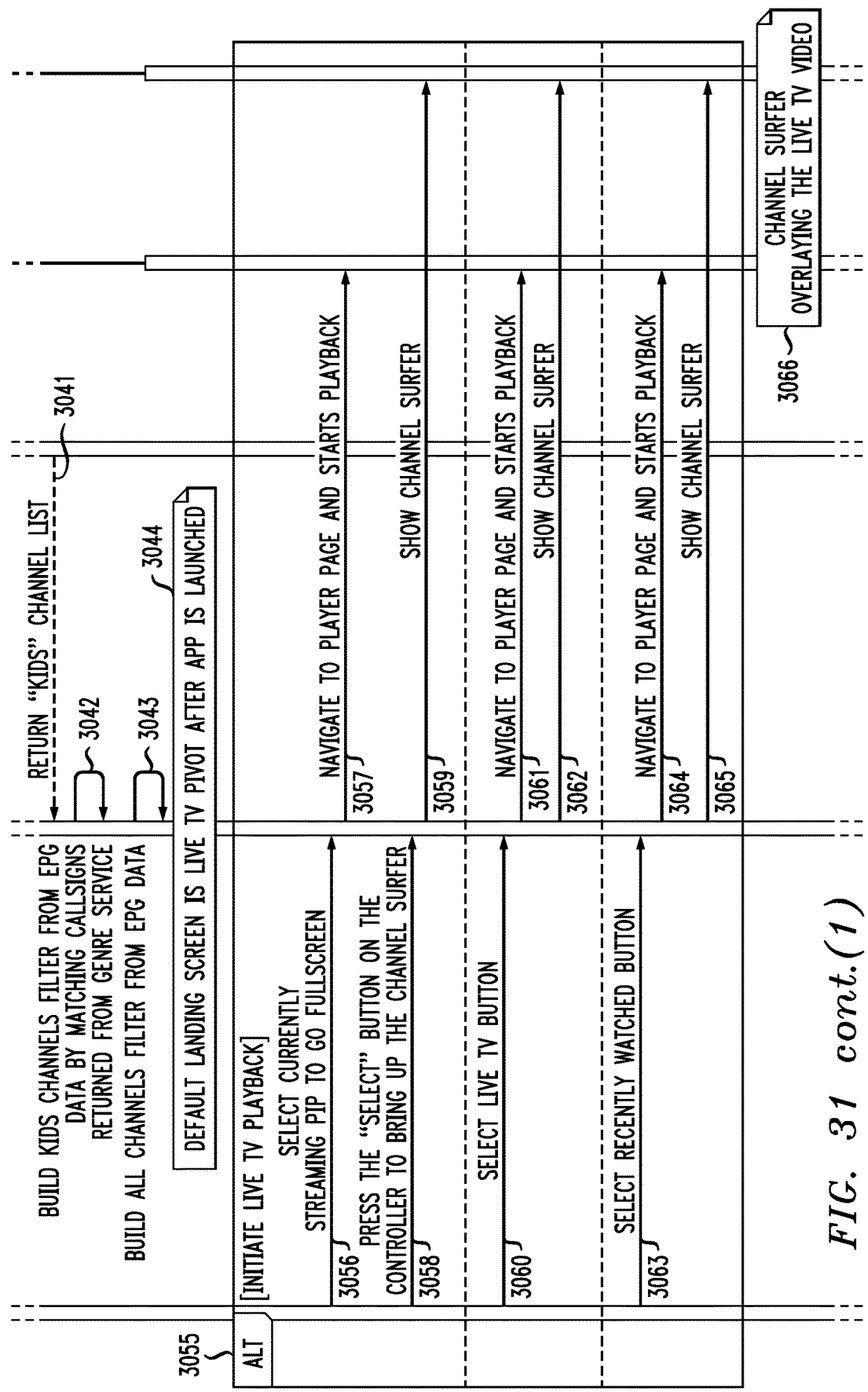
FIG. 31 cont.(1)

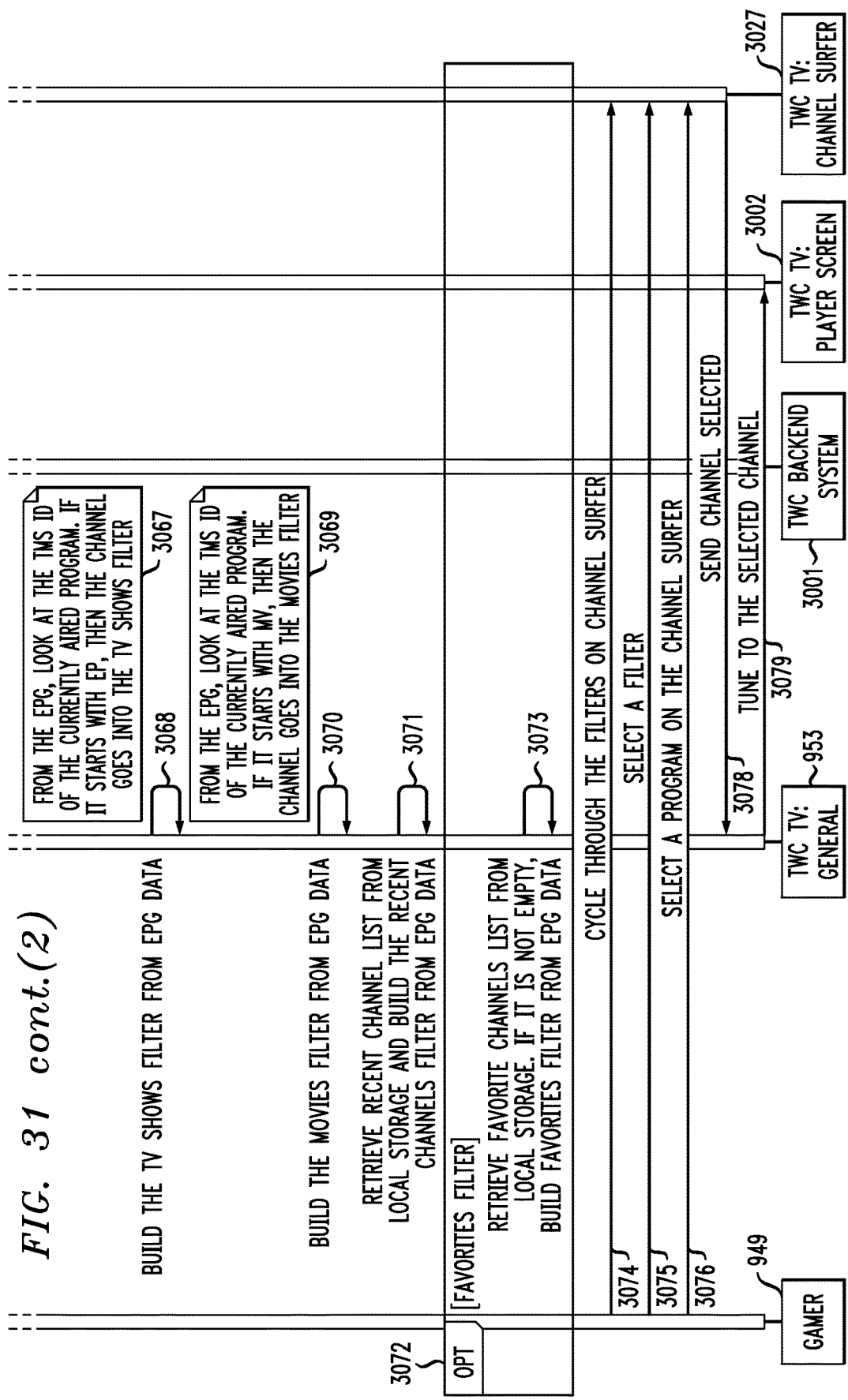

USER INTERFACE WITH CONTENT FILTERING AND/OR SOCIAL NETWORKING INTEGRATION

CROSS-REFERENCE TO RELATED APPLICATION(S)

This application claims the benefit of U.S. Provisional Application Ser. No. 62/041,834, filed on Aug. 26, 2014, the complete disclosure (including appendix) of which is expressly incorporated herein by reference in its entirety for all purposes. This application also claims the benefit of U.S. Provisional Application Ser. No. 62/069,127, filed on Oct. 27, 2014, the complete disclosure (including appendix) of which is also expressly incorporated herein by reference in its entirety for all purposes.

FIELD OF THE INVENTION

The present invention relates generally to content networks, and, more particularly, to accessing content with, e.g., a gaming console, media streamer, or the like.

BACKGROUND OF THE INVENTION

Until fairly recently, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber networks (HFNs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like.

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

In contrast to traditional television service, Internet Protocol television (IPTV) is a system through which television services are delivered using the Internet protocol suite over a packet-switched network such as a LAN or the Internet, instead of being delivered through traditional terrestrial, satellite signal, and cable television formats. IPTV can be delivered over any IP network, including but not limited to a cable network. In most cases, IPTV over a cable network will utilize QAMs dedicated to data transport as distinguished from QAMs allocated for traditional video content delivery (QAM=Quadrature amplitude modulation). IPTV can be consumed at many different devices; one non-limiting example is a gaming console such as the Microsoft Xbox® video game console (registered mark of Microsoft Corporation, Redmond Wash., USA).

SUMMARY OF THE INVENTION

Principles of the present invention provide a user interface with genre selection and/or social networking integration. In one aspect, an exemplary method includes the steps of providing, on a device with an internet protocol network connection, an application that allows a user to watch internet protocol television on the device; obtaining, by the application, from an online gaming service, a list of friends of the user; and displaying, to the user, via the device, current activities of at least a subset of the friends who are currently online with the online gaming service.

In another aspect, another exemplary method includes the steps of providing, on a device with an internet protocol network connection, an application that allows a user to watch internet protocol television on the device; and displaying, by the application, while the user is watching a first live internet protocol television program via the application on the device, an accurate current list of second through $N^{th}$ live internet protocol television programs that are available to be watched by the user.

In still another aspect, another exemplary method includes the steps of providing, on a device with an internet protocol network connection, an application that allows a user to watch internet protocol television on the device; and displaying, by the application, while the user is watching a first video-on-demand internet protocol television program via the application on the device, an accurate current list of a plurality of internet protocol television video-on-demand programs that are available to be watched by the user. The first video-on-demand internet protocol television program is an episode of a series, and the plurality of internet protocol television video-on-demand programs that are available to be watched by the user include additional episodes of the series.

Any two or more of the three methods can be combined.

In an even further aspect, an exemplary device includes an internet protocol network connection; a memory including executable code; and at least one processor, coupled to the memory and the internet protocol network connection. The executable code implements an application that allows a user to watch internet protocol television on the device. The at least one processor is operable to implement any one, some, or all of the method steps described herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., gaming console and/or server) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of:

Ability to browse hundreds of broadcast video channels more efficiently by using content filters;

Ability to see what gaming network (e.g., Xbox Live) friends are watching simultaneously with personal video viewing;

Ability to interact with gaming network (e.g., Xbox Live) friends via chat simultaneously with personal video viewing.

These and other features and advantages of the present invention will become apparent from the following detailed description of illustrative embodiments thereof, which is to be read in connection with the accompanying drawings.

BRIEF DESCRIPTION OF THE DRAWINGS

FIG. 31 is a data flow diagram showing a channel surfer with filtering, on a gaming console, in accordance with aspects of the invention;

DETAILED DESCRIPTION OF PREFERRED EMBODIMENTS

As noted, IP-based data services (and, for that matter, IPTV) may be provided over a variety of networks. Purely by way of example and not limitation, some embodiments will be shown in the context of a cable multi-service operator (MSO) providing data services as well as entertainment services. In one or more embodiments, an MSO provides an application that allows a user to watch IPTV on a game console, media streamer, or similar device; the content watched may or may not be the same as content offered by the MSO over a traditional cable network, and the IPTV may be sent to the game console over cable TV data services or over any other kind of IP network.

Figure 1:
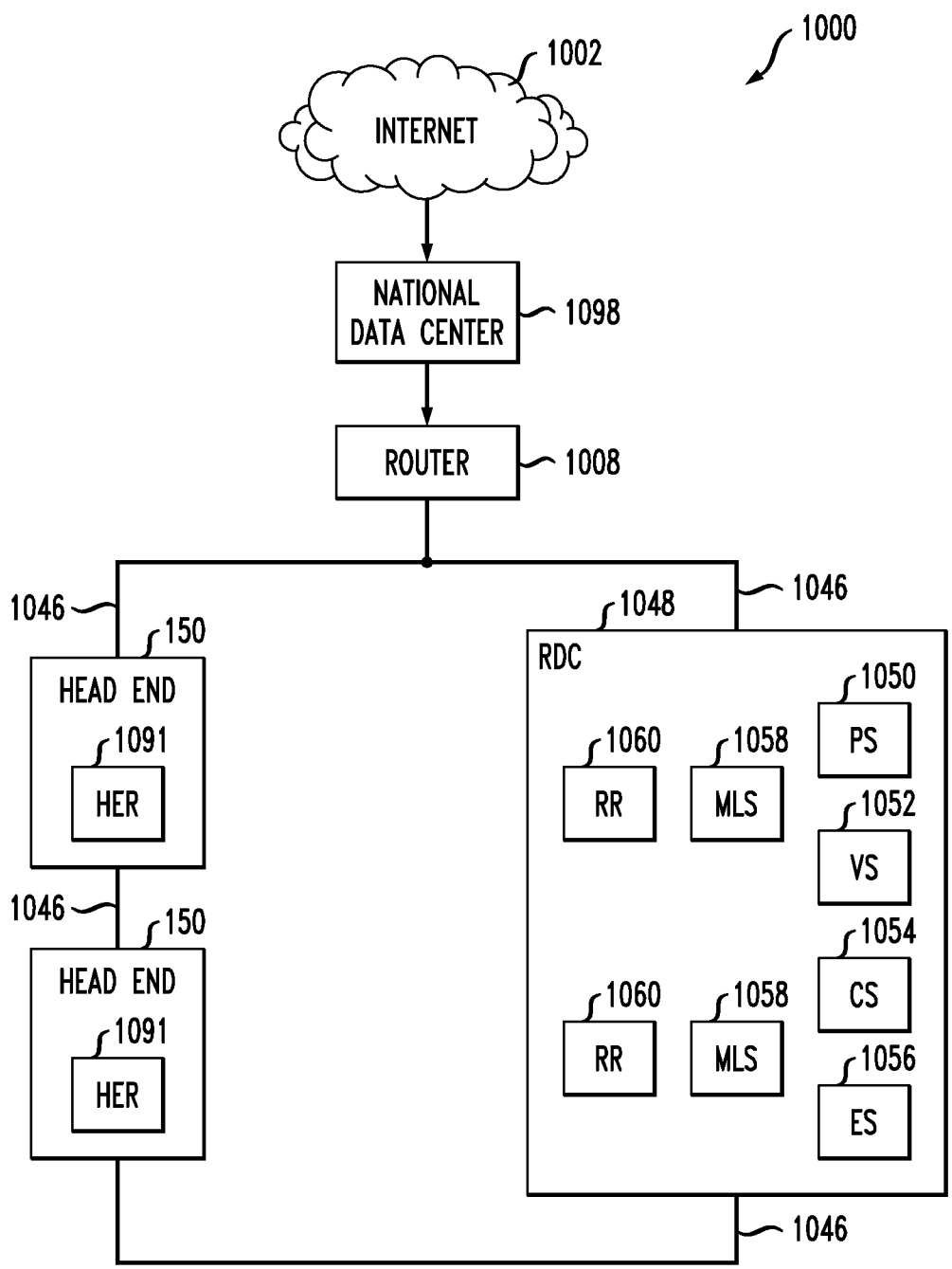
FIG. 1 is a block diagram of an exemplary embodiment of a system, within which one or more aspects of the invention can be implemented.

FIG. 1 shows an exemplary system 1000, according to an aspect of the invention. System 1000 includes a regional data center (RDC) 1048, and one or more divisions, represented by division head ends 150. RDC 1048 and head ends 150 are interconnected by a network 1046; by way of example and not limitation, a dense wavelength division multiplex (DWDM) network. Elements 1048, 150 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head ends 150 may each include a head end router (HER) 1091 which interfaces with network 1046. Head end routers 1091 are omitted from figures below to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends and/or regional data centers. For example, such an NDC might include one or more VOD servers; switched digital video (SDV) functionality; gateways to obtain content (e.g., program content) from various sources including cable feeds and/or satellite; and so on.

Figure 2:
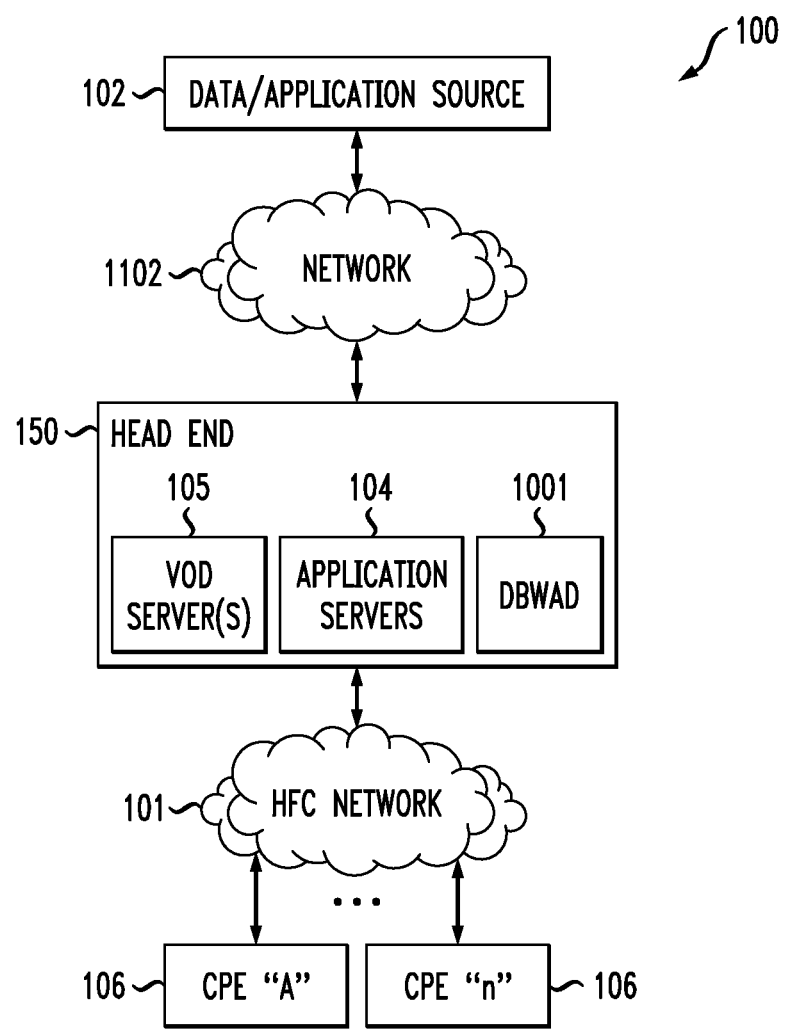
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes and high-speed cable modems for providing high bandwidth Internet access in premises such as homes and businesses.

Also included (for example, in head end 150) is a dynamic bandwidth allocation device (DBWAD) 1001 such as a global session resource manager, which is itself a non-limiting example of a session resource manager.

Figure 3:
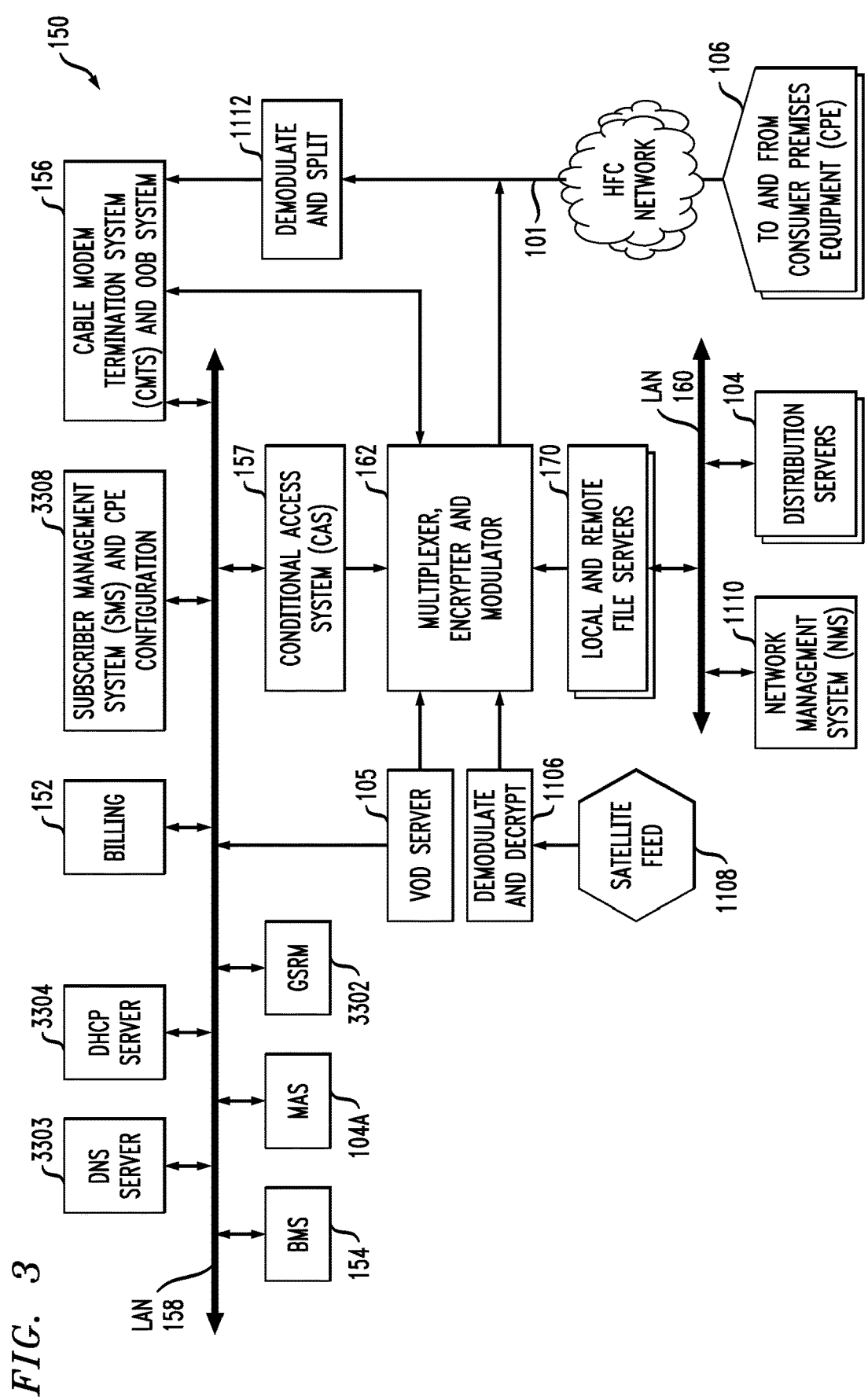
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., traditional audio, traditional (as distinguished from IPTV) video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data (including IPTV) on an HFC system is one non-limiting exemplary context associated with one or more embodiments. However, one or more embodiments are generally applicable to IPTV, regardless of what kind of functionality is employed.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more DHCP server(s) 3304 can also be located where shown or in different locations.

Figure 4:
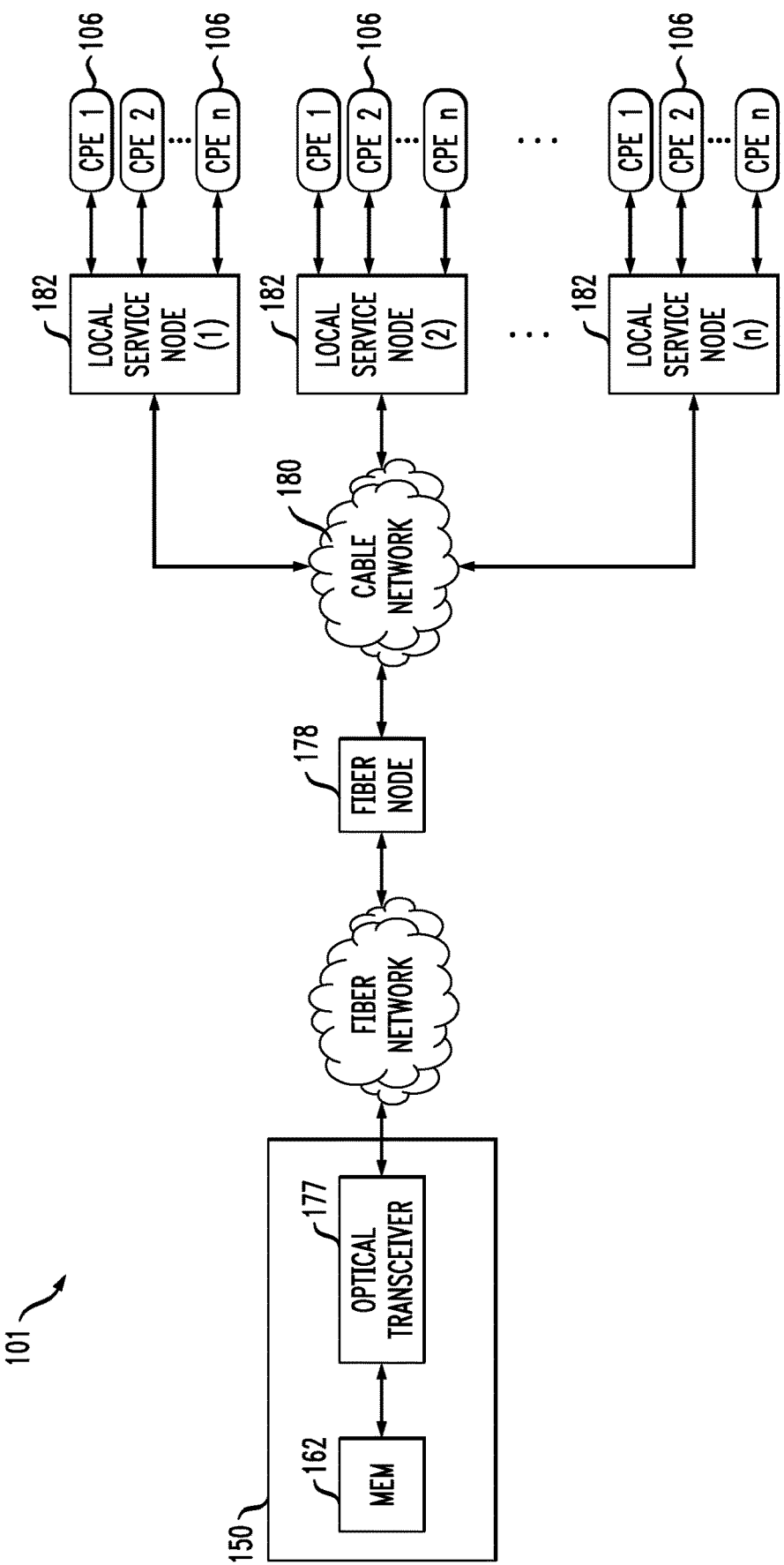
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number of CPE 106 per node 182 may be different than the number of nodes 182.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
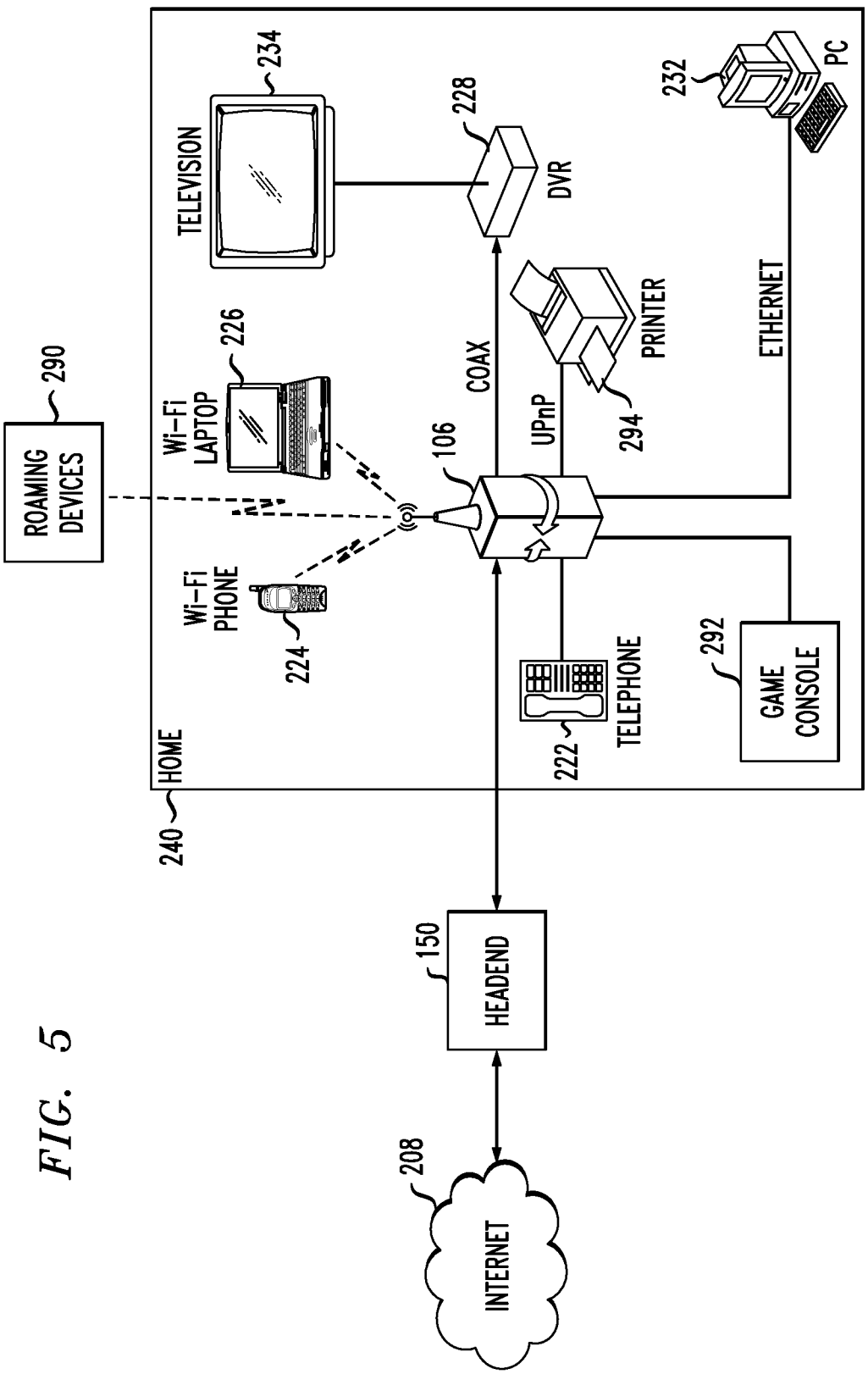
FIG. 5 is a functional block diagram of a premises network, including an exemplary centralized customer premises equipment (CPE) unit, interfacing with a head end such as that of FIG. 3.
Figure 6:
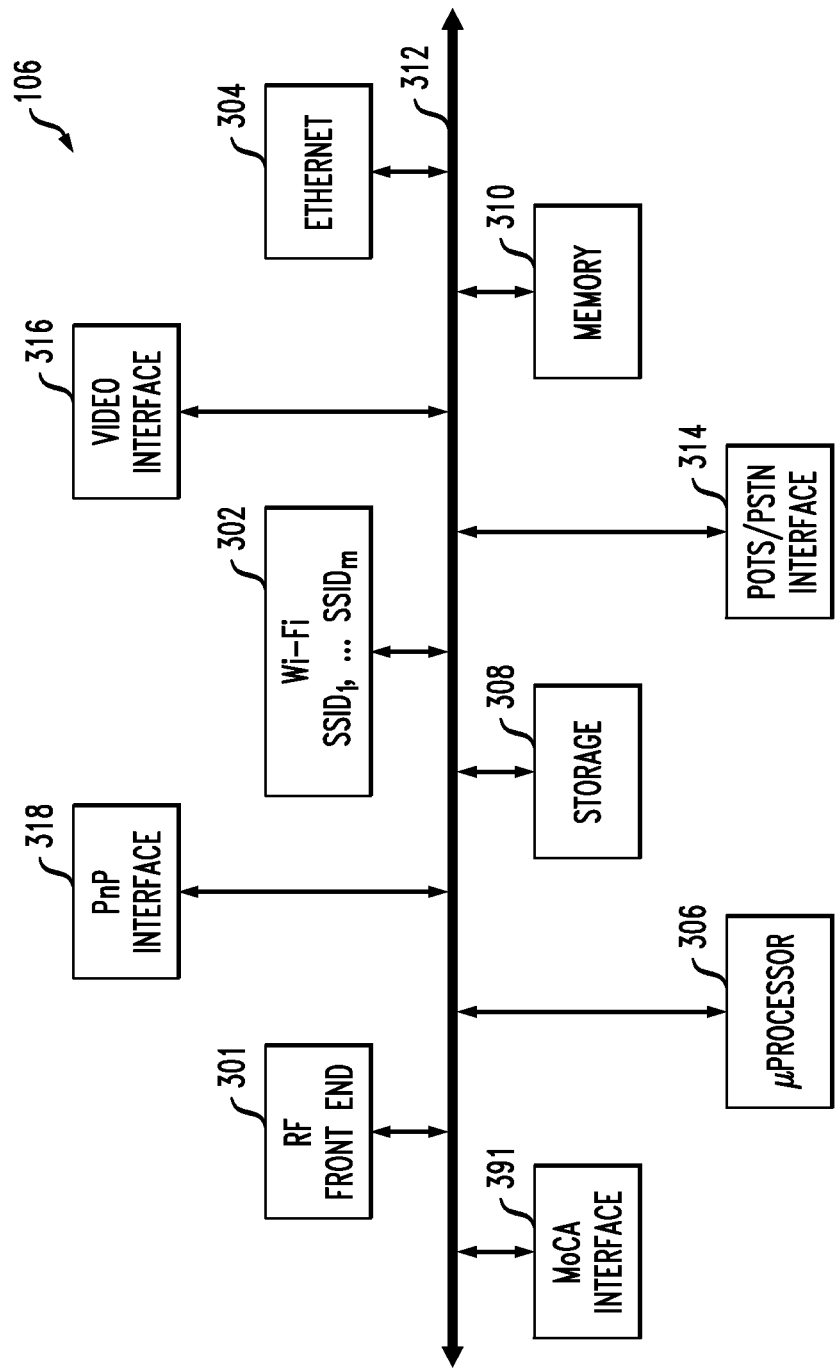
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface. Game console 292 is one example of a game console that could be used to watch IPTV in accordance with aspects of the invention. However, game consoles on which one or more embodiments are to be practiced can be connected to the Internet in many ways; an HFC network providing high-speed IP data in addition to traditional video content is merely one non-limiting exemplary embodiment. Game console 292 could be connected to CPE 106 by, for example, Ethernet, Wi-Fi, or MoCA (e.g. via a MoCA-to-Ethernet bridge). All types of game consoles may not necessarily be capable of connection via all of Ethernet, Wi-Fi, and MoCA. Some embodiments employ a Microsoft Xbox console as game console 292. Furthermore, as noted, other embodiments employ alternative platforms such as the Roku box or other media streamers; the same can be connected to CPE 106 instead of or in addition to gaming console 292.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., IPTV or other Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, the gaming console 292, or other device (e.g., media streamer). CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304, MoCA interface 391, or plug-and-play (PnP) interface 318.

Additionally, the RF front end 301 modulates, encrypts/multiplexes as required, and transmits digital information for receipt by upstream entities such as the CMTS or a network server. This includes upstream commands from Xbox or other game console 292. In one or more embodiments, the Xbox or other game console does not communicate directly with the RF Front End 301; rather, it communicates with the RF Front End 301 over Ethernet 304 or Wi-Fi 302. Upstream commands from the Xbox or other game console 292 are sent to the RF Front End over Ethernet 304 or Wi-Fi 302 and then upstream into the network, from the RF Front End 301, via DOCSIS or the like. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network.

The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

In addition to traditional "broadcast" content (e.g., video programming), the systems of FIGS. 1-6 also deliver Internet data services (including IPTV) using the Internet protocol (IP), although other protocols and transport mechanisms of the type well known in the digital communication art may be substituted. The IP packets are typically transmitted on RF channels that are different that the RF channels used for the broadcast traditional video and audio programming, although this is not a requirement. The CPE 106 are each configured to monitor the particular assigned RF channel (such as via a port or socket ID/address, or other such mechanism) for IP packets intended for the subscriber premises/address that they serve.

Figure 8:
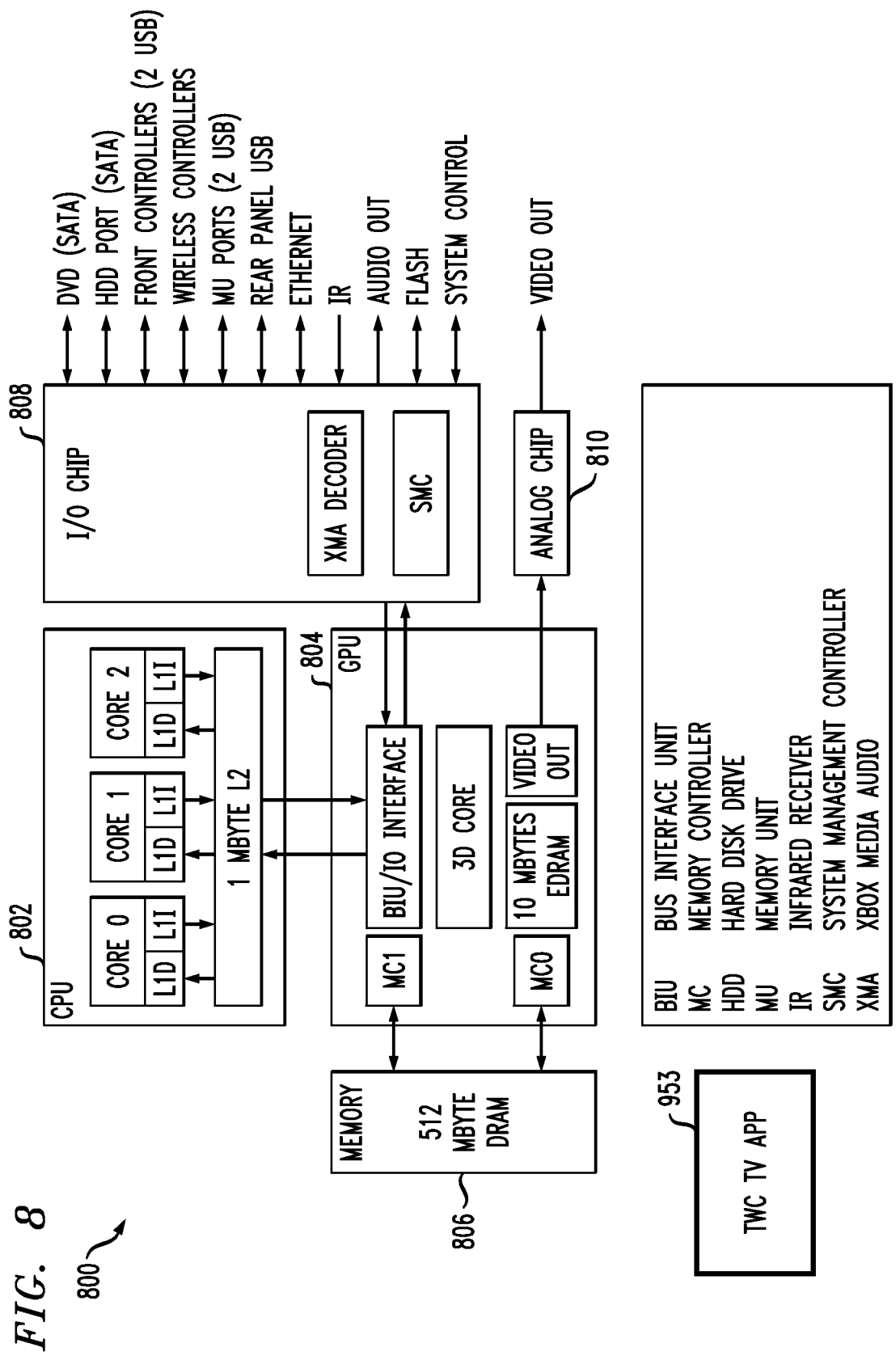
FIG. 8 is a block diagram of a gaming console, with which one or more embodiments of the invention can be practiced, including a software component in accordance with an aspect of the invention.

One or more embodiments provide a gaming console user interface with, e.g., filtering and/or social networking integration (and/or a user interface for a media streamer or similar platform). One non-limiting example of a gaming console is the Microsoft Xbox® (registered mark of Microsoft Corporation, Redmond Wash., USA). FIG. 8 shows a simplified block diagram of an Xbox® gaming console 800 (one example of a gaming console 292). In a non-limiting exemplary embodiment, the Microsoft Xbox® connects to the internet via Ethernet to the cable modem (or via a MoCA-to-Ethernet bridge), or via Wi-Fi. Now continuing, included in console 800 are a central processing unit (CPU) 802, graphics processing unit (GPU) 804, memory 806, and input-output (I/O) (e.g., I/O chip 808, and analog chip 810). Further reference is made to Jeff Andrews and Nick Baker, XBOX 360 SYSTEM ARCHITECTURE, IEEE Micro, March-April 2006, pages 25-37, expressly incorporated herein by reference in its entirety for all purposes. One or more applications will run on console 800. One of these is TWC TV® app 953, which includes functionality in accordance with aspects of the invention (registered mark of Time Warner Inc., New York, N.Y., USA; will be used herein in "all caps" without the "®" symbol for convenience). Xbox® software 2999, discussed below, and not shown in FIG. 8, will also run on console 800. The software applications will be stored in persistent storage such as a hard drive coupled to hard disk drive (HDD) port of I/O chip 808 or other persistent storage, and then loaded into memory 806 (other approaches are possible; e.g., load application(s) as needed from a network location). In one or more embodiments, a console 800 such as the Xbox® does not have a display. It is used with a TV or other monitor connected to the video out port on analog chip 810, for example.

Figure 9:
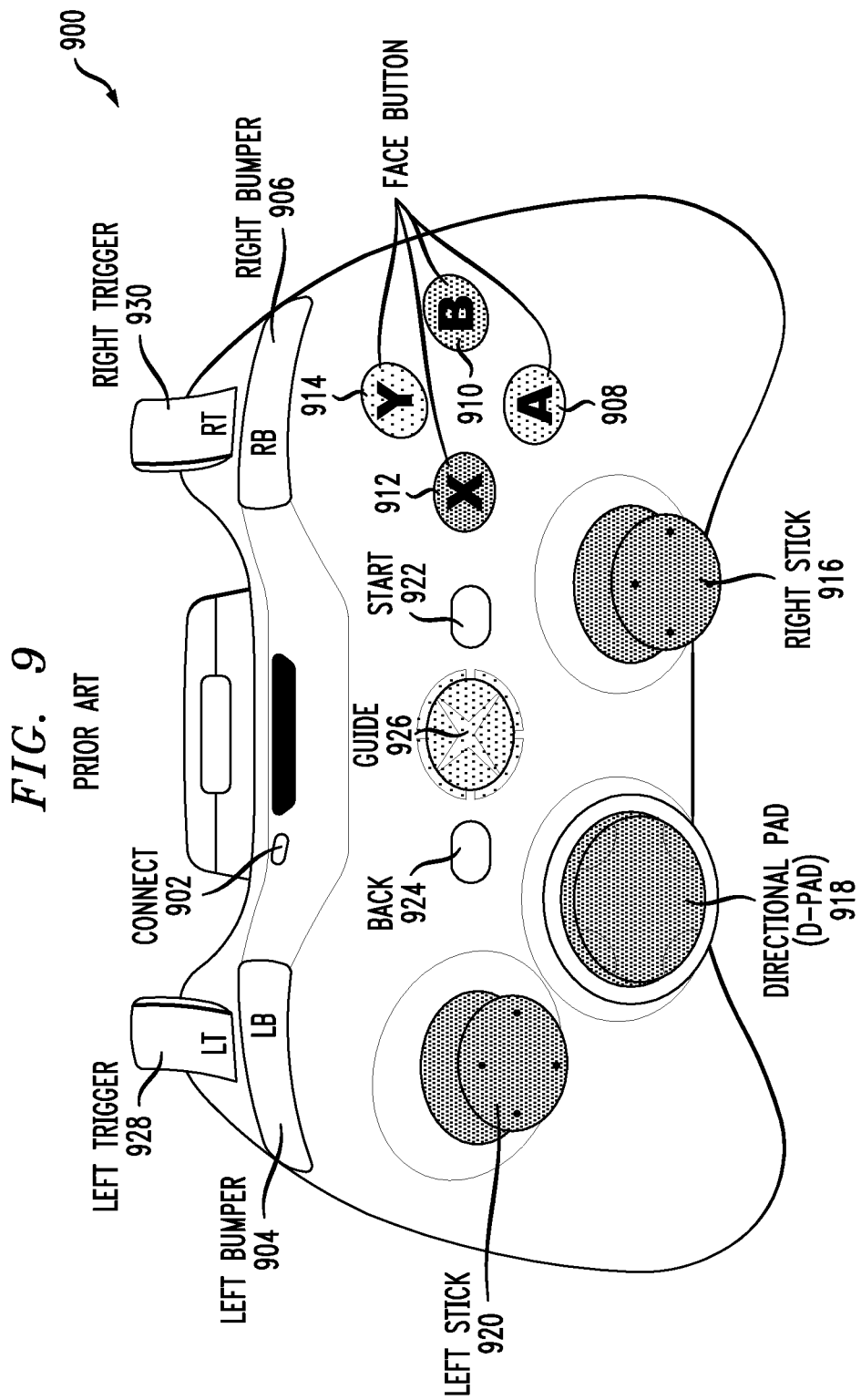
FIG. 9 is a block diagram of a gaming console controller, known in and of itself from the prior art, with which one or more embodiments of the invention can be practiced.

A gamer can control unit 800 with a controller 900 shown in FIG. 9. A standard wired Xbox® 360 controller features eleven digital buttons, two analog triggers, two analog sticks and a digital D-pad. Wireless controllers such as 900 also feature an additional "connect" button 902 located between the "bumpers" 904, 906 to facilitate synchronizing with the console 800. The right face of the controller 900 features four digital actions buttons; a green "A" button 908, red "B" button 910, blue "X" button 912, and yellow "Y" button 914. The lower right houses the right analog stick 916, in lower left is a digital D-pad 918 and on the left face is the left analog stick 920. Both analog sticks can also be "clicked in" to activate a digital button beneath. In the center of the controller face are digital "Start" 922, "Back" 924, and "Guide" 926 buttons. The "Guide" button 926 is labeled with the Xbox® logo, and is used to turn on the console and controller and to access the guide menu. It is also surrounded by the "ring of light," which indicates the controller number, as well as flashing when connecting and to provide notifications. The left and right "shoulders" each feature a digital shoulder button, or "bumper" 904, 906, and an analog trigger (left 928, right 930).

Note that one or more exemplary embodiments are provided within the context of a gaming console; the Xbox 360 and Xbox One are non-limiting examples. However, one or more embodiments can be run on other platforms; e.g., the Roku Streaming Player series of digital media player set-top boxes manufactured by Roku, Inc. of Saratoga, Calif., USA, or other media streamers.

Figure 10:
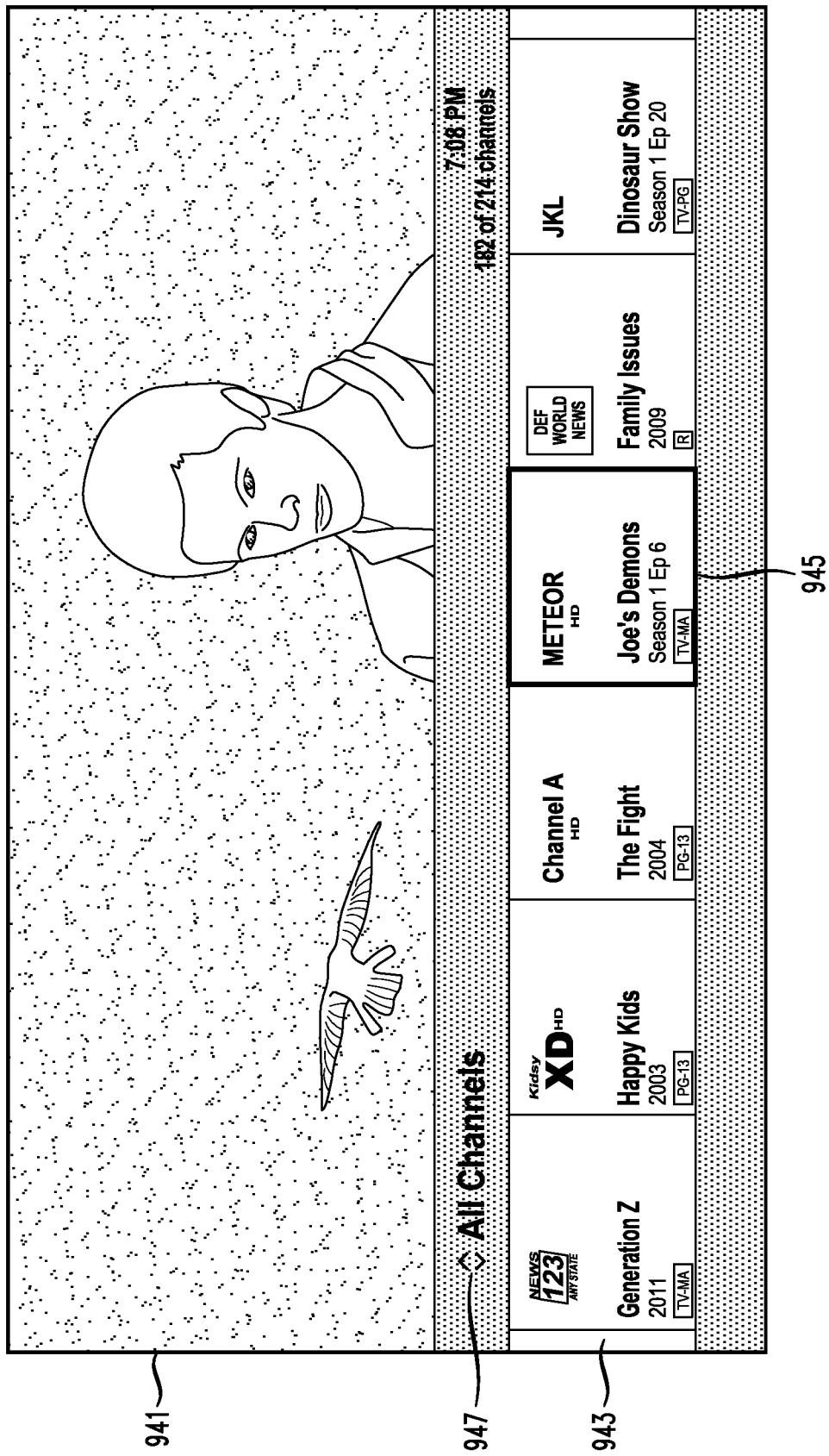
FIGS. 10 and 11 are line drawing versions of screen shots depicting aspects of an exemplary user interface for watching IPTV on a gaming console, in accordance with aspects of the invention.

One or more embodiments provide a gaming console (e.g., Xbox®; again, a gaming console is used throughout as a non-limiting example of a suitable platform) interface with conveniently arranged genre listings (e.g., in a horizontal row at the bottom of the screen). In a non-limiting exemplary embodiment, an MSO or the like provides an application ("app") that can be executed on a console such as 800 to allow for the watching of IPTV via the console. For example, upon invocation, the application may start off at the so-called home pivot (the "home pivot" is the landing pivot during app launch; i.e., the top level menu item, the app's home page, the first screen the user sees when he or she launches the application) with a PIP (picture in picture) video window showing the last tuned channel, and with appropriate art corresponding to the show airing on that last tuned channel. Suppose the show "Joe's Demons" was airing live on the "METEOR" channel. Assume that show was selected, and that a channel surfer function was invoked. The result is seen in FIG. 10. "Joe's Demons" is showing on the full screen as seen at 941. The channel surfer is seen at 943. The channel surfer indexes off METEOR "Joe's Demons" as seen at 945, where the corresponding panel is highlighted. As seen at 947, this user has selected the "All Channels" filter such that all available channels are shown in the channel surfer carousel 943; the user can surf left or right from the highlighted METEOR "Joe's Demons" panel.

Figure 32:
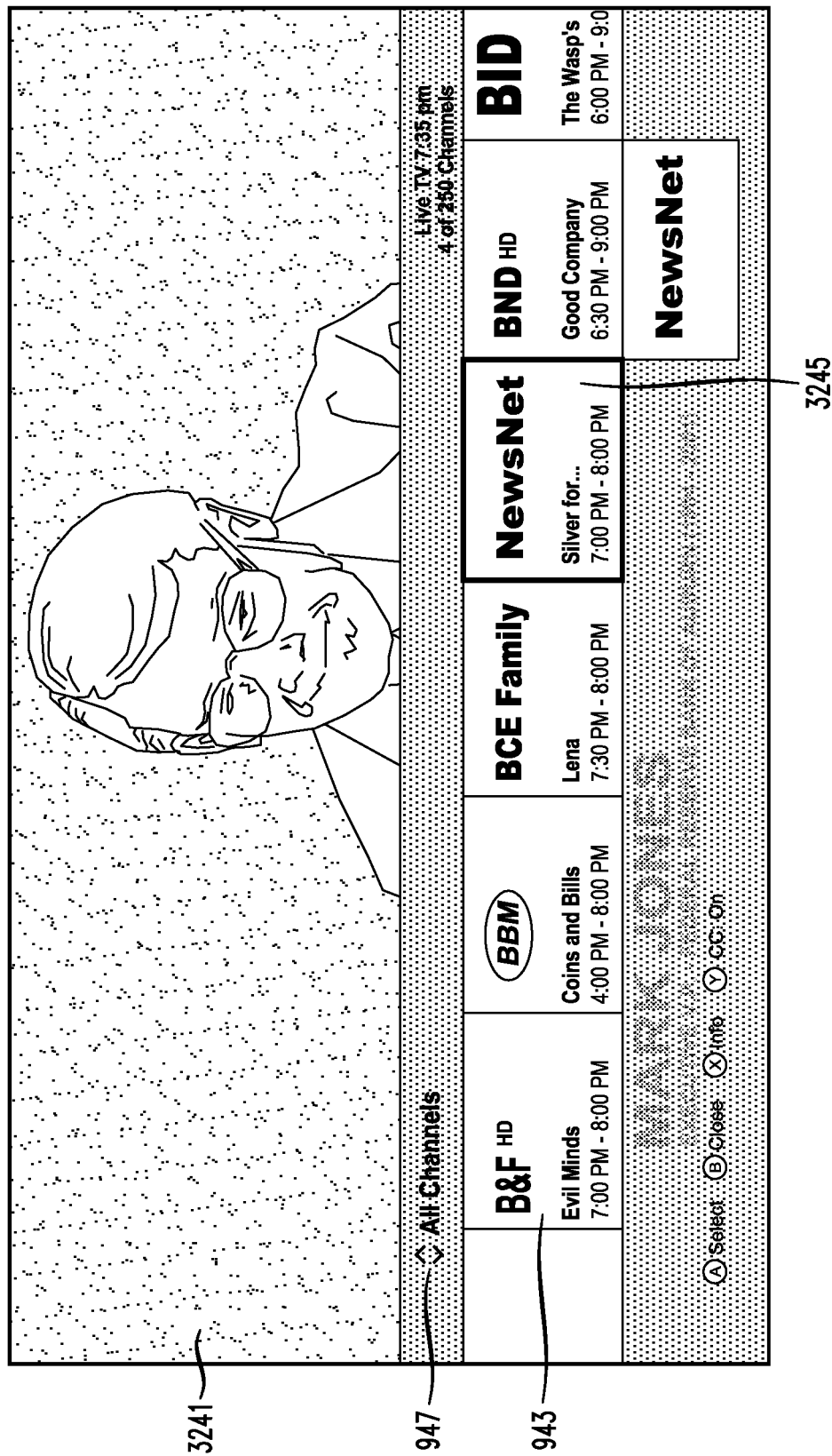
FIG. 32 is a line drawing version of a screen shot showing an exemplary "all channels" screen, on a gaming console, in accordance with aspects of the invention.
Figure 34:
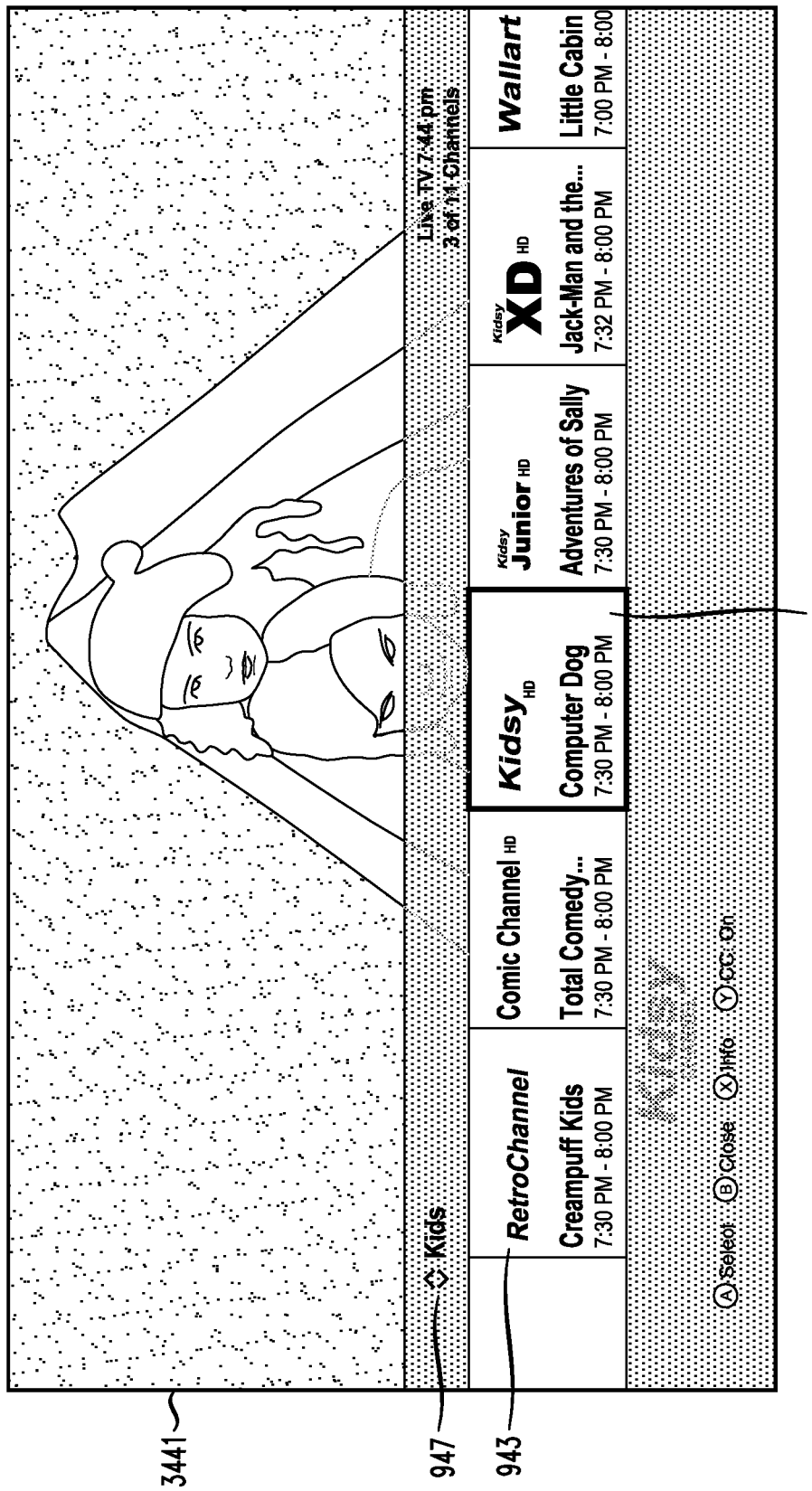
FIG. 34 is a line drawing version of a screen shot showing an exemplary "kids" filter screen, on a gaming console, in accordance with aspects of the invention.
Figure 35:
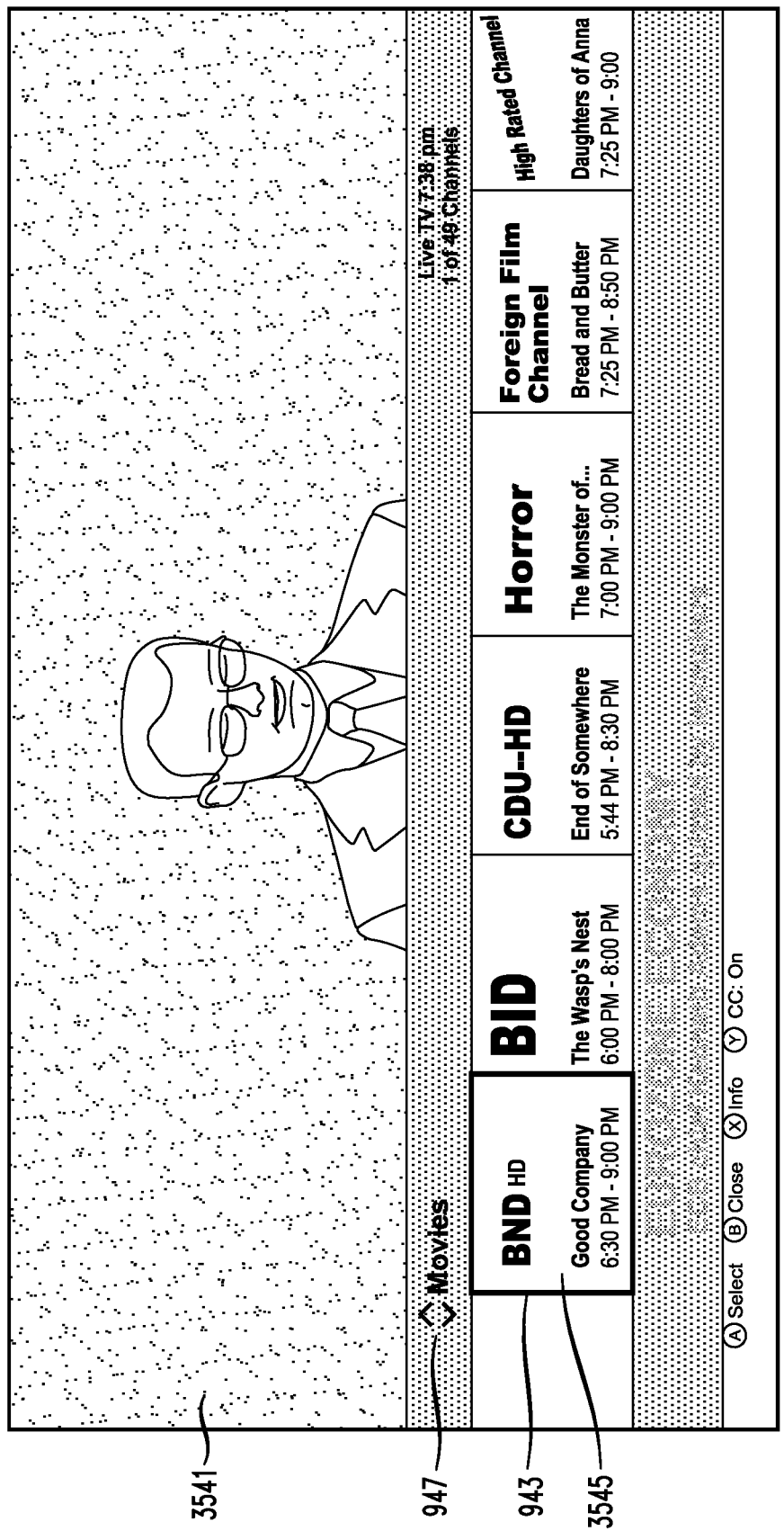
FIG. 35 is a line drawing version of a screen shot showing an exemplary "movies" filter screen, on a gaming console, in accordance with aspects of the invention.
Figure 36:
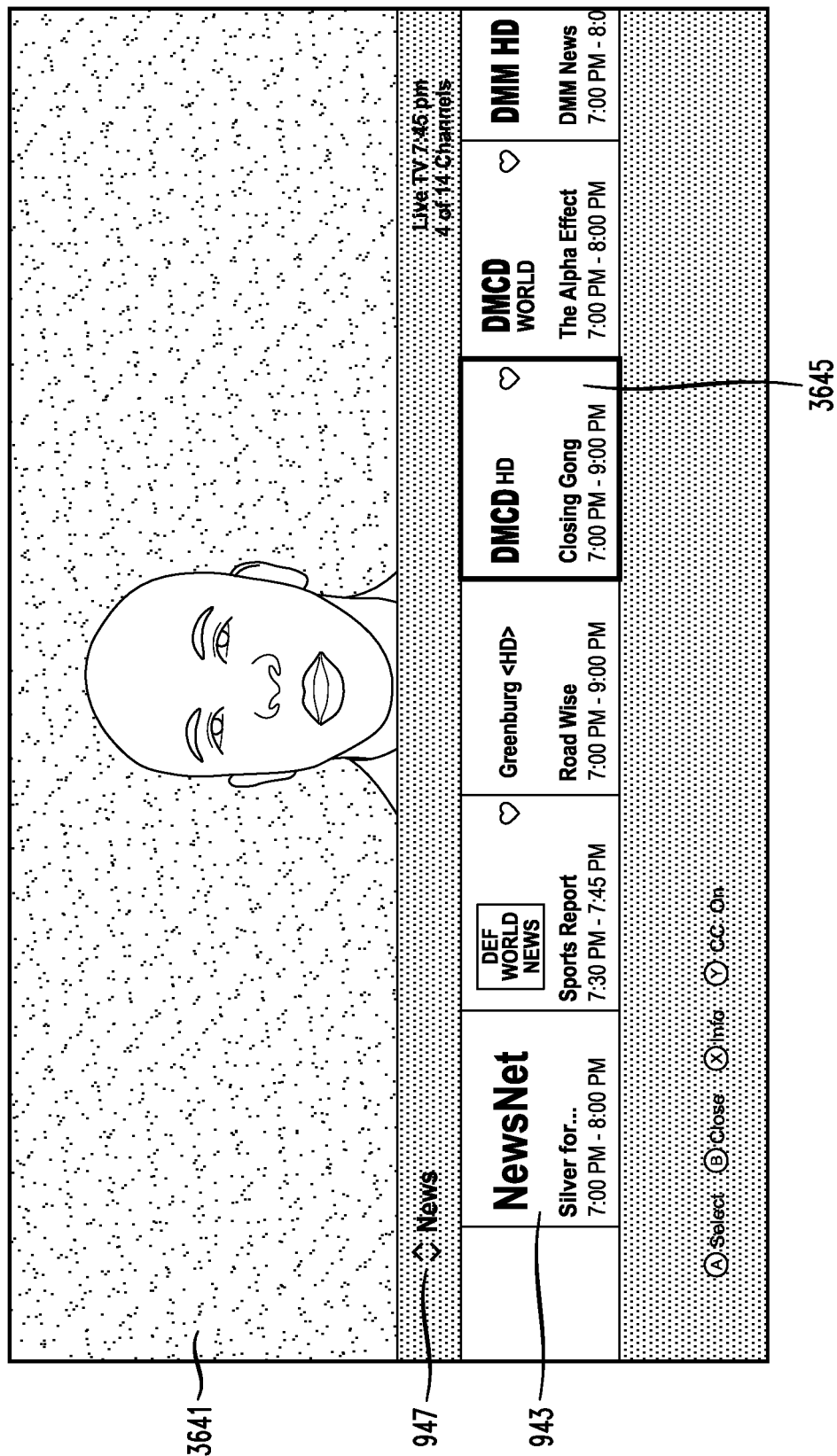
FIG. 36 is a line drawing version of a screen shot showing an exemplary "news" filter screen, on a gaming console, in accordance with aspects of the invention.
Figure 37:
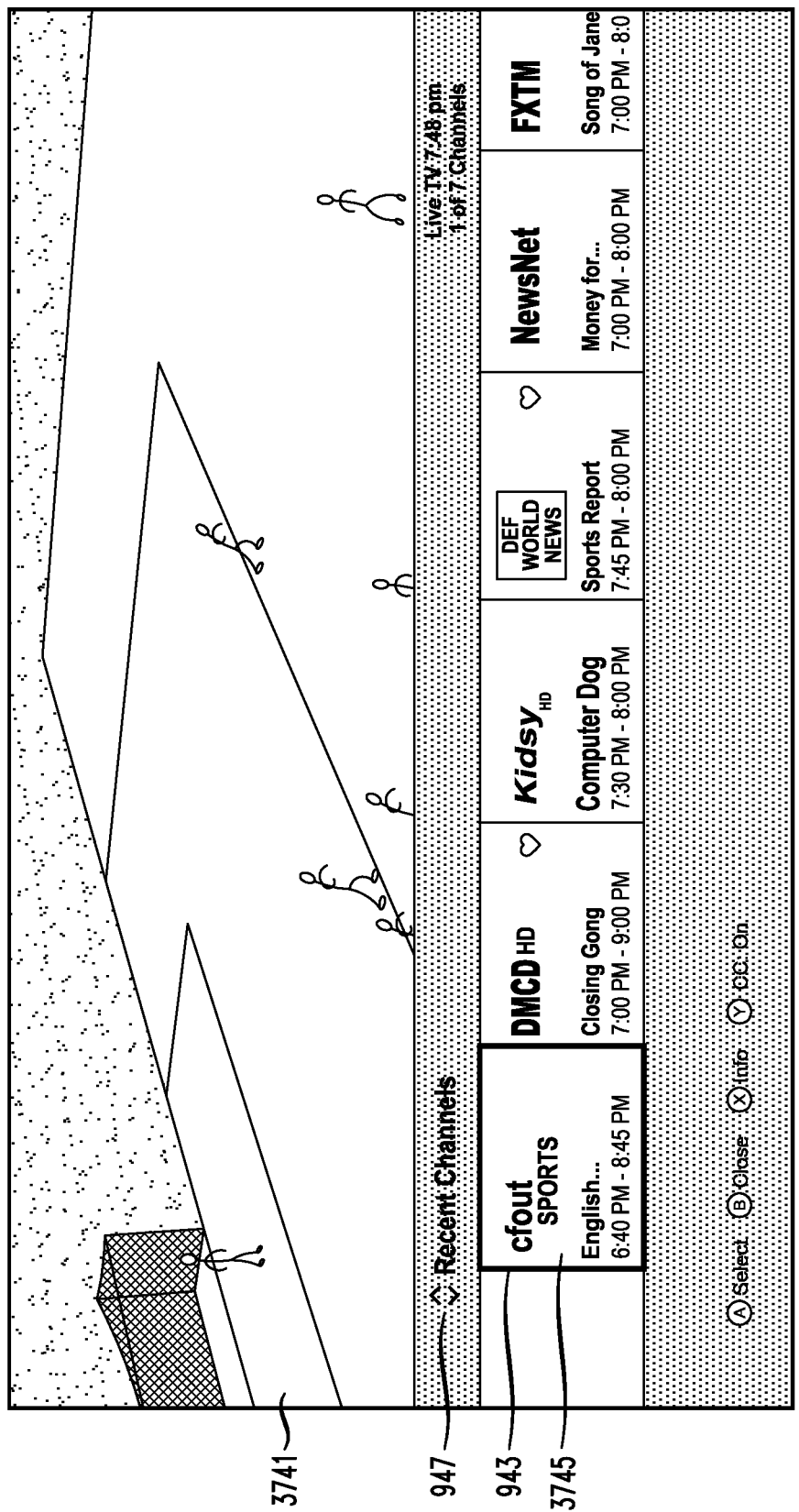
FIG. 37 is a line drawing version of a screen shot showing an exemplary "recent channels" filter screen, on a gaming console, in accordance with aspects of the invention.
Figure 38:
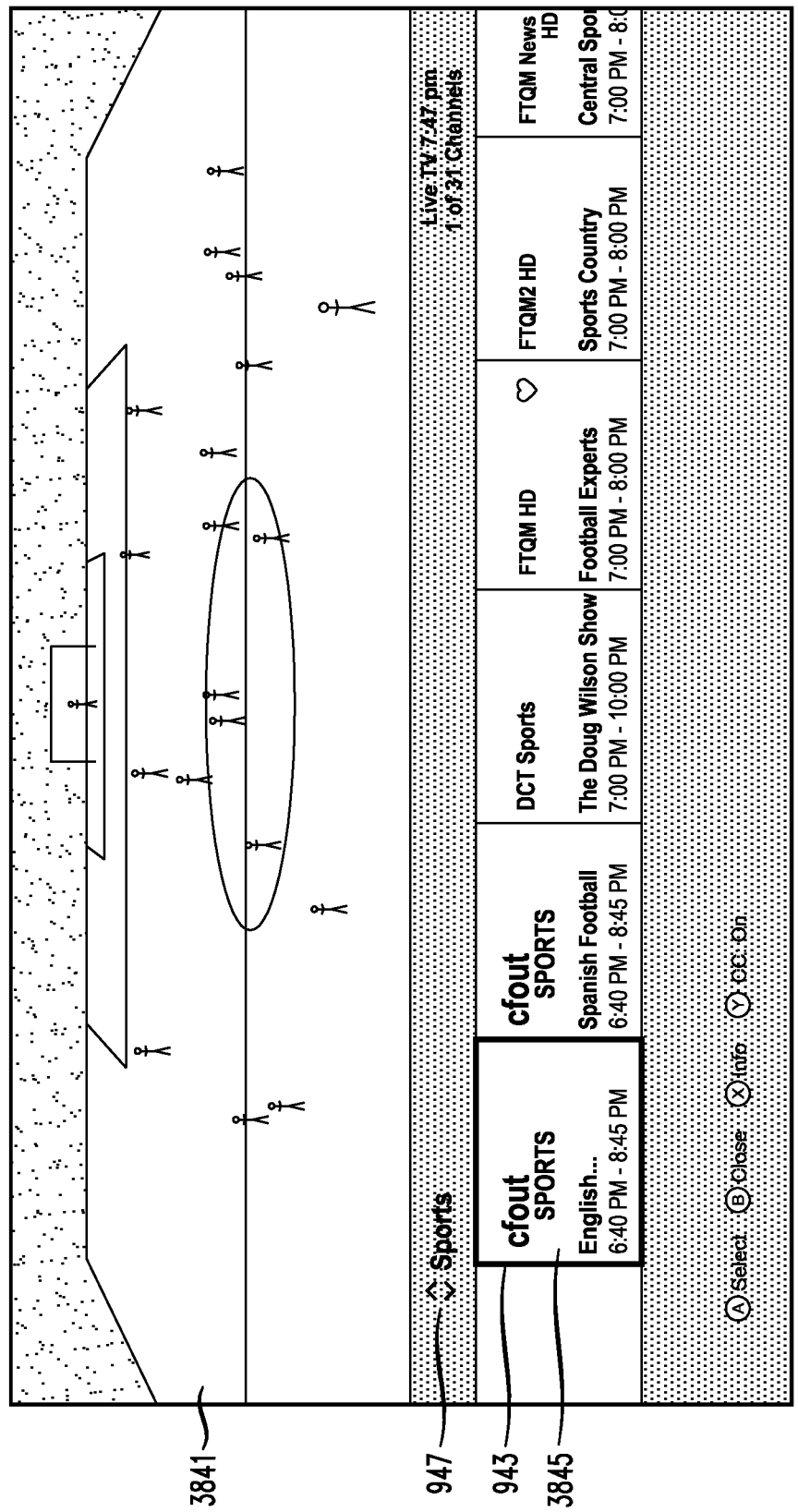
FIG. 38 is a line drawing version of a screen shot showing an exemplary "sports" filter screen, on a gaming console, in accordance with aspects of the invention.
Figure 39:
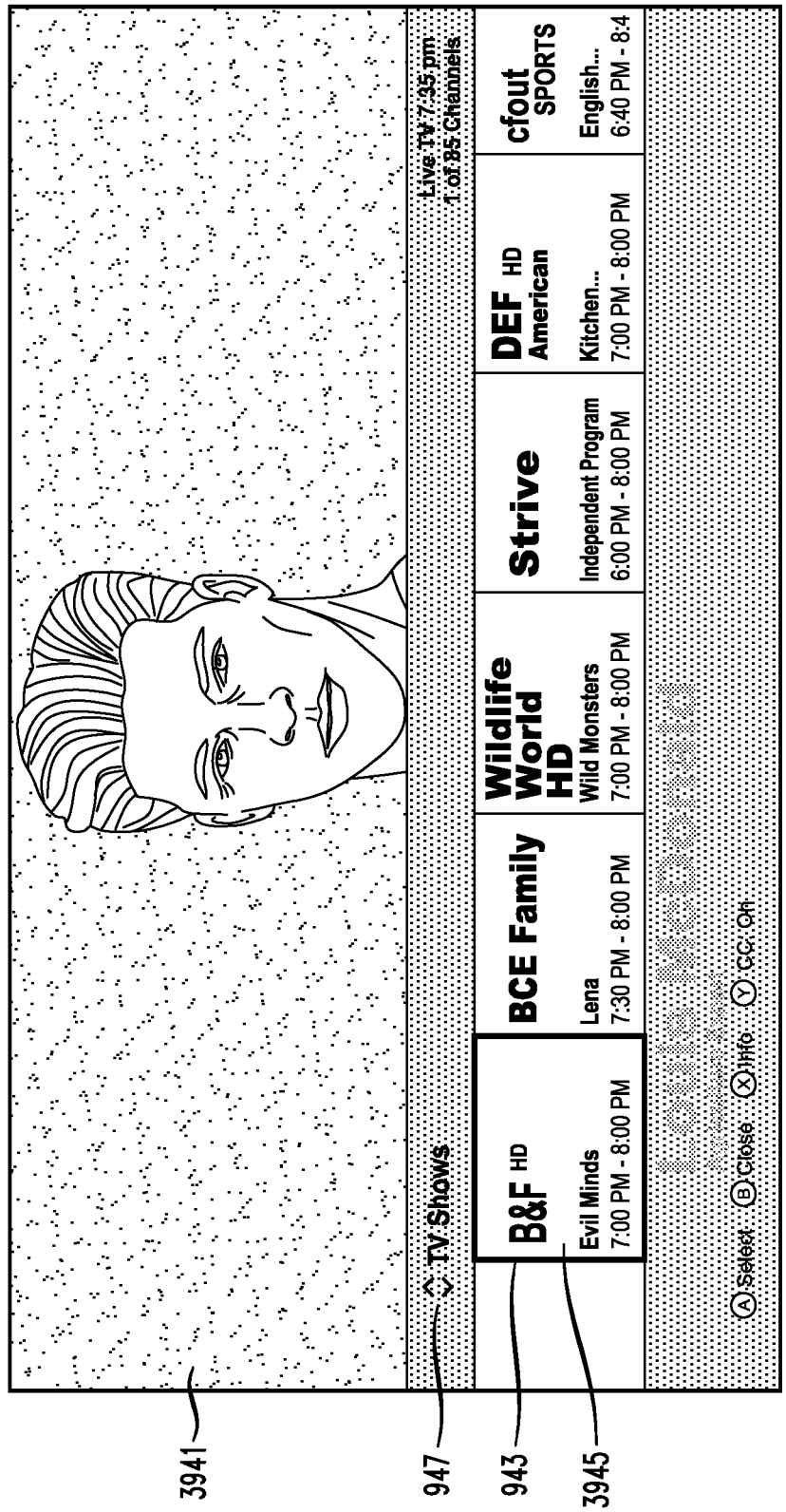
FIG. 39 is a line drawing version of a screen shot showing an exemplary "TV Shows" filter screen, on a gaming console, in accordance with aspects of the invention.

Using the DPad 918 on the controller, the user can press up or down to go to different filters; for example, All Channels (FIGS. 10 and 32); Movies (FIG. 35); TV Shows (FIG. 39); Kids (FIG. 34); News (FIG. 36); Sports (FIG. 38); Recent channels (FIG. 37); and/or Favorites (FIG. 33) (if there are any favorites that have been set up on the console 800). In some embodiments, "recent channels" as seen in FIG. 37 may be a default carousel instead of "All Channels" as shown in FIGS. 10 and 32. Again, as seen in FIG. 10, the user can navigate left or right; for example, once to the left to access "The Fight," twice to the left to access "Happy Kids," three times to the left to access "Generation Z," once to the right to access "Family Issues," or twice to the right to access "Dinosaur Show." In some embodiments, the highlighted METEOR "Joe's Demons" panel 945 could instead be located on the far left, where Generation Z is now, or on the far right, where Dinosaur Show is now, to further highlight that it is the current channel. Navigating left or right allows the user to pick any other desired channel to watch, while navigating up and down with the controller allows the user to change to different filters such as those listed above. Filters may be, for example, content based or channel based. For example, the "News" filter is constructed by a set of channels—a set of channels that have been established as news channels. On the other hand, the "TV Shows" filter can be based on a Tribune Media Services identification number (TMS ID) that says "SH" for "show." Similarly, "Movies" may be content based and may include any movie that is currently airing, based on a TMS ID that identifies the program as a movie. It will be appreciated that "genre" is one non-limiting exemplary type of filter.

One or more embodiments provide a user interface (UI) for a gaming console such as the Xbox®, which allows the gaming console user to access content on an MSO network, but using IPTV. One or more embodiments are employed with live IP streams. Advantageously, one or more embodiments provide filtering capabilities within the live player; for example, using application program interfaces (APIs) with appropriate organization and presentation.

In one or more embodiments, the APIs are dynamic. Heretofore, similar platforms have functioned with curated content for video-on-demand (VOD) as opposed to live feeds in one or more embodiments. Such live feeds, in one or more embodiments, are continuously updated on the fly. Consider a traditional set-top box (STB), via which a user watches conventional cable television; a user might desire to see only movies that are on at a given present time, the STB would typically return a list of channels. In contrast, in one or more embodiments, a user asks for a list of movies and is provided with a result that is agnostic to channel—the application lists out all the movies and the result is dynamically updated as the user brings up the navigation.

In another aspect, the user may depress the "X" key 912 on the controller 900 and this action causes a detailed description for the show that is being watched and/or the show that is highlighted within the channel surfer to be displayed.

Thus, one or more embodiments provide an application which permits a user to watch live IPTV on an Xbox or other gaming console. One or more embodiments include a UI with a series of filters, as discussed above. One or more embodiments provide a UI with an advantageous layout. One or more embodiments provide a method including causing a display associated with a gaming console to display a strip of boxes across the bottom of the display. The boxes may contain information on all the available programs, or on a filtered subset of same. It is important to note that in one or more embodiments, this UI is provided over video. That is to say, in one or more embodiments, the browsing is being carried out over the live video feed. Indeed, in one or more embodiments, browsing capability is incorporated on top of the actual video player. Heretofore, on the Xbox or the like, it has been necessary to go to another environment outside of the video player to undertake browsing—typically, it is necessary to exit the video environment, browse to find something to watch, go back into the video environment to watch and then exit the video environment to find something else to watch, and so on. In contrast, one or more embodiments provide browsing and/or searching capability wherein the user can look for things to watch without the user ever having to leave the video environment.

Figure 25:
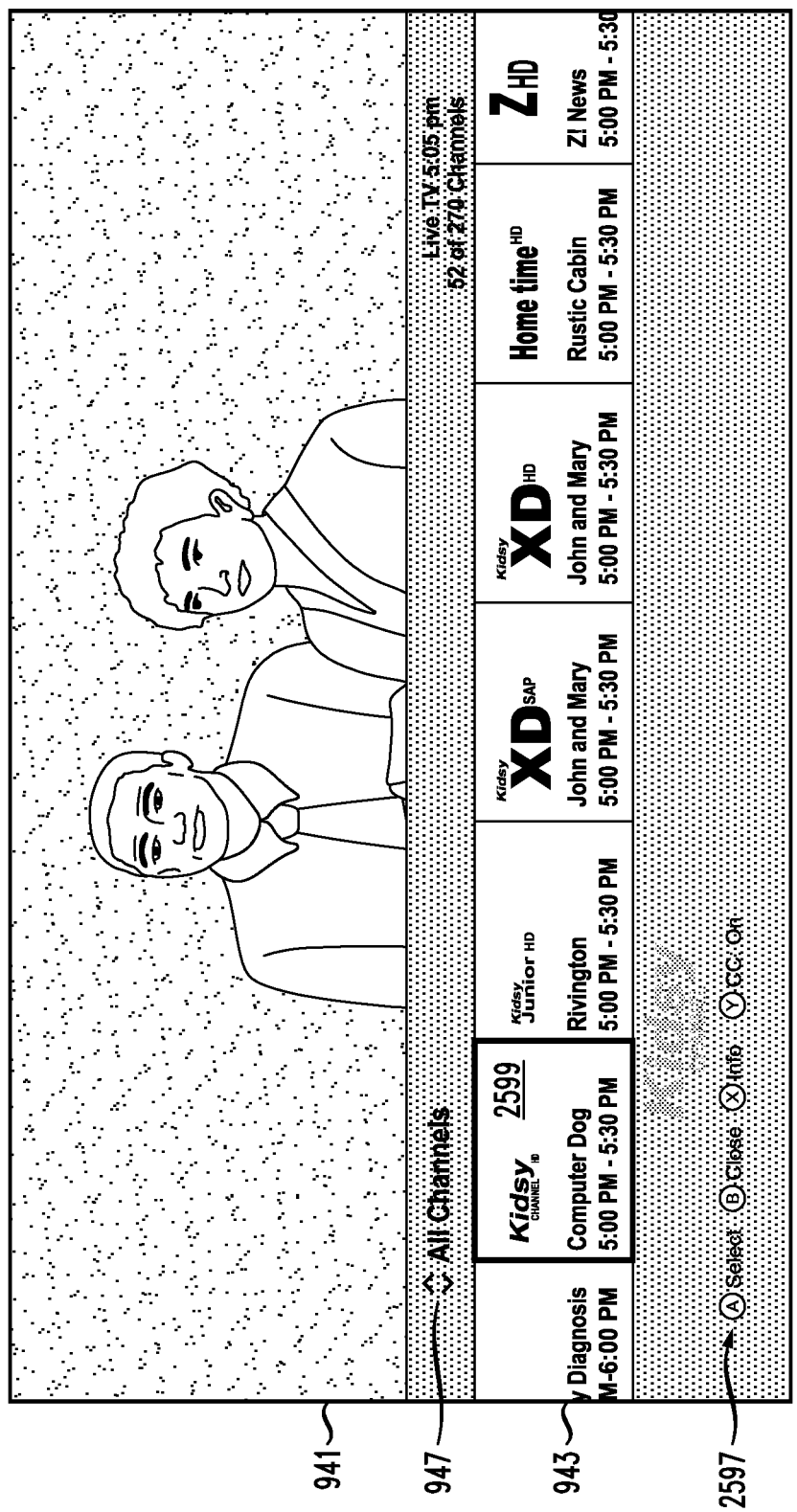
FIG. 25 is similar to FIG. 10, and shows how a gamer accesses a LiveTVProgramDetailsOverlay diagram of FIG. 27 when he or she presses the X or Info button in FIG. 25.
Figure 27:
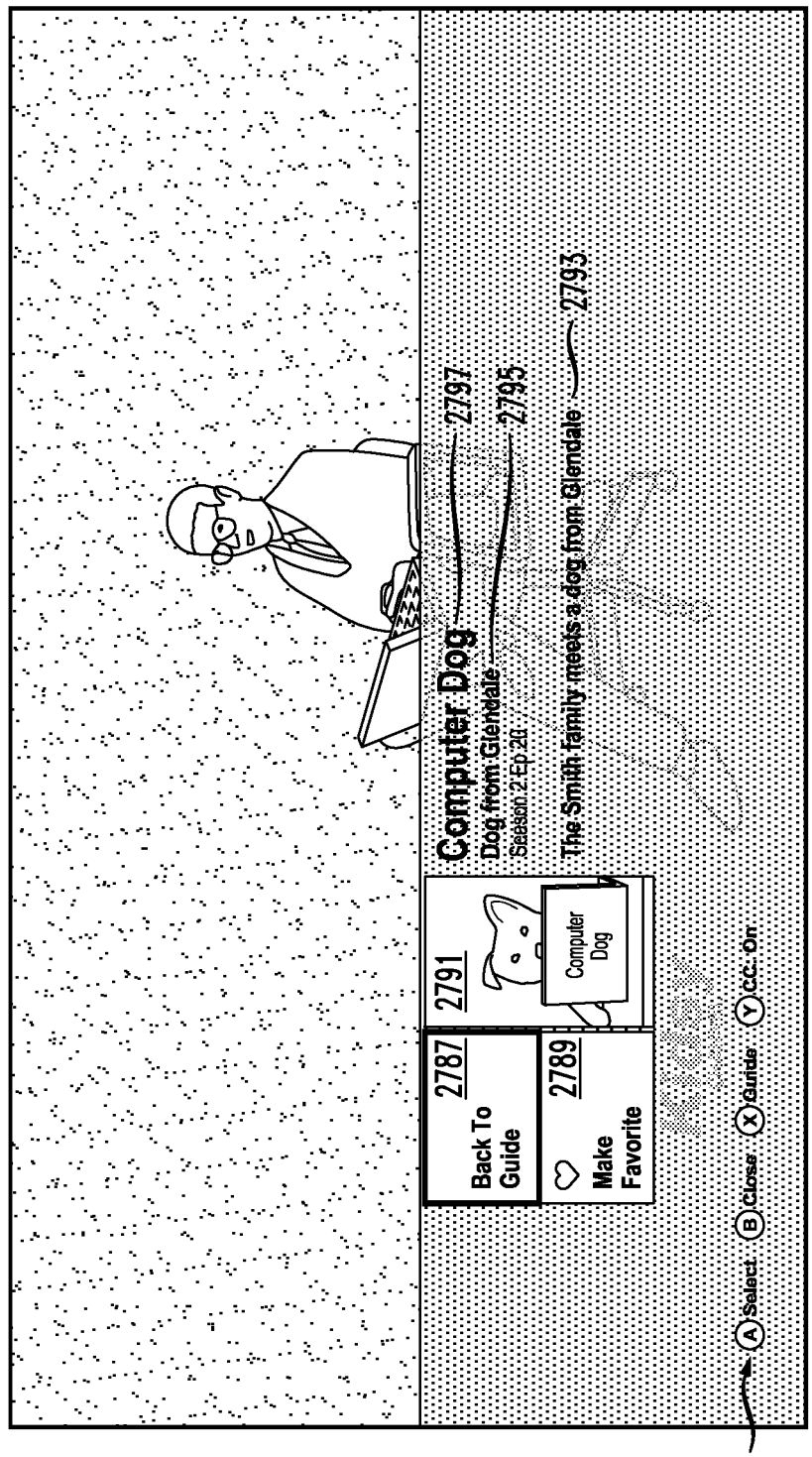
FIG. 27 is an exemplary LiveTVProgramDetailsOverlay diagram, in accordance with an aspect of the invention.

As alluded to above, in one or more embodiments, when the user hits the X Button 912, information regarding the specific live IPTV program episode will be provided). This aspect is illustrated in FIGS. 25 and 27. FIG. 25 is similar to FIG. 10, except that a different show is playing, and shows how a gamer accesses a LiveTVProgramDetailsOverlay diagram of FIG. 27 when he or she presses the X or Info button in FIG. 25. In particular, in FIG. 25, the channel surfer 943 includes the shows "Computer Dog," "Rivington," "John and Mary (SAP)," "John and Mary (HD)," and "Rustic Cabin." The show "Computer Dog" is highlighted as seen at 2599. As seen at 2597, the gamer may select A button 908 to select an item; B button 910 to close; X button 912 to obtain information; or Y button 914 to turn closed captioning on.

FIG. 27 is an exemplary LiveTVProgramDetailsOverlay diagram, which is obtained when the gamer presses the X or Info button in FIG. 25. As seen at 2799, the gamer may select A button 908 to select an item; B button 910 to close; X button 912 to access the guide; or Y button 914 to turn closed captioning on. The series name is displayed at 2797, while the title of the particular episode, and the episode and season number, are seen at 2795. A synopsis appears at 2793, with series art at 2791. At 2789, the user can select the icon to make this show a favorite, while at 2787, the user can return to the guide.

Figure 11:
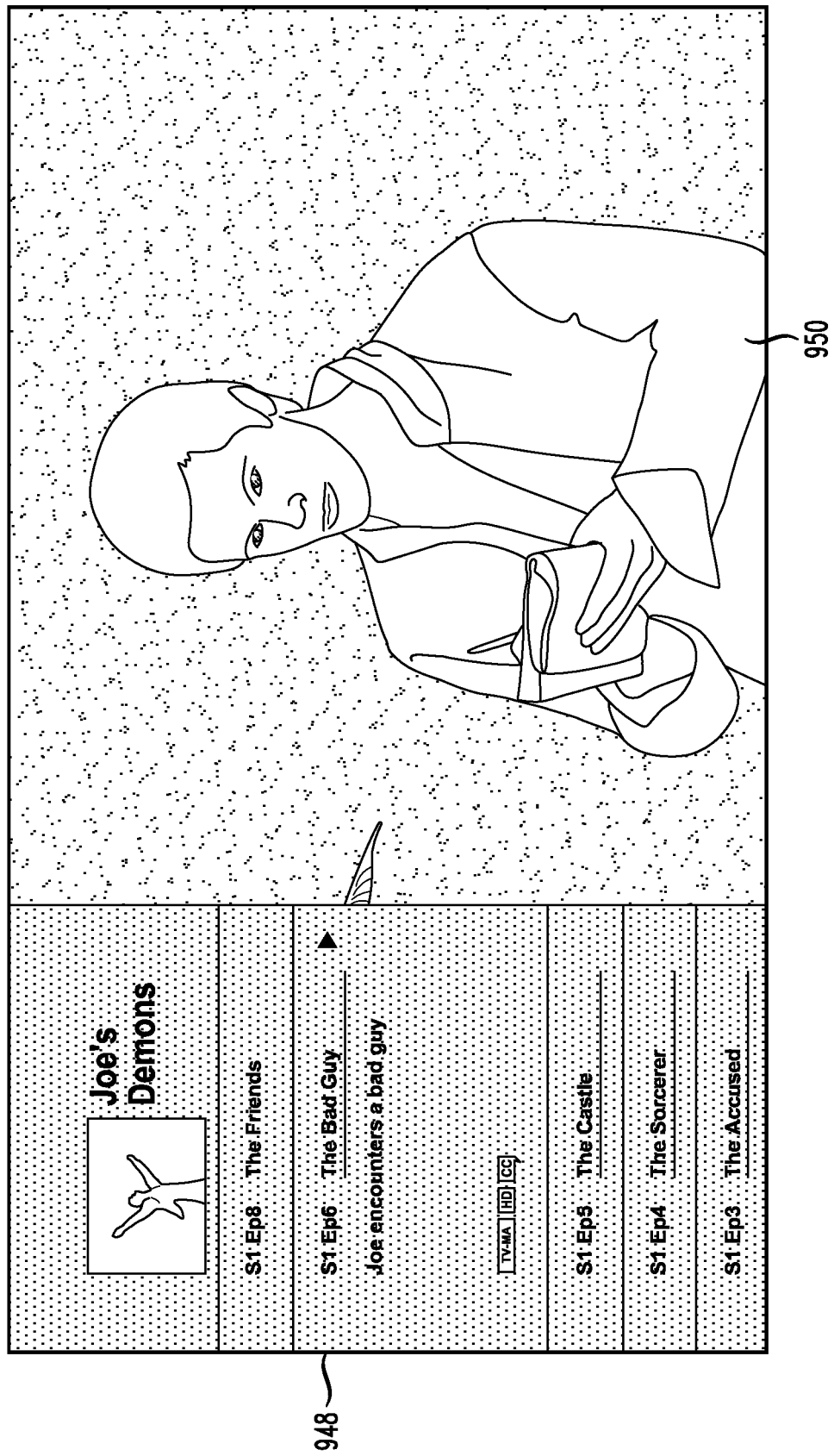

FIG. 11 shows an exemplary screen shot for navigating through episodes of on-demand (as opposed to live) content. Here, information for Season 1 Episode 6 of Joe's Demons is shown at 948 with a corresponding full-screen image at 950. The user can navigate up and down to see information on other episodes in the series; e.g., Season 1, Episode 8, "The Friends"; Season 1, Episode 5 "The Castle"; Season 1, Episode 4 "The Sorcerer"; and Season 1, Episode 3 "The Accused." FIG. 11 is thus an exemplary embodiment showing how to browse individual episodes once the user has started a stream. In contrast, FIG. 10 depicts surfing live channels in linear live television.

Thus, current techniques for watching IPTV on gaming consoles such as the Microsoft Xbox® are sequential in nature. The user browses a list of items to find something he or she wants to watch; he or she finds something and clicks on it. That action starts the video player; he or she watches that item till it is finished or he or she grows tired of it. He or she then goes back to the list and browses through it again and so on. If the user gets 10 levels deep in the menu hierarchy, he or she must press the back button 10 times to get back. In contrast, one or more embodiments bring more of what the user wants "up to the surface" and allow the user to look for things in parallel with watching the video. Some embodiments provide horizontal carousel scrolling as in FIG. 10. Some embodiments provide vertical scrolling as in FIG. 11.

Figure 30:
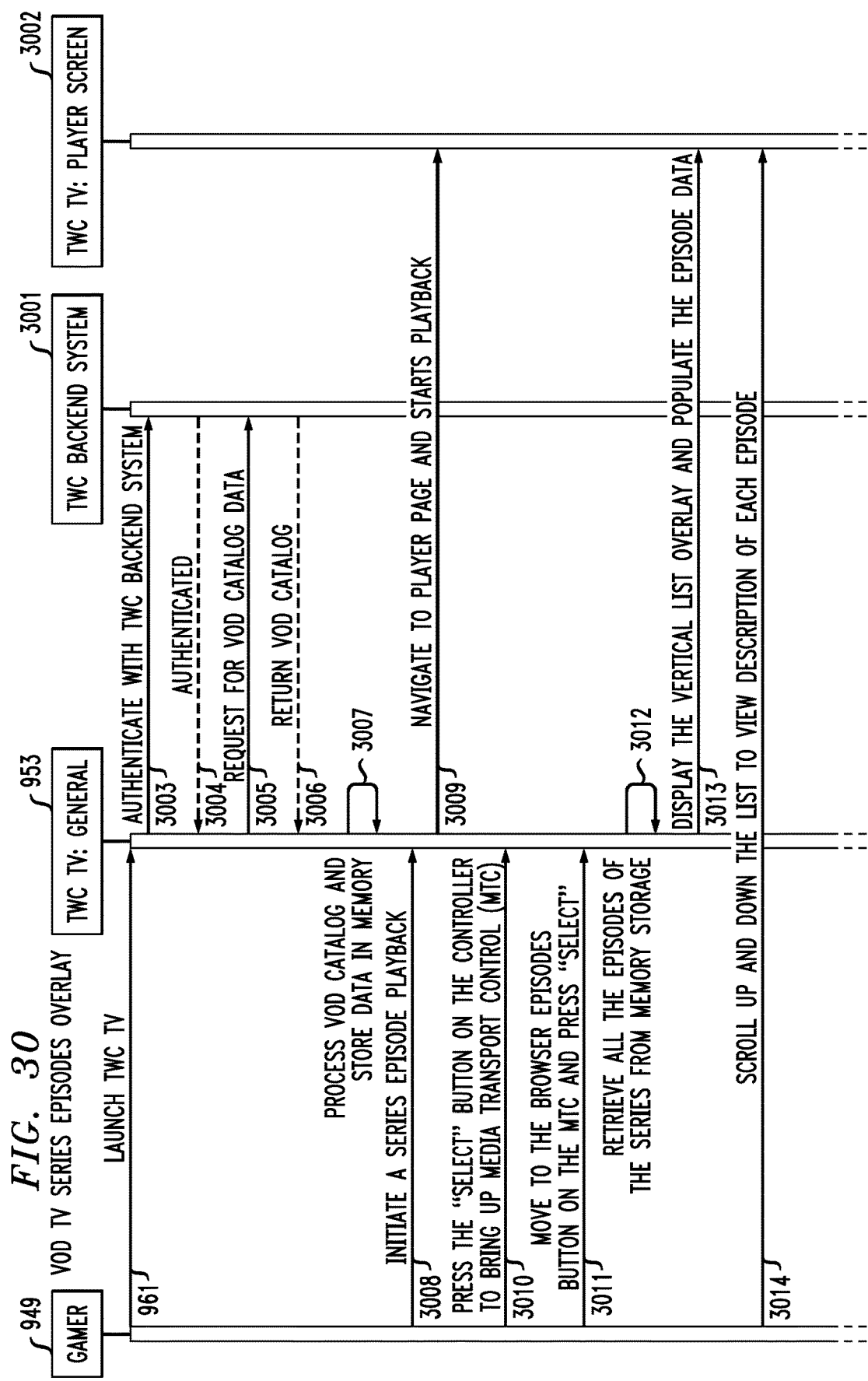
FIG. 30 is a data flow diagram showing video on demand (VOD) TV series episodes overlay, on a gaming console, in accordance with aspects of the invention.
Figure 30:
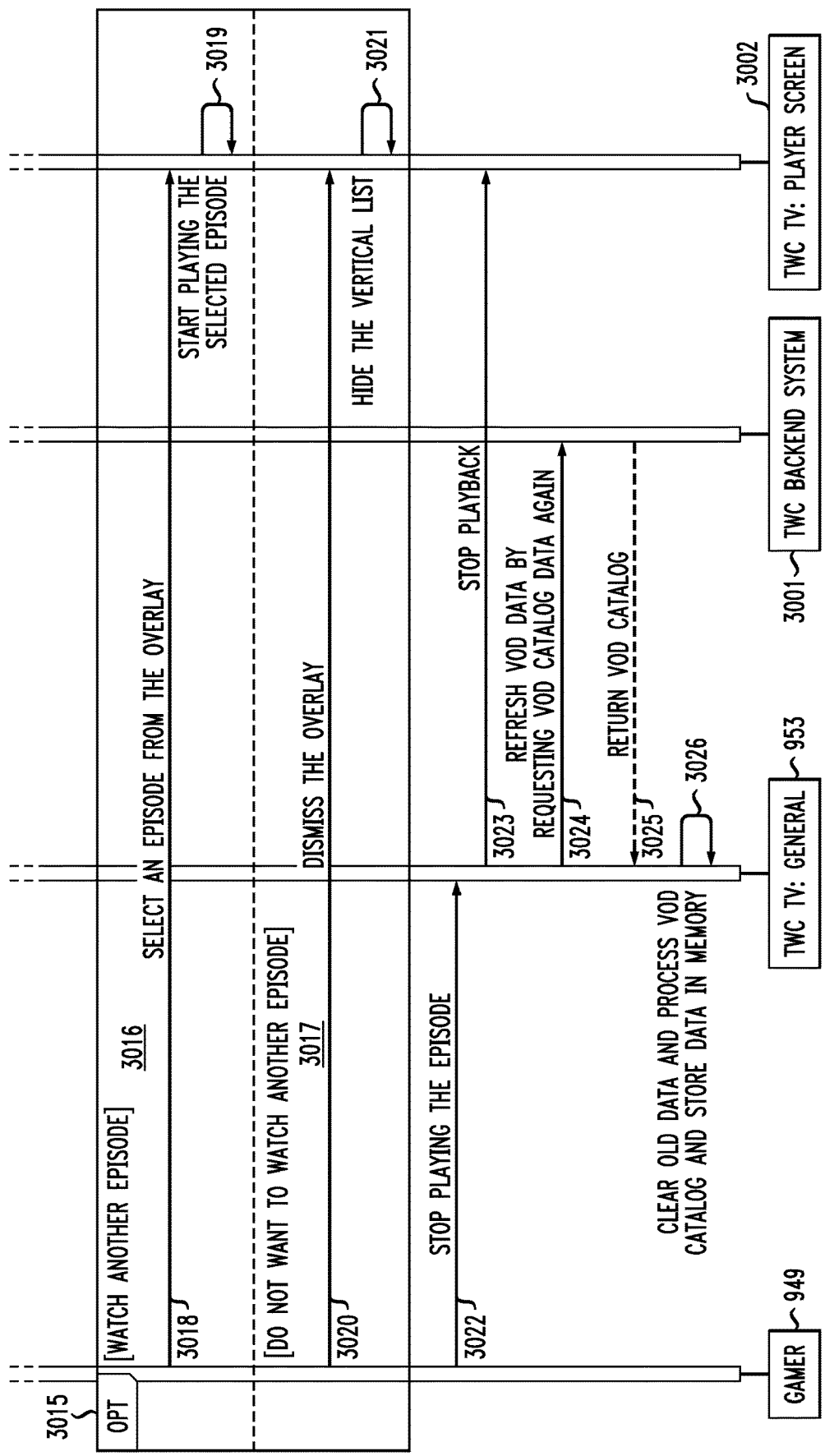

Thus, by way of review, some aspects provide a user interface for browsing individual on-demand episodes once the user has started a stream (e.g., FIG. 11). Some aspects provide a user interface for surfing live channels in linear live television (e.g., FIGS. 10 and 32). Refer now to FIG. 30, which is a data flow diagram showing video on demand (VOD) TV series episodes overlay, on a gaming console, such as is depicted in FIG. 11. Gamer 949 launches TWC TV app 953 at 961. At 3003, app 953 undertakes authentication with TWC Backend System 3001 (system 3001 may include, for example, an authentication server 955 and optionally one or more of the following: one or more data stores including a video-on-demand (VOD) catalog and/or electronic program guide (EPG) data; database server(s) to access the data; VOD server; and the like). The skilled artisan will be familiar with VOD catalogs per se from, for example, US Patent Publication 2010-0058402 of Charles Hasek, the complete disclosure of which is expressly incorporated herein by reference in its entirety for all purposes. Given the teachings herein, the skilled artisan will be able to implement one or more embodiments by interfacing with existing VOD catalogs. At 3004, backend system 3001 authenticates the gamer to the app 953. At 3005, app 953 requests VOD catalog data from backend system 3001. In 3006, backend system 3001 returns the VOD catalog to app 953. In 3007, app 953 processes the VOD catalog and stores appropriate data in memory (e.g., memory 806 or persistent storage such as a hard disk drive coupled to chip 808).

Figure 40:
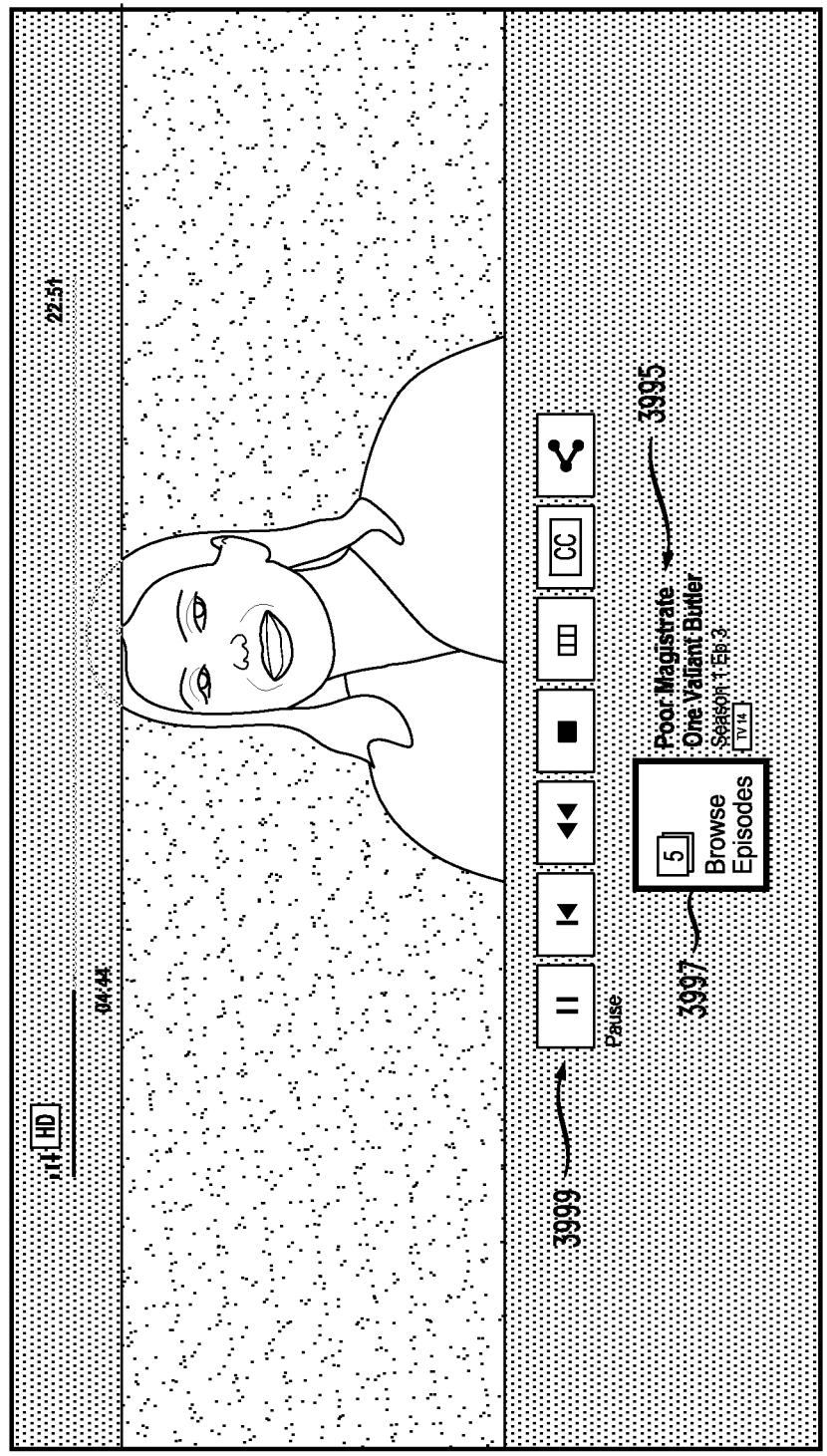
FIG. 40 is line drawing version of a an exemplary screen shot showing a media transport control with a browse episodes button, in accordance with aspects of the invention.

In 3008, gamer 949 uses app 953 to initiate a series episode playback (i.e. plays back a series episode available as a VOD asset, using VOD functionality). In step 3009, app 953 navigates to TWC TV Player Screen 3002 and commences playback. Element 3002 physically corresponds to a display screen and associated screen buffer which produce a screen image such as that shown in FIG. 11. In step 3010, gamer 949 presses the select button ("A" button 908) on controller 900 to communicate with app 953 to bring up media transport control. Referring to FIG. 40, the skilled artisan will be familiar with media transport control 3999 on the Xbox® console—media transport control is an overlay showing play, pause, stop, rewind, and fast forward buttons, as well as the closed captioning icon and playback duration bar. In step 3011, gamer 949 moves to the browse episodes button 3997 on media transport control and presses "select." This causes app 953 to retrieve all the episodes of the series (i.e., the metadata therefor as opposed to the video) from storage, as seen at step 3012. The browse episodes button 3997 and brief description of current playback 3995 are custom features available within the TWC TV® app. App 953 then communicates with screen 3002 in step 3013, to cause a display similar to that in FIG. 11; namely, a list of episodes (in this non-limiting example, a vertical list along the left-hand side) populated with episode data. Gamer 949 scrolls up and down the list in step 3014 to view a description of each episode. In FIG. 11, the user is "on" episode Season 1, Episode 6, and details for that are displayed. If the gamer scrolled up, information for Season 1, Episode 8 would be displayed, and so on.

Certain optional steps are shown at 3015. If it is desired to watch another episode, as at 3016, at 3018, the gamer 949 selects an episode from the overlay (in the example, the left-hand side of the screen in FIG. 11). At step 3019, player screen 3002 begins playing that episode. If it is not desired to watch another episode, as at 3017, at 3020, the gamer 949 dismisses the overlay by pressing the back ("B") button. At step 3021, player screen 3002 hides the vertical list (or other overlay) and continues with the currently active episode.

In step 3022, the gamer 949 indicates to the app 953 that it is desired to stop playing the episode. In step 3023, app 953 advises screen 3002 to stop playback. In step 3024, app 953 again requests VOD catalog data from backend 3001 (by way of a refresh); in step 3025, backend 3001 returns the VOD catalog. In step 3026, app 953 clears the old data and stores the updated data in memory (e.g., memory 806 or persistent storage such as a hard disk drive coupled to chip 808).

Refer now to FIG. 31, which is a data flow diagram showing a channel surfer with filtering, on a gaming console, such as is depicted in FIGS. 10, 25, 27, and 32-39. Gamer 949 launches TWC TV app 953 at 961. At 3003, app 953 undertakes authentication with TWC Backend System 3001 (as noted, system 3001 may include, for example, an authentication server 955 and optionally one or more of the following: one or more data stores including a video-on-demand (VOD) catalog and/or electronic program guide (EPG) data; database server(s) to access the data; VOD server; and the like). The skilled artisan will be familiar with EPG data and EPG servers per se from, for example, US Patent Publication 2014-0282772 of David Chen et al., the complete disclosure of which is expressly incorporated herein by reference in its entirety for all purposes, as well as from Tribune Media Services, now Gracenote, Inc. Given the teachings herein, the skilled artisan will be able to implement one or more embodiments by interfacing with existing EPG data and/or EPG servers. At 3004, backend system 3001 authenticates the gamer to the app 953. In 3028, app 953 requests the user's (gamers') channel entitlements (channel lineups—whatever channels that user is entitled to) from backend 3001. Backend 3001 returns same in step 3029. In step 3030, app 953 processes the channel lineups and stores the channel entitlement data in memory (e.g., memory 806 or persistent storage such as a hard disk drive coupled to chip 808). In step 3031, app 953 requests electronic program guide (EPG) data from backend 3001. Backend 3001 returns same in step 3032. In step 3033, app 953 processes the EPG data and stores the EPG data in memory (e.g., memory 806 or persistent storage such as a hard disk drive coupled to chip 808).

In step 3034, app 953 contacts backend 3001 to request "sports" channels from a genre service. In step 3035, backend 3001 returns the "sports" channel list to app 953. In step 3036, app 953 builds a sports channels filter from the EPG data by matching the callsigns (e.g., ESPN, WNBC, KABC, etc.) returned from the genre service. A "genre service" refers to a TWC back-end service that returns appropriate content based on desired genres such as "sports," "news," "kids" and so on, or any similar service available from other MSOs.

In step 3037, app 953 contacts backend 3001 to request "news" channels from the genre service. In step 3038, backend 3001 returns the "news" channel list to app 953. In step 3039, app 953 builds a news channels filter from the EPG data by matching the callsigns returned from the genre service.

In step 3040, app 953 contacts backend 3001 to request "kids" channels from the genre service. In step 3041, backend 3001 returns the "kids" channel list to app 953. In step 3042, app 953 builds a "kids channels" filter from the EPG data by matching the callsigns returned from the genre service.

In step 3043, app 953 builds an all channels filter from the EPG data.

Figure 28:
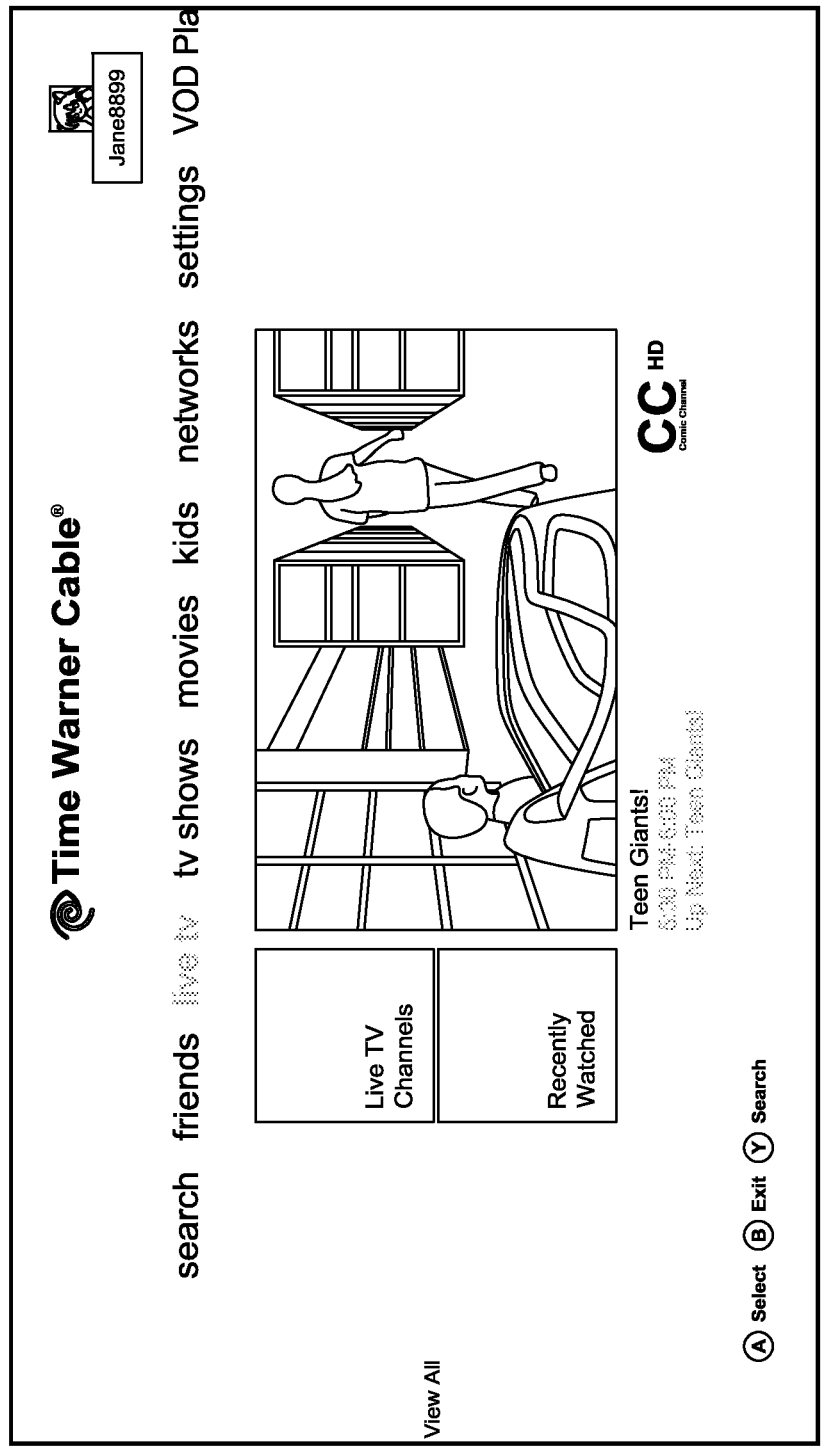
FIG. 28 is an alternative form of home or landing page that can be used in lieu of that of FIG. 16.

As indicated at 3044, the default landing screen after the application is launched is a "Live TV" pivot (e.g., FIG. 28 with "Live TV" highlighted). In an alternative aspect shown at 3055, live TV playback is affirmatively initiated. In step 3056, gamer 949 communicates with app 953 to select the currently streaming picture-in-a-picture to go full screen. In step 3057, app 953 navigates to player page 3002 and commences playback. In step 3058, gamer 949 presses the "select" button on the controller 900 to bring up the channel surfer 3027 (channel surfer display 943 is caused to appear by channel surfer executable code 3027 in the memory of the Xbox® console). In step 3059, app 953 instructs channel surfer 3027 that channel surfer 3027 should be displayed. In step 3060, gamer 949 selects the "Live TV Channels" button in FIG. 28. In step 3061, app 953 navigates to the player page 3002 and initiates playback. In step 3062, app 953 instructs surfer 3027 to be displayed. In step 3063, gamer 949 scrolls through the filters 947 to select "recently watched." In step 3064, app 953 navigates to player page 3002 and commences playback. In step 3065, app 953 instructs channel surfer 3027 to display. As seen at 3066, this results in the channel surfer overlaying the live TV screen as in FIGS. 10 and 32-39.

As noted above, filters may be, for example, content based or channel based. For example, the "News," "Sports," and "Kids" filters are constructed by a set of channels as described with regard to steps 3034-3042. Now consider content-based filters. In step 3067, from the EPG, look at the TMS (Tribune Media Services) ID of the currently aired program. If that ID begins with "EP," then the channel is included into the "TV Shows" filter. In step 3068, app 953 builds the "TV Shows" filter from the EPG data. In step 3069, from the EPG, look at the TMS (Tribune Media Services) ID of the currently aired program. If that ID begins with "MV," then the channel is included into the "Movies" filter. In step 3070, app 953 builds the "Movies" filter from the EPG data. In step 3071, app 953 retrieves a Recent Channels list from local storage (e.g., memory 806 or persistent storage such as a hard disk drive coupled to chip 808) and builds the "Recent Channels" filter from the EPG data.

Optional construction of a "favorites" filter is shown at 3072. In step 3073, app 953 retrieves a favorite channels list from local storage (e.g., memory 806 or persistent storage such as a hard disk drive coupled to chip 808) and builds the "Favorites" filter from the EPG data, if the favorite channels list is not empty.

In step 3074, gamer 949 interacts with channel surfer 3027 to cycle through the filters 947 on the channel surfer. In step 3075, gamer 949 interacts with channel surfer 3027 to select one of the filters 947 on the channel surfer. In step 3076, gamer 949 interacts with channel surfer 3027 to select one of the programs within the selected one of the filters 947 on the channel surfer. In step 3078, channel surfer executable code 3027 advises app 953 of the selected channel. In step 3079, app 953 instructs player screen 3002 to tune to the selected channel.

FIG. 32, somewhat similar to FIG. 10, is a screen shot showing an exemplary "all channels" screen. "Silver For . . . " is showing on the full screen as seen at 3241. The channel surfer is seen at 943. The channel surfer indexes off "Silver For . . . " as seen at 3245, where the corresponding panel is highlighted. As seen at 947, this user has selected the "All Channels" filter such that all available channels are shown in the channel surfer carousel 943; the user can surf left or right from the highlighted "Silver For . . . " panel. In any of FIGS. 32-39, the user can select green "A" button 908 to select a program for viewing, red "B" button 910 to close the channel surfer, blue "X" button 912 to obtain more information about the highlighted program, and/or yellow "Y" button 914 to turn on closed captioning.

Figure 33:
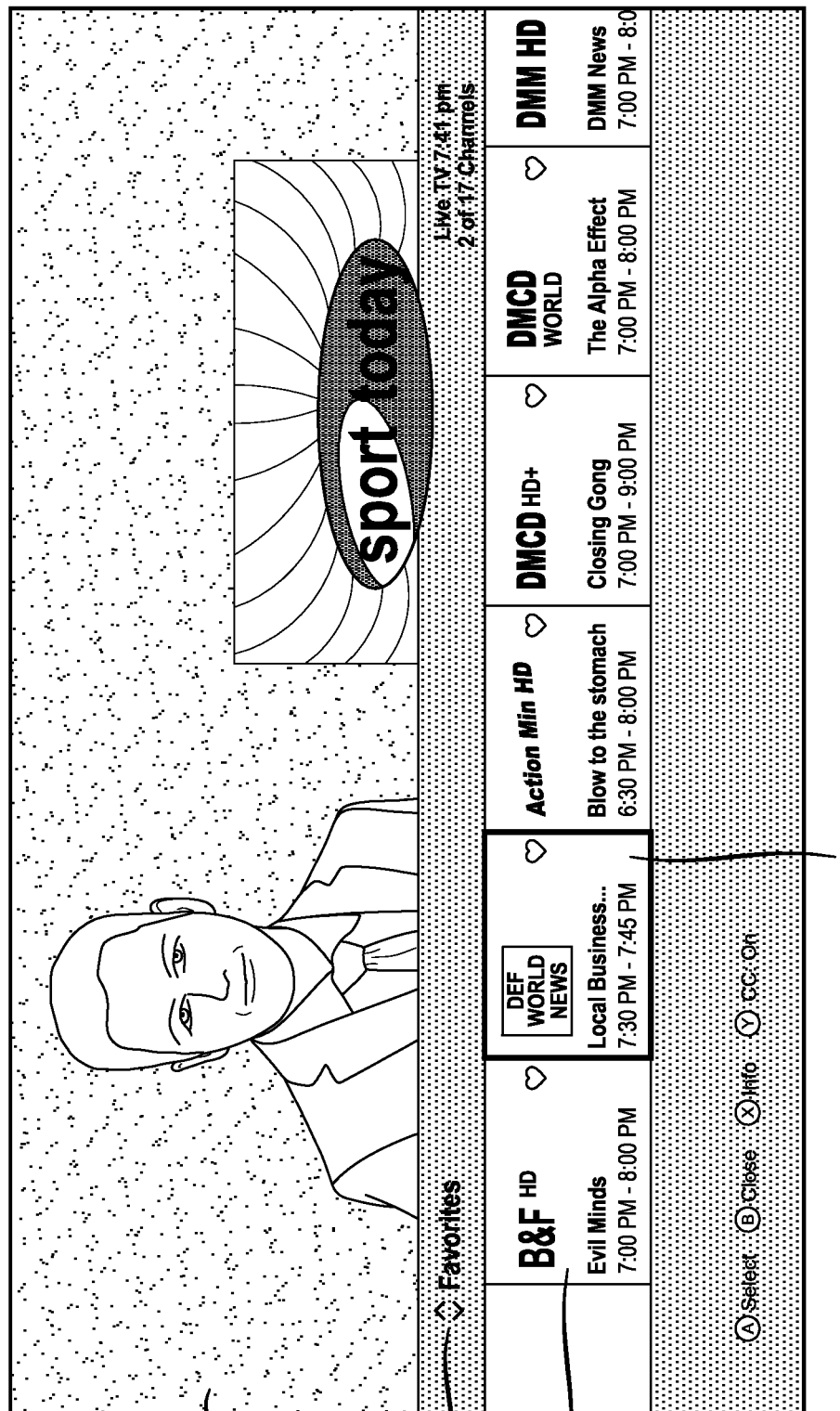
FIG. 33 is a line drawing version of a screen shot showing an exemplary "favorites" filter screen, on a gaming console, in accordance with aspects of the invention.

FIG. 33 is a screen shot showing an exemplary "favorites" filter screen. "Local Business . . . " is showing on the full screen as seen at 3341. The channel surfer is seen at 943. The channel surfer indexes off "Local Business . . . " as seen at 3345, where the corresponding panel is highlighted. As seen at 947, this user has selected the "Favorites" filter such that favorite channels are shown in the channel surfer carousel 943; the user can surf left or right from the highlighted "Local Business . . . " panel.

FIG. 34 is a screen shot showing an exemplary "kids" filter screen. "Computer Dog" is showing on the full screen as seen at 3441. The channel surfer is seen at 943. The channel surfer indexes off "Computer Dog" as seen at 3445, where the corresponding panel is highlighted. As seen at 947, this user has selected the "Kids" filter such that Kids channels are shown in the channel surfer carousel 943; the user can surf left or right from the highlighted "Computer Dog" panel.

FIG. 35 is a screen shot showing an exemplary "movies" filter screen. "Good Company" is showing on the full screen as seen at 3541. The channel surfer is seen at 943. The channel surfer indexes off "Good Company" as seen at 3545, where the corresponding panel is highlighted. As seen at 947, this user has selected the "Movies" filter such that Movies channels are shown in the channel surfer carousel 943; the user can surf left or right from the highlighted "Good Company" panel 3545.

FIG. 36 is a screen shot showing an exemplary "news" filter screen. "Closing Gong" is showing on the full screen as seen at 3641. The channel surfer is seen at 943. The channel surfer indexes off "Closing Gong" as seen at 3645, where the corresponding panel is highlighted. As seen at 947, this user has selected the "News" filter such that News channels are shown in the channel surfer carousel 943; the user can surf left or right from the highlighted "Closing Gong" panel.

FIG. 37 is a screen shot showing an exemplary "recent channels" filter screen. "English . . . " is showing on the full screen as seen at 3741. The channel surfer is seen at 943. The channel surfer indexes off "English . . . " as seen at 3745, where the corresponding panel is highlighted. As seen at 947, this user has selected the "Recent Channels" filter such that recently viewed channels are shown in the channel surfer carousel 943; the user can surf right from the highlighted "English . . . " panel 3745.

FIG. 38 is a screen shot showing an exemplary "sports" filter screen. "English . . . " is showing on the full screen as seen at 3841. The channel surfer is seen at 943. The channel surfer indexes off "English . . . " as seen at 3845, where the corresponding panel is highlighted. As seen at 947, this user has selected the "Sports" filter such that sports channels are shown in the channel surfer carousel 943; the user can surf right from the highlighted "English . . . " panel 3845.

FIG. 39 is a screen shot showing an exemplary "TV Shows" filter screen. "Evil Minds" is showing on the full screen as seen at 3941. The channel surfer is seen at 943. The channel surfer indexes off "Evil Minds" as seen at 3945, where the corresponding panel is highlighted. As seen at 947, this user has selected the "TV Shows" filter such that TV Shows are shown in the channel surfer carousel 943; the user can surf right from the highlighted "Evil Minds" panel 3945.

Screen shots 32-39 are directed to Live (broadcast) TV, and indicate that one or more embodiments provide a level of personalization heretofore not available for thousands of broadcast channels of Live TV over IPTV on a subscription basis.

In another aspect, the application providing the UI for watching IPTV on a gaming console is also integrated with an online multiplayer gaming and digital media delivery service such as the Xbox LIVE network. The user can socialize with his or her friends on the Xbox LIVE network while he or she is watching or playing games. The user is provided with a so-called pivot and/or picture-in-picture (PIP) and can watch live TV, movies, kids' programming, network television and so on. The user may have one or more friends defined within a social network associated with the online service. In one or more embodiments, for anyone that the user has already deemed a friend within the online service, the user can see what that friend is watching. If the user selects his or her friend, the user's console will start streaming the show that the friend is watching.

The skilled artisan will appreciate that Microsoft's "Human Interface Guidelines Lakeview Applications for Xbox 360" indicates, at page 31 thereof, that the Pivot is a primary navigational mechanism in the Xbox UI framework, inspired by and related to the Pivot element seen in Windows Phone 7. The Pivot is best understood as a long strip of related Pivot Items that the user can navigate by using a horizontal swipe motion (using NUI—Natural User Interface—NUI commands are gesture based), "next" or "previous" commands (using VUI—Voice User Interface), or a D-pad left/right navigation (using controller). This navigation has the effect of moving the sliding window left and right along the Pivot.

Figure 12:
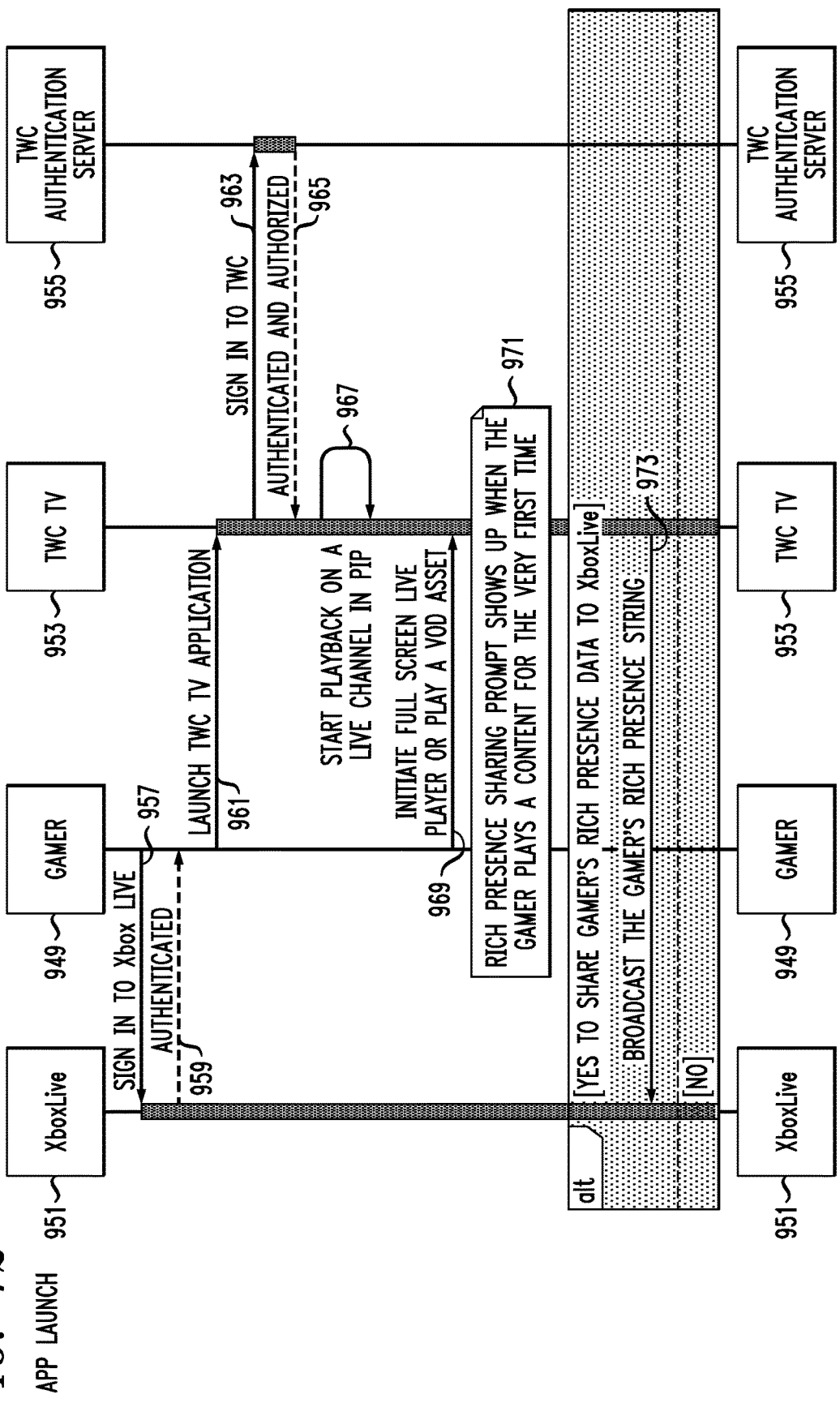
FIG. 12 is a data flow diagram showing the launch, on a gaming console, of an application that permits the watching of IPTV, in accordance with aspects of the invention.

FIG. 12 shows an exemplary application launch process. As seen at 957, gamer 949, using a console 800 or the like with Internet connectivity, signs on to an online service such as Xbox LIVE 951. Element 951 represents a network including a server (e.g. 700 in FIG. 7) providing the online service over an IP connection. At 959, the gamer is authenticated using known techniques. At 961, the gamer launches the aforementioned application providing IPTV capability on the console 800 or the like. Purely for purposes of a non-limiting illustration, the applications are referred to in the figures as "TWC" TV 953, "TWC" Backend System 3001, and "TWC" TV: Player Screen 3002; however, aspects of the invention are not limited to specific products or services sold or supplied by Time Warner Cable under those marks and/or names. Element 953 represents a software or firmware application executing on the console 800 or the like. At 963, the gamer 949, using application 953, signs on via an authentication server 955 over an IP connection. Purely for purposes of a non-limiting illustration, the authentication server is referred to in the figures as a "TWC" authentication server. At 965, the gamer is authenticated and authorized using known techniques. At 967, the application 953 starts playback on a live channel in a PIP (picture in picture). At 969, the gamer 949 interacts with the app 953 to initiate a full screen live player or to play a VOD asset. At 971, the first time the gamer plays a particular piece of content, he or she is prompted to inquire whether he or she approves sharing of information about the content he or she is watching with the online service. If he or she answers no, the information is not shared. At 973, if he or she answers yes, the information is shared with service 951.

Furthermore regarding the PIP, the skilled artisan will appreciate that the term PIP is widely used in Microsoft's "Human Interface Guidelines Lakeview Applications for Xbox 360." It is a video component embedded in a pivot and is not full screen.

Figure 13:
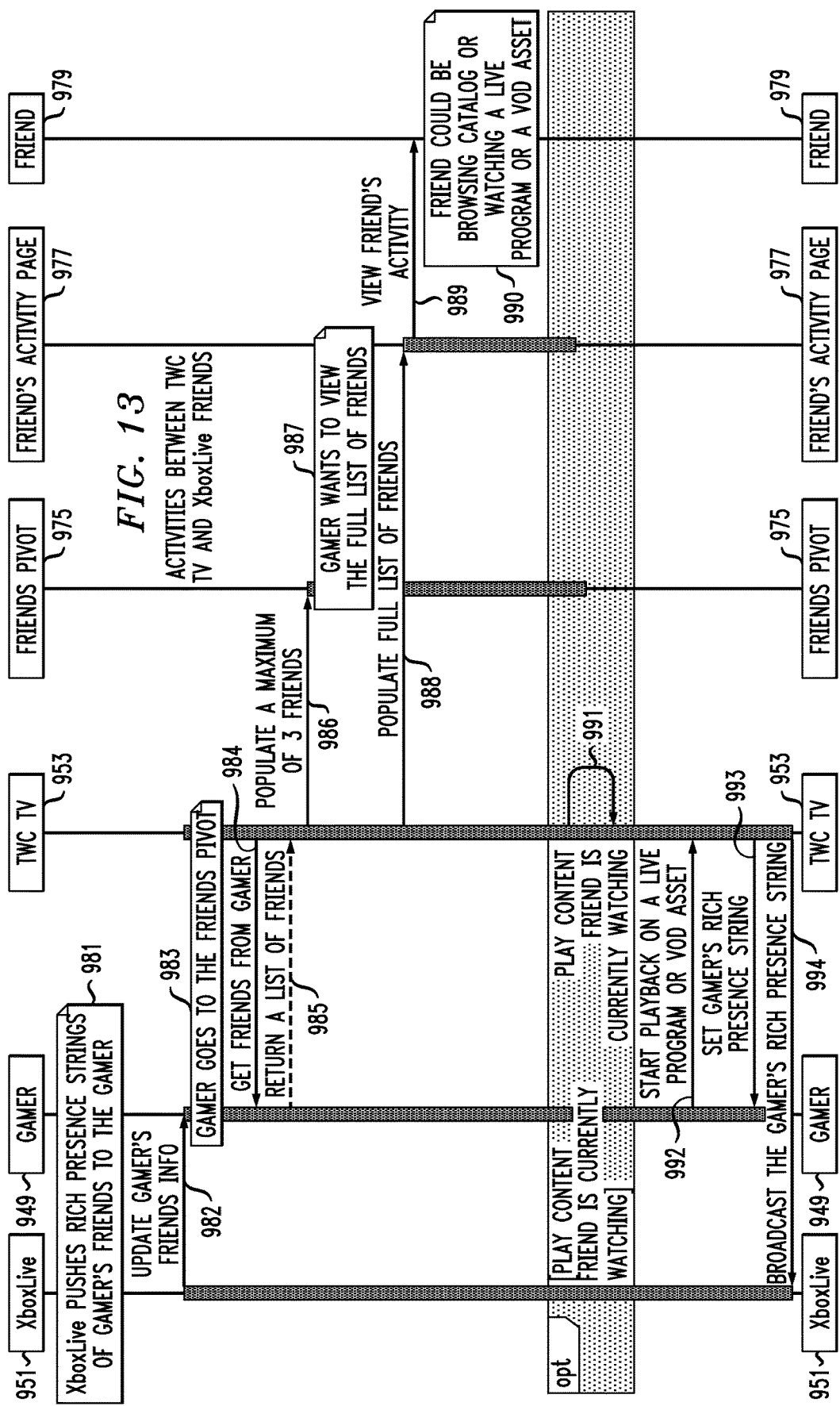
FIG. 13 is a data flow diagram showing social networking integration, on a gaming console, of the application that permits the watching of IPTV, in accordance with aspects of the invention.
Figure 17:
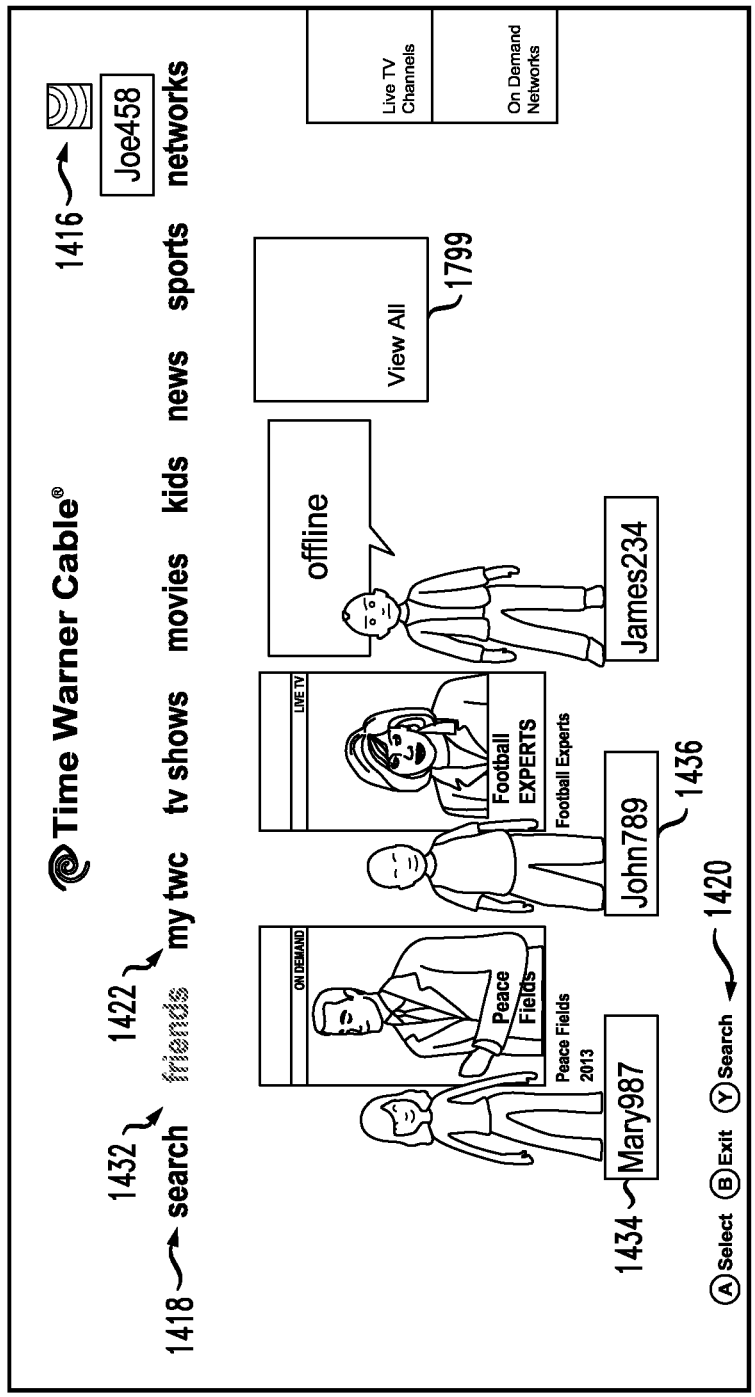
Figure 26:
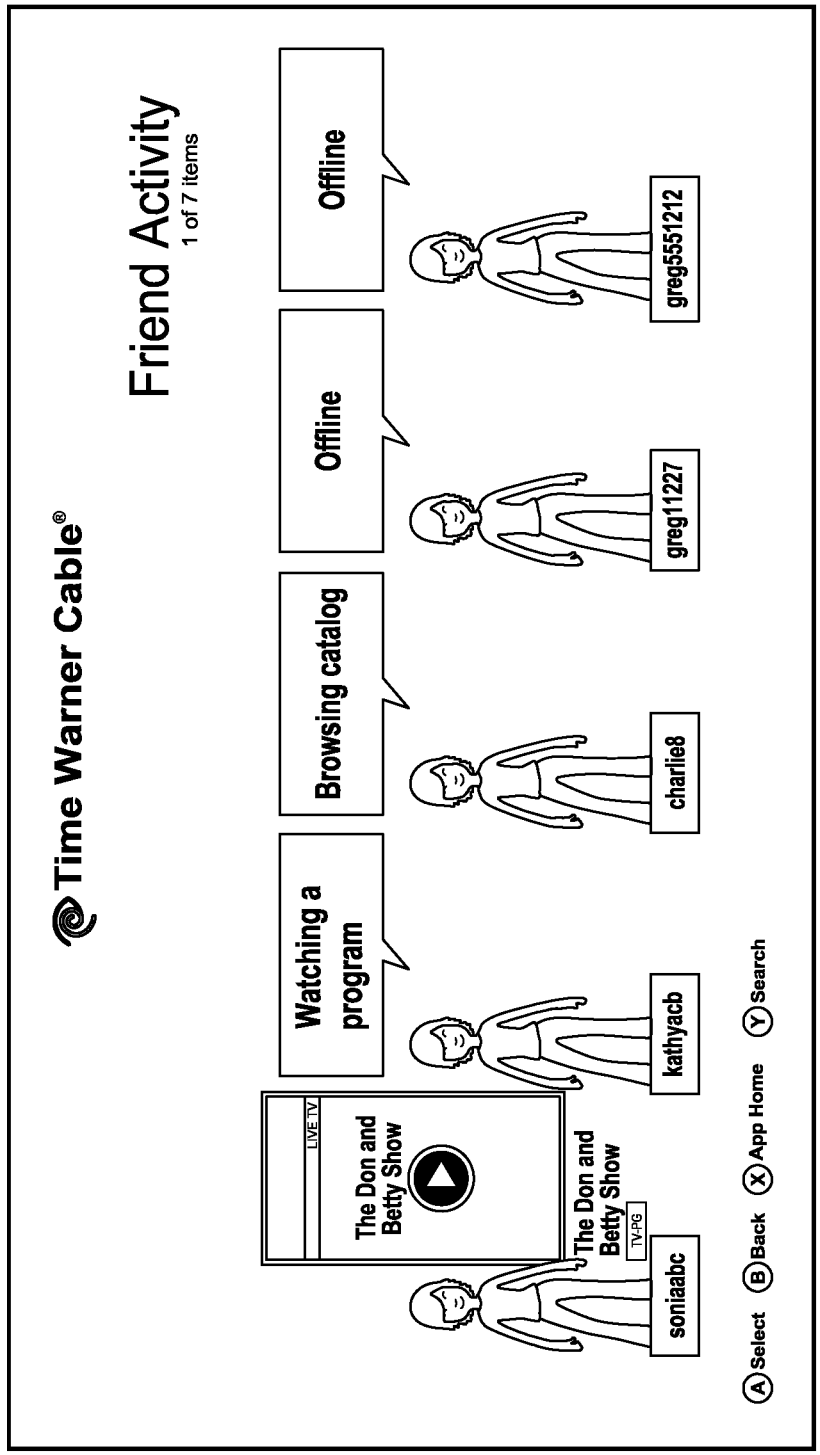
FIG. 26 is an exemplary Friend Activity page, in accordance with an aspect of the invention.

FIG. 13 shows exemplary activities between the application 953 and the friend(s) 979 of the gamer, defined within a social network associated with the online service. At 981 and 982, online service 951 updates the "friends" information of the gamer 949; for example, by pushing rich presence strings of the gamer's friends to the gamer (for those friends who have opted in as discussed at 971). At 983, the gamer navigates to the "friends" pivot 975 (FIG. 17 is a screen shot of same; this is the pivot tab that shows what friends are watching). The app 953, at 984 and 985, obtains the list of friends from Xbox LIVE (when the gamer signs in to Xbox LIVE via the controller, Xbox LIVE populates the gamer's friends information to the gamer—e.g., via Xbox platform APIs, which are part of the Microsoft software running on the Xbox.). At 986, application 953 populates a maximum of three of the gamer's friends into the "friends pivot" on the gamer's console (since in one or more embodiments, there is enough room on the Friends Pivot to display three friends' avatars—selecting the "View All" 1799 button on the Friends Pivot displays a continuous list of all the Gamer's friends). At 987, the gamer optionally wishes to see the full list of his or her friends, such that application 953 now populates the remainder of the gamer's friends into the "friends pivot" on the gamer's console, at 988. The non-limiting example is particular to current versions of the Xbox; more generally, many variations are possible. For example, showing the full list of friends may be the default; or the default may be less than or greater than three, but not all; or an option to see all friends might not always be offered. The list of friends is displayed on a friend's activity page 977 on the console 800. In one or more embodiments, the friend's activity page and friends pivot are user interface components of app 953. Referring briefly to FIG. 26, when the gamer selects the "View All" button 1799 in FIG. 17, he or she will be directed to a Friend Activity page; FIG. 26 is a non-limiting example. For the avoidance of doubt, this screen will typically allow the gamer to see the status of all his or her friends, including those in FIG. 17. In the non-limiting example of FIG. 26, friends "soniaabc," "kathyabc," "Charlie8," "greg11227," and "Greg5551212" are shown. Friends "soniaabc" is watching the DON AND BETTY SHOW which the gamer is able to select so that he or she can watch it as well. Friend "kathyabc" is watching a program; friend "Charlie8" is browsing the catalog; friend "greg11227" is offline; and friend "Greg5551212" is offline. As seen the lower left-hand corner, the gamer may select A button 908 to select an item; B button 910 to go back; X button 912 to go to the application home; or Y button 914 to search.

Now continuing, at 989, the gamer views the activity of one particular friend 979; as seen at 990, the friend in question might be browsing the catalog or watching a live program or a VOD asset. In this context, element 979 is a Friend avatar (see FIGS. 17 and 18) and a Friend is another person who has agreed to be the Gamer's friend on the Xbox Live social network. Optionally, as seen at 991, the app 953 plays the content that the friend 979 is currently watching. At 992, the gamer 949 instructs the app 953 to begin playback on a live program or VOD asset (for example, based on friend 979 watching the same thing). At 993, app 953 sets the gamer's rich presence string to reflect the new live program or VOD asset being watched. At 994, assuming that the gamer 949 has consented, the app 953 broadcasts the gamer's rich presence string to the online service 951.

Figure 20:
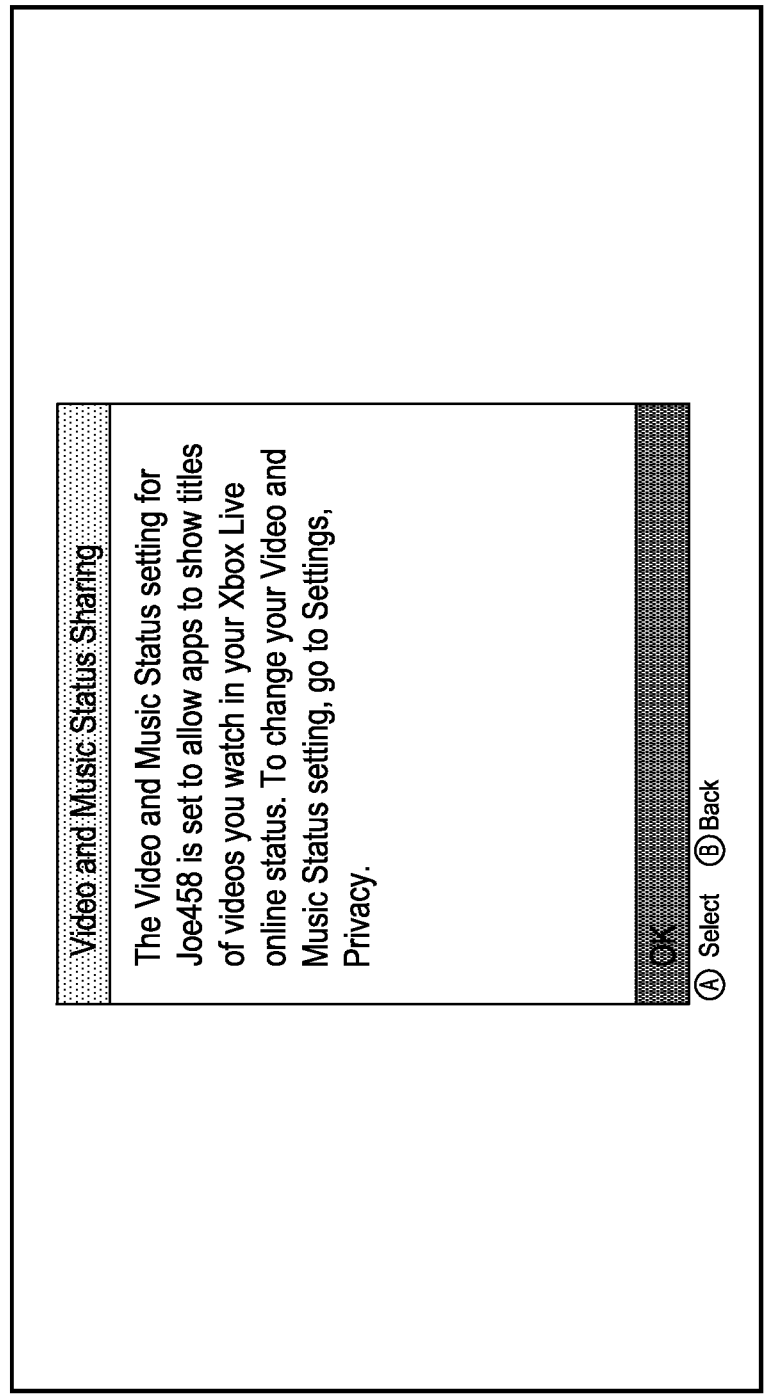

Furthermore in this regard, when app 953 is launched and the gamer plays any content, the app asks the gamer if he or she wishes to share the content played to Xbox LIVE (see FIG. 20). Assuming the gamer had said yes, then when the gamer watches Live TV or a VOD asset, app 953 will create a text string called the rich presence string that has the content Title and will broadcast same to Xbox LIVE. All the friends of the gamer will then receive this information. The following is exemplary rich presence text:

"Watching TWC TV: [movie title]" or "watching TWC TV: [most of episode title] . . . (sn x ep x), or "Watching [callsign]:[program] on twctv"

Figure 14:
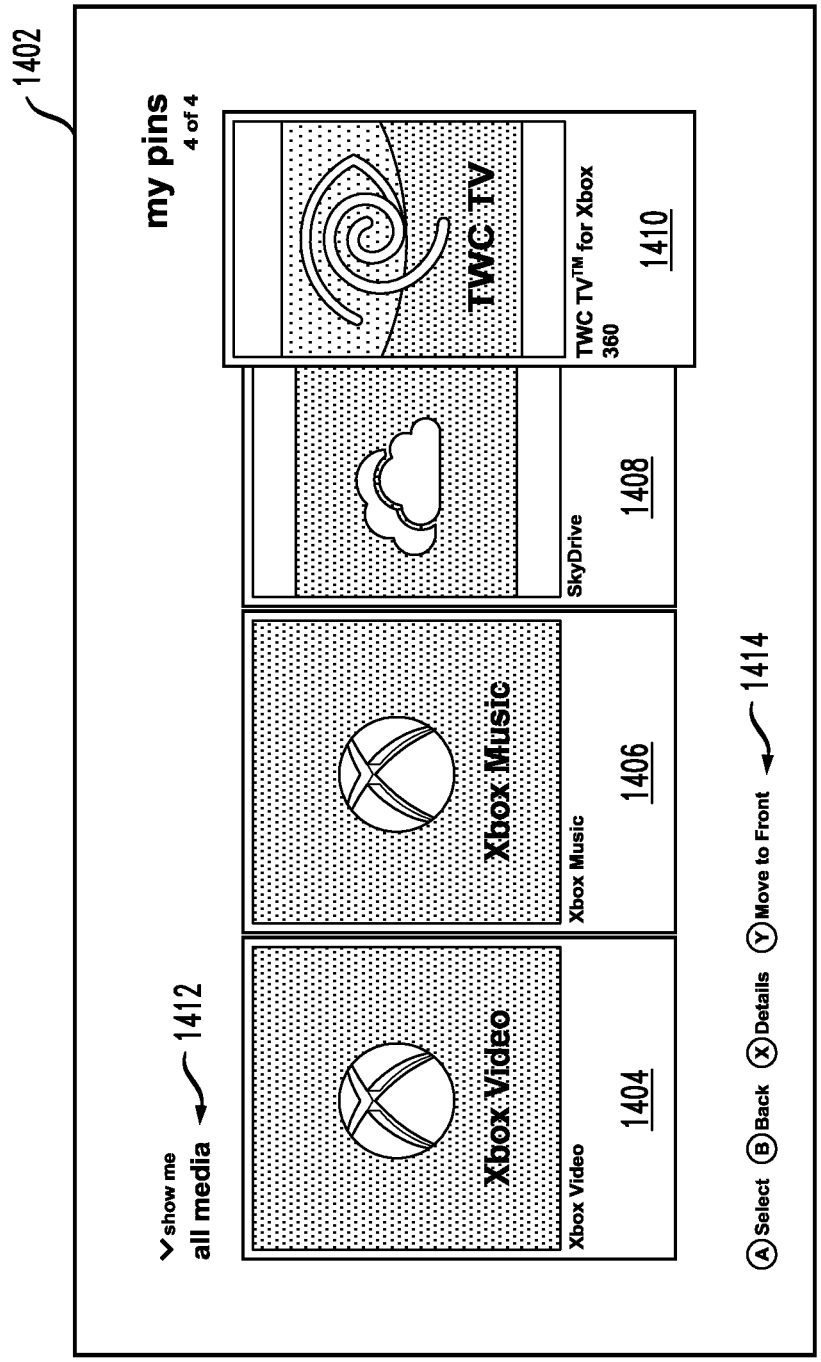
FIGS. 14-24 are line drawing versions of screen shots showing social networking integration, on a gaming console, of the application that permits the watching of IPTV, in accordance with aspects of the invention.
Figure 15:
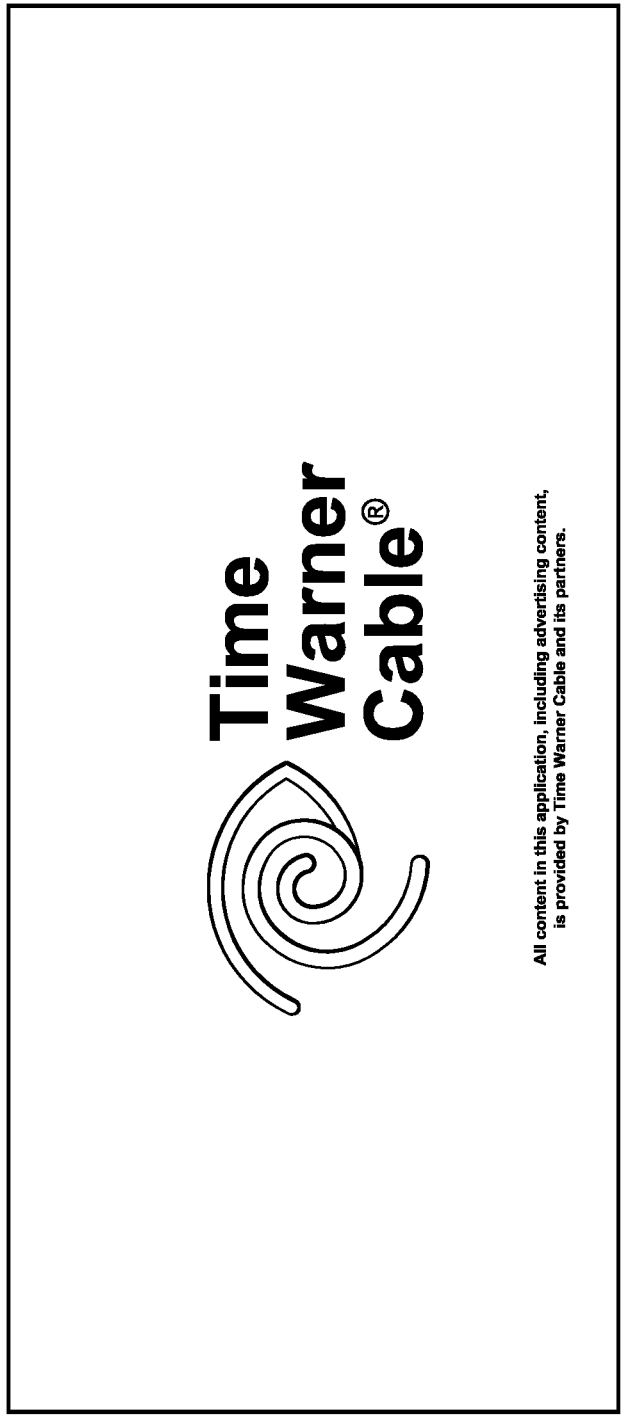

A rich presence string is thus a short blurb of text that describes something about the Gamer's current status or activity. Not only is the Gamer present on the Xbox Live network, rich presence strings provide more information about the Gamer's presence. FIGS. 14-24 are exemplary screen shots of a TWC TV app 953 executing on a console 800 (Microsoft Xbox®) implementing the friends and social networking functionality just described, in connection with the Xbox® LIVE network or similar service. As seen in FIG. 14, at a "my pins" screen 1402 the user can select one of four pins; namely, Xbox® Video 1404, Xbox® Music 1406, SkyDrive 1408 (now known as OneDrive file hosting service, Microsoft Corporation, Redmond, Wash., USA), and TWC TV for Xbox® 1410. As seen at 1412, the gamer is currently viewing "all media." As seen at 1414, the gamer may select A button 908 to select an item; B button 910 to go back up in the menu; X button 912 to obtain details; or Y button 914 to move the item to the front. Suppose the user selects the already highlighted pin 1410 to begin the TWC TV app 953—the resulting screen is shown in FIG. 15.

Figure 16:
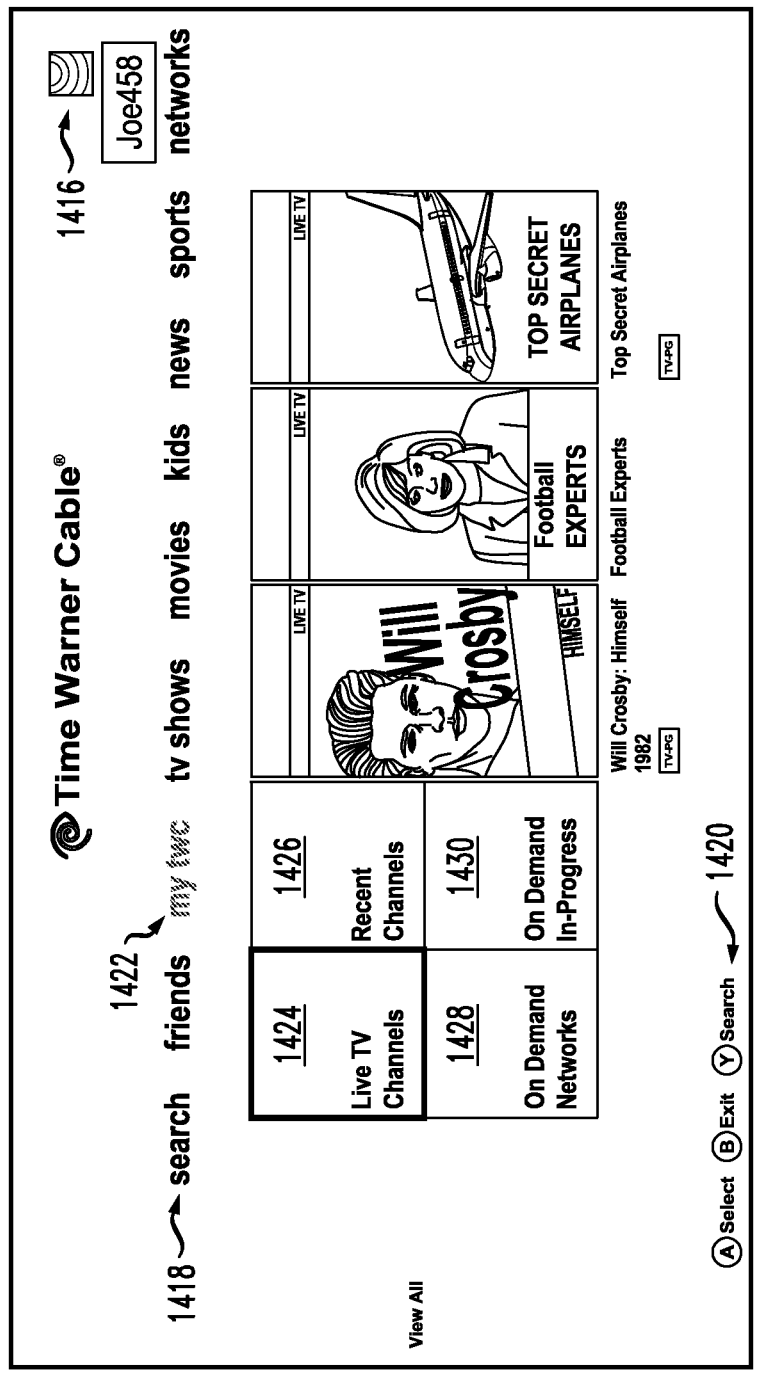

The gamer is then presented with the screen shown in FIG. 16. As seen at 1416, the gamer's screen name "Joe458" is displayed. At 1418, a list of menu items is shown at the top of screen—SEARCH, FRIENDS, MY TWC, TV SHOWS, MOVIES, KIDS, NEWS, SPORTS, NETWORKS, and the like. Currently, "My TWC" 1422 is highlighted which shows the user, at the left, Live TV Channels 1424; Recent Channels 1426; On Demand Networks 1428; and On Demand In-Progress 1430. Focus is currently on Live TV Channels 1424; accordingly, the current Live TV programs are shown on the right, namely, Will Crosby Himself, Football Experts, and Top Secret Airplanes. As seen at 1420, the gamer may select A button 908 to select an item; B button 910 to exit; or Y button 914 to search.

FIG. 28 is an alternative form of home or landing page that can be used in lieu of that of FIG. 16. As seen at the upper right-hand corner, the gamer's screen name "Jane8899" is displayed. A list of menu items is shown at the top of screen—SEARCH, FRIENDS, LIVE TV, TV SHOWS, MOVIES, KIDS, NETWORKS, SETTINGS, VOD PLAY, and the like. Currently, "LIVE TV" is highlighted which shows the user, at the left, LIVE TV CHANNELS; and RECENTLY WATCHED. "TEEN GIANTS!"—the current Live TV program, is shown in the middle. As seen in the lower left-hand corner, the gamer may select A button 908 to select an item; B button 910 to exit; or Y button 914 to search.

Suppose the user moves the focus from the My TWC pivot immediately to the left, to the Friends pivot—the resulting screen is shown in FIG. 17. "Friends" 1432 is highlighted rather than "My TWC" 1422. Two friends are seen to be logged on; namely, Mary987 1434 and John789 1436. John789 is watching Football Experts while Mary987 is watching Peace Fields. Other friends who are not logged on include James234. Each friend may be represented by an avatar. Every gamer may be provided with his or her own custom avatar. If the gamer desires to watch the same show as the given friend, he or she selects the show and is taken to a product page as seen in FIG. 18.

Figure 18:
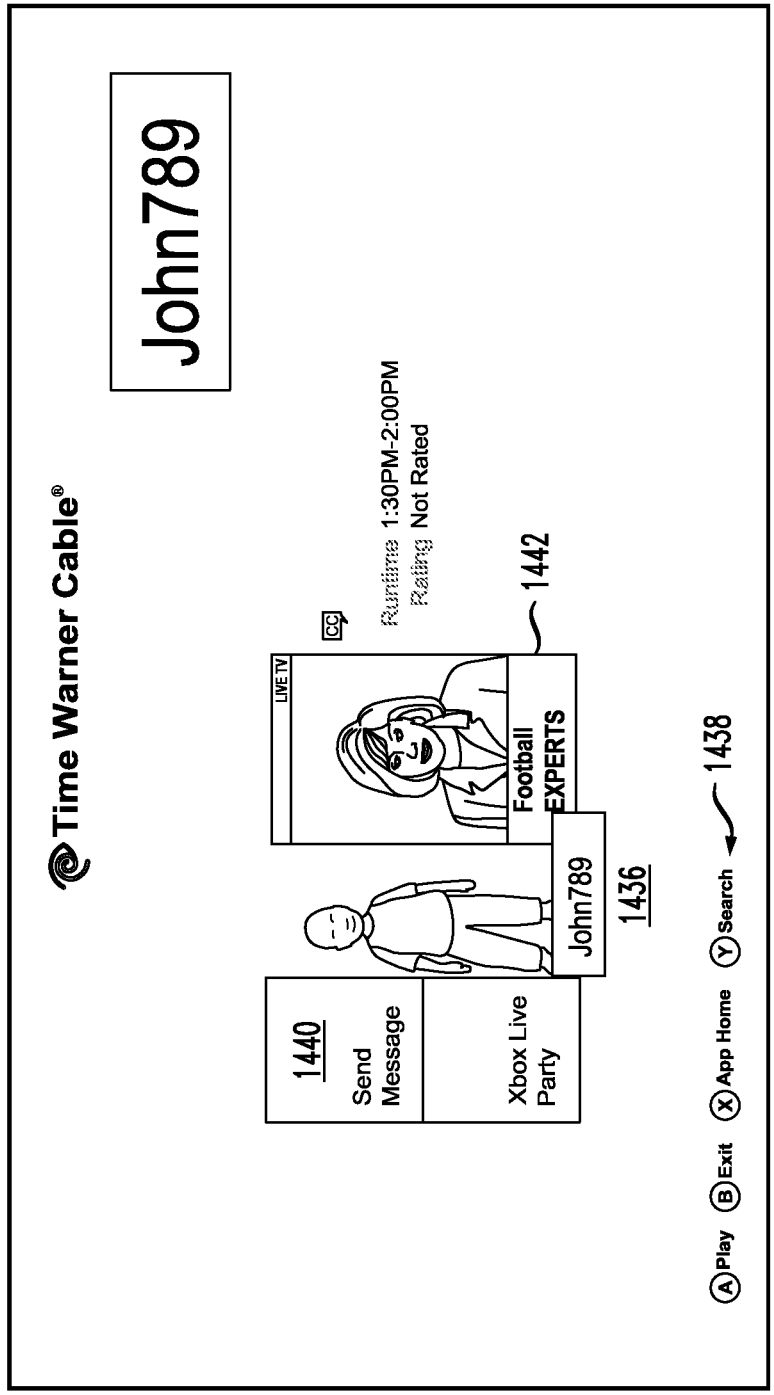
Figure 19:
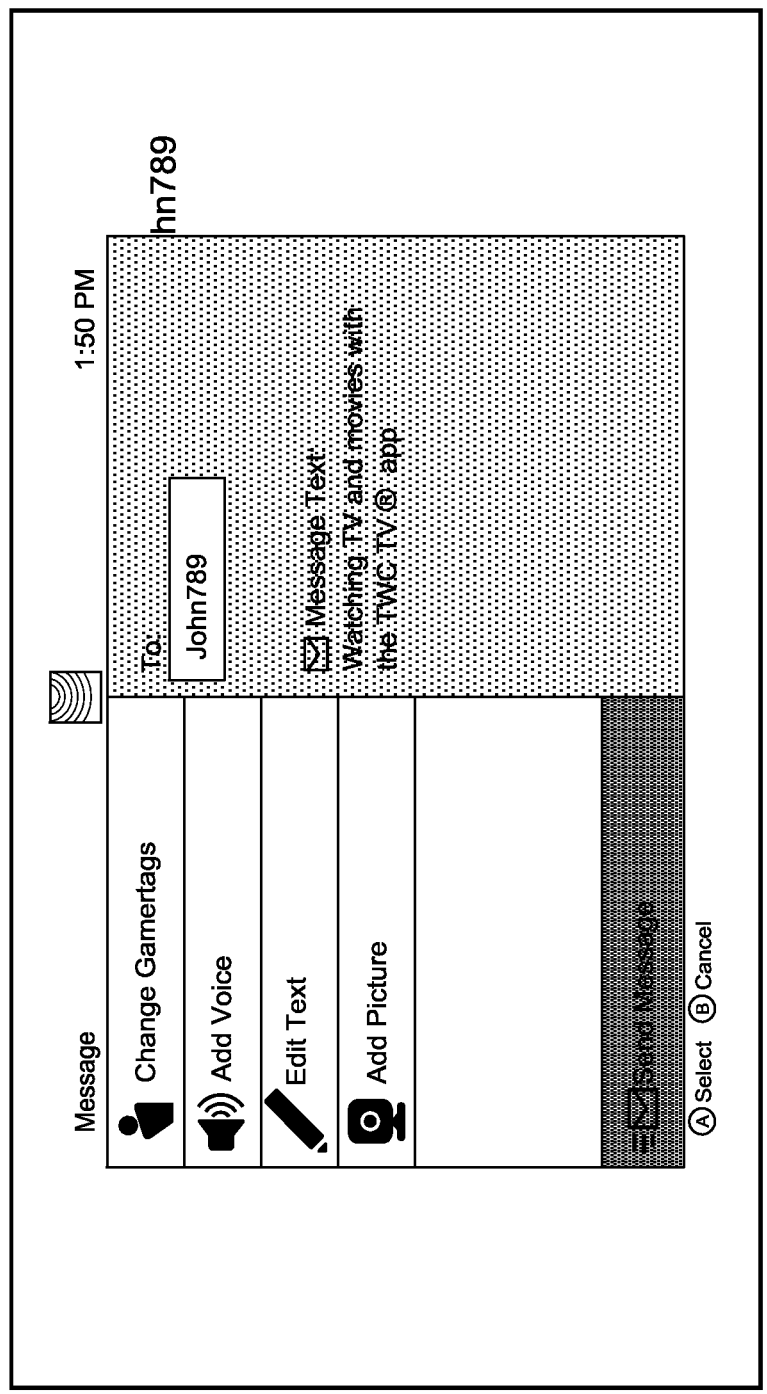

As seen at 1438 in FIG. 18, the gamer may select A button 908 to play an item; B button 910 to go back up in the menu; X button 912 to go to the application home; or Y button 914 to search. The gamer has several options including "Xbox Live Party" and, as seen at 1440, "Send Message." The gamer may choose to send a message to friend John789 and advise John789 that the gamer will also watch the same show. FIG. 19 shows the screen that results when the gamer selects the send message icon 1440 in FIG. 18. Here, the message to be sent is "Watching TV and movies with the TWC TV® app." John789 will receive that message.

Figure 21:
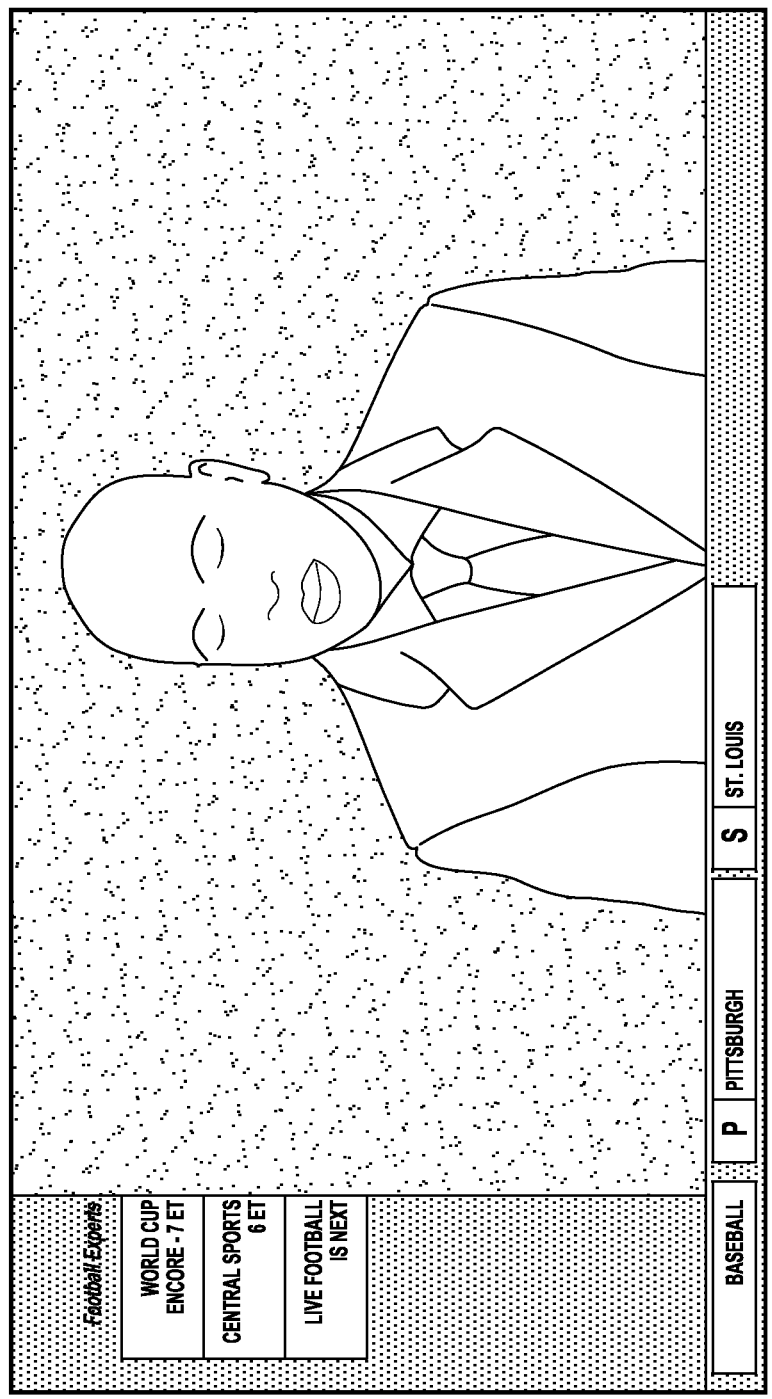

For the gamer to begin watching the same show as John789 (namely, Football Experts), once the message is sent as seen in FIG. 19, the gamer will be back at the screen of FIG. 18 where he or she moves the cursor over the Football Experts box art 1442 using the Xbox controller or the like, and then depresses the A button 908. As seen in FIG. 20, the gamer is then queried as to whether he or she desires to share what he or she is watching. When the gamer assents, his or her friends, such as John789, can see that he or she is also watching the same show. FIG. 21 shows the Football Experts live TV show playing.

Figure 22:
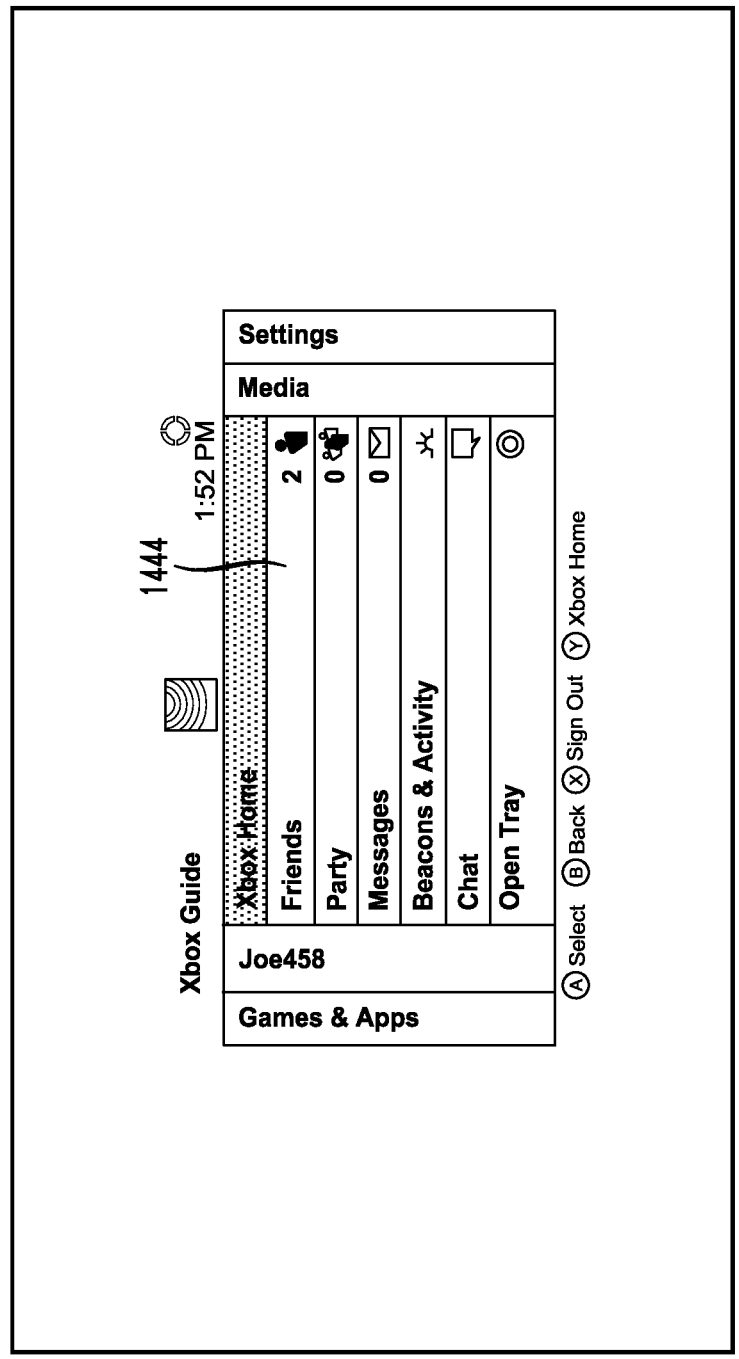
Figure 23:
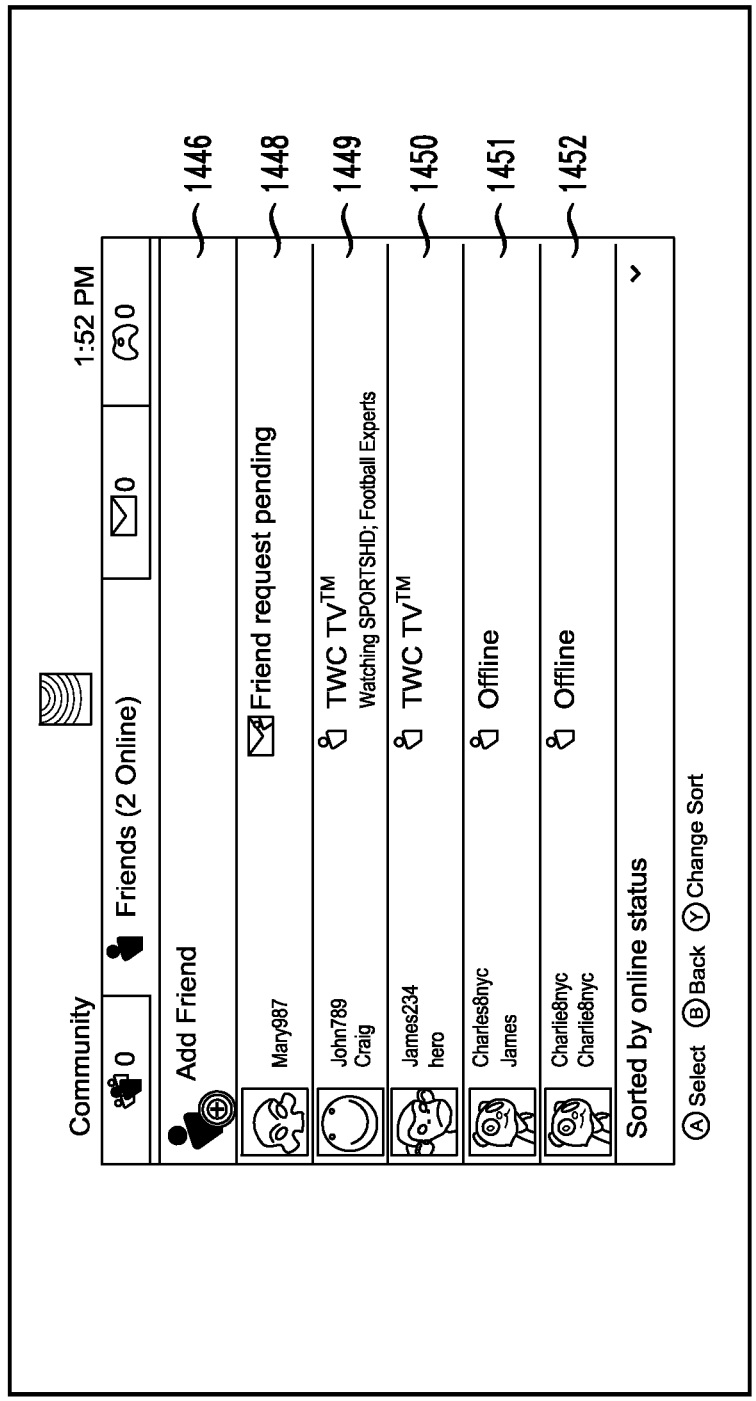
Figure 24:
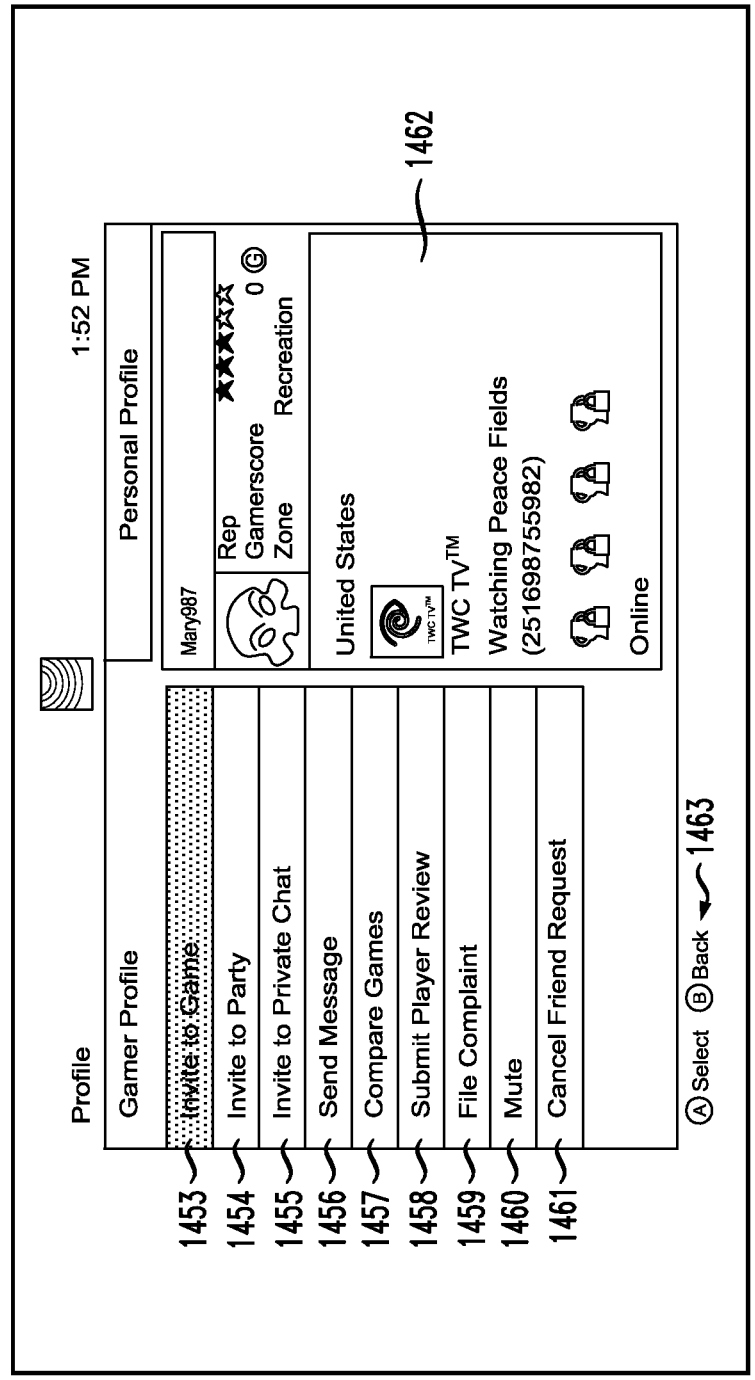

If the gamer desires to chat or interact while the gamer and his or her friend(s) are watching the show together, he or she uses the Xbox® menu button that brings up the main Xbox® menu (guide button 926). The resulting screen is shown in FIG. 22. The gamer selects Friends 1444 and obtains the screen in FIG. 23. As seen at 1446, the gamer is given an option to add a friend. In panel 1448, the status (pending) of friend Mary987 is displayed. In panel 1449, the status of friend John789 is displayed. In panel 1450, the status of friend James234 is displayed. In panel 1451, the status (offline) of friend Charles8nyc is displayed. In panel 1452, the status (offline) of friend Charlie8nyc is displayed. The gamer may select any of the friends and take appropriate actions such as sending John789 another message or sending Mary987 a message to let Mary987 know that the gamer and John789 are also watching TWC TV. FIG. 24 shows a screen that results from selecting Mary987. The current status of Mary987 is shown at 1462. Available actions include inviting to a game 1453; inviting to a party 1454; inviting to a private chat 1455; sending a message 1456; comparing games 1457; submitting a player review 1458; filing a complaint 1459; muting 1460; and cancelling a fried request 1461. As seen at 1463 in FIG. 24, the gamer may select A button 908 to select an item; or B button 910 to go back up in the menu.

Figure 29:
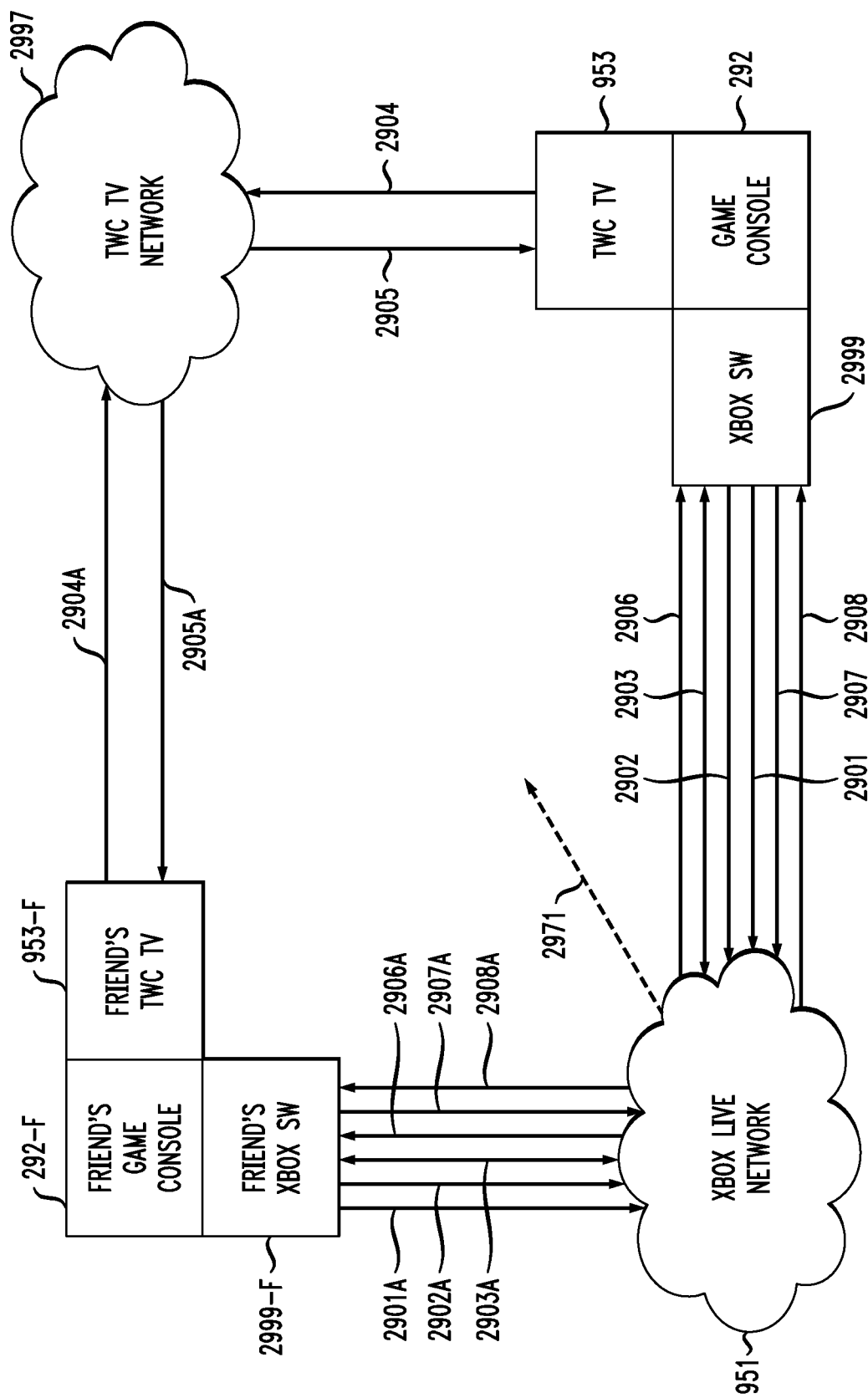
FIG. 29 is an exemplary block diagram, in accordance with an aspect of the invention.

FIG. 29 shows a block diagram which should be viewed in parallel with the sequence diagrams of FIGS. 12 and 13. At 2901, a gamer logs onto Xbox® LIVE network 951 using Xbox® software 2999 on his or her gaming console 292 (e.g., console such as 800). At 2901A, a friend of the gamer logs onto Xbox® LIVE network 951 using Xbox® software 2999-F on his or her gaming console 292-F (e.g., console such as 800). (In at least some embodiments, when gamers on 2999 and 2999-F sign in with Xbox® LIVE network 951, steps 2906 and 2906A take place as discussed below.) At 2902, the gamer enables sharing using Xbox software 2999 on his or her gaming console 292 communicating with network 951. At 2902A, the friend of the gamer enables sharing using Xbox® software 2999-F on his or her gaming console 292-F communicating with network 951. At 2903, the gamer makes friends using Xbox® software 2999 on his or her gaming console 292 communicating with network 951. At 2903A, the friend of the gamer makes friends using Xbox® software 2999-F on his or her gaming console 292-F communicating with network 951. At 2904, the gamer launches the TWC TV application 953 on console 292 and logs on to TWC TV Network 2997 (e.g., a content network of an MSO or the like). At 2905, the gamer watches IPTV using the TWC TV application 953 on console 292. At 2904A, the friend of the gamer launches the TWC TV application 953-F on console 292-F and logs on to TWC TV Network 2997. At 2905A, the friend of the gamer watches IPTV using the TWC TV application 953-F on console 292-F.

At 2906, the gamer obtains a friends list using Xbox® software 2999 on his or her gaming console 292 communicating with network 951. At 2906A, the friend of the gamer obtains a friends list using Xbox® software 2999-F on his or her gaming console 292 communicating with network 951. Furthermore in this regard, when the TWC TV application obtains the "Friends List," it employs an Xbox® Live network API on the Gamer's console. The TWC TV® application explicitly requests the Gamer's friends list from the Xbox® Live API on the game console. Thus, at 2906 the Gamer obtains his or her friends list, while at 2906A the friend obtains the friends list via a reciprocal relationship on the Xbox Live social network.

At 2907, the gamer shares activities using Xbox® software 2999 on his or her gaming console 292 communicating with network 951. At 2907A, the friend of the gamer shares activities using Xbox® software 2999-F on his or her gaming console 292-F communicating with network 951. At 2908, the gamer sees shared activities of his or her friends using Xbox® software 2999 on his or her gaming console 292 communicating with network 951. At 2908A, the friends of the gamer sees shared activities of his or her friends using Xbox® software 2999-F on his or her gaming console 292-F communicating with network 951.

It should be noted that the description just provided is not necessarily in chronological order. In one or more embodiments, when the gamer signs in using Xbox® software 2999, Xbox® LIVE network 951 sends the friends information to the gamer. When TWC TV app 953 is launched with the gamer on console 292 executing software 2999, the friend(s)

of the gamer is/are already residing in the gamer even though TWC TV app 953 is not displaying the friends list yet or bringing up sharing prompt with friends. In those one or more embodiments, similar behavior (timing) will also be noted for the analogous steps for the friend using console 292-F with Xbox® software 2999-F and TWC TV app 953-F. In one or more embodiments, Xbox® LIVE network 951 constantly broadcasts new activities of friends to the gamer (and indeed to other gamers as indicated by the dotted arrow 2971). If the friend(s) have enabled rich presence sharing, then program information regarding what the friend(s) are watching will be sent as well.

Given the discussion thus far, it will be appreciated that, in general terms, an exemplary method, according to an aspect of the invention, includes the step of providing, on a device 292, 800 with an internet protocol network connection, an application 953 that allows a user to watch internet protocol television on the device. A further step 982-985 includes obtaining, by the application, from an online gaming service 951, a list of friends of the user. A still further step 986-989 includes displaying, to the user, via the device, current activities of at least a subset of the friends who are currently online with the online gaming service.

Please note that the device can be a gaming console; the Xbox 360 and Xbox One are non-limiting examples. However, one or more embodiments can be run on other platforms; e.g., the Roku Streaming Player series of digital media player set-top boxes manufactured by Roku, Inc. of Saratoga, Calif., USA, or other media streamers. Throughout the specification, the Xbox 360 and Xbox One are non-limiting examples of gaming consoles, and gaming consoles are non-limiting examples of platforms. Other suitable platforms include the aforementioned Roku series of digital media player set-top boxes or other media streamers. In the claims, a "device" or "platform" is intended to cover any suitable platform (e.g., gaming console, media streamer, or the like), while a recitation of a gaming console is intended to refer specifically to a gaming console and a recitation of a media streamer is intended to refer specifically to a media streamer.

In some cases, the displaying of the current activities includes displaying to the user an indication of a live internet protocol television program currently being watched by a given one of the subset of friends (see, e.g., 990). In some such cases, a further step 991 includes affording the user an opportunity to select the live internet protocol television program for viewing via the device.

In some such cases, a further step includes obtaining, by the application 953, from the user, a selection indicating that the user desires to watch the live internet protocol television program via the device. In such instances, further steps can include, responsive to the selection indicating that the user desires to watch the live internet protocol television program via the device, querying the user whether the user wishes to share with the online gaming service information indicating that the user is watching the live internet protocol television program via the device; and causing the live internet protocol television program to be displayed to the user via the application on the device.

If a negative response to the query is obtained, a further step includes refraining from sharing with the online gaming service the information indicating that the user is watching the live internet protocol television program via the device. If an affirmative response to the query is obtained, a further step 994 includes sharing with the online gaming service 951 the information indicating that the user is watching the live internet protocol television program via the device.

In some cases, an additional step (see, e.g., FIG. 19 and accompanying text) includes affording the user an opportunity to send a message to at least one of the subset of friends via the online gaming service.

Furthermore, given the discussion thus far, it will be appreciated that, in general terms, another exemplary method, according to another aspect of the invention, includes the step of providing, on a device 800 or the like with an internet protocol network connection, an application 953 that allows a user to watch internet protocol television on the device. A further step (see, e.g., FIGS. 32-39 and accompanying text) includes displaying, by the application, while the user is watching a first live internet protocol television program via the application on the device, an accurate current list of second through $N^{th}$ live internet protocol television programs that are available to be watched by the user. In some cases, the displaying includes displaying a strip of boxes 943 horizontally across a screen on which the user is watching the first live internet protocol television program. Each of the boxes correspond to one of the first through $N^{th}$ programs. Of course, where there are many available programs, they may not all be displayed on the screen at the same time; the user may browse left or right, for example, to see additional available programs. Of course, other arrangements could be used, such as a vertical strip of boxes.

As seen in FIG. 32, in some cases, the first through $N^{th}$ programs include all programs currently available to the user. On the other hand, in other cases, a further step includes applying at least one filter criteria to all programs currently available to the user to obtain the first through $N^{th}$ programs (see FIGS. 33-39 and accompanying discussion above). Exemplary filter criteria, as discussed above, include one or more of sports, news, kids, favorites, recent channels, TV shows, and movies.

As noted elsewhere herein, in some instances, the filter criteria are channel-based. In such instances, additional steps include, as at 3028-3030, obtaining and storing, at the device, a list of channels to which the user is entitled; as at 3031-3033, obtaining and storing, at the device, electronic program guide data corresponding to at least the list of channels to which the user is entitled; and obtaining and storing, at the device, a first list of channels corresponding to the first channel-based filter criteria and a second list of channels corresponding to a second channel-based filter criteria. See, e.g., 3034-3035 (sports); 3037-3038 (news); and 3040-3041 (kids). Further steps include constructing a filter for the first channel-based filter criteria by matching the electronic program guide data with the first list of channels; and constructing a filter for the second channel-based filter criteria by matching the electronic program guide data with the second list of channels. See, e.g., 3036 (sports); 3039 (news); and 3042 (kids). The skilled artisan will appreciate that the user can make a selection of which filter is desired (e.g., by scrolling up and down through list 947).

As noted elsewhere herein, in some instances, the filter criteria are content-based. In such instances, additional steps include, as at 3031-3033, obtaining and storing, at the device, electronic program guide data corresponding to at least channels to which the user is entitled; constructing a filter for the first content-based filter criteria based on first identifiers in the electronic program guide data; and constructing a filter for a second content-based filter criteria based on second identifiers in the electronic program guide data. Examples of filter construction are at 3067-3068 (TV Shows) and 3069-3070 (Movies).

Furthermore, given the discussion thus far, it will be appreciated that, in general terms, still another exemplary method, according to still another aspect of the invention, includes the step of providing, on a device 800 or the like with an internet protocol network connection, an application 953 that allows a user to watch internet protocol television on the device. As seen in FIG. 11, a further step includes displaying, by the application, while the user is watching a first video-on-demand internet protocol television program 950 via the application on the device, an accurate current list (left-hand side of figure) of a plurality of internet protocol television video-on-demand programs that are available to be watched by the user. The first internet protocol television program is an episode of a series. The plurality of internet protocol television video-on-demand programs that are available to be watched include additional episodes of the series. In at least some cases, the list includes the episode that is currently being watched, and the list shows only other available episodes of the series.

In a non-limiting example, as in FIG. 11, the displaying includes displaying a strip of boxes vertically on a screen (e.g., on the left-hand edge thereof) on which the user is watching the first internet protocol television program; each of the boxes corresponds to one of the plurality of internet protocol television video-on-demand programs that are available to be watched by the user.

In at least some cases, additional steps include, as at 3005-3007, obtaining and storing in memory, at the device, video-on-demand catalog data; and, as at 3012, during playback of the first video-on-demand internet protocol television program, retrieving, from the memory, stored video-on-demand catalog data from additional episodes of the series. A further step 3013 includes displaying, on a screen associated with the device, while the first video-on-demand internet protocol television program is playing on the screen, an overlay, based on the stored video-on-demand catalog data from the additional episodes of the series; the overlay permits user selection of any given one of the additional episodes of the series for viewing.

In at least some such cases, further steps include, responsive to a user selection 3018 from the overlay: ceasing playing, on the screen associated with the device, the first video-on-demand internet protocol television program; and playing, on the screen associated with the device, one of the additional episodes corresponding to the user selection from the overlay, as at 3019.

Any of the methods described herein can be combined as desired. For example, the method depicted in FIG. 31 can be combined with the method of FIG. 30, the method of FIGS. 12 and 13, or both.

In another aspect, an exemplary_device (e.g., 800) includes an internet protocol network connection (e.g., Ethernet port); a memory 806 including executable code; and at least one processor (e.g., 802, 804), coupled to the memory and the internet protocol network connection. The executable code implements an application (e.g., 953) that allows a user to watch internet protocol television on the device. The at least one processor is operable to implement any one, some, or all of the method steps described herein. Note that references to "display" or "displaying," including in the claims, are not to be construed to require the presence of a display unless specifically claimed; the device 800 typically works with an external display and references to "display" or "displaying" include the cat of sending appropriate signals to the video out port from chip 810 or the like.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus (e.g., server, personal computer, gaming console) including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors (e.g., on apparatus of FIG. 8), or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
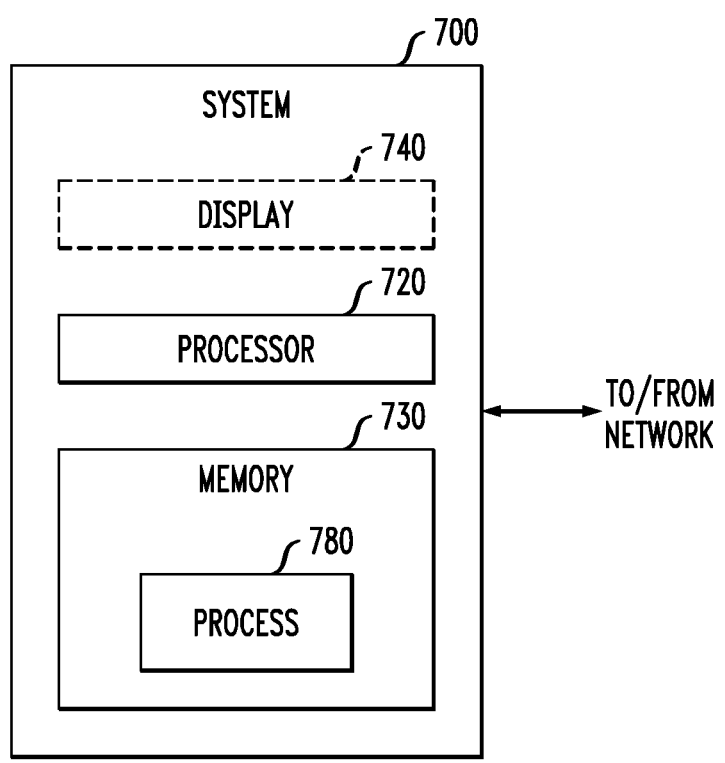
FIG. 7 is a block diagram of a computer system useful in connection with one or more aspects of the invention.

FIG. 7 is a block diagram of a system 700 that can implement at least some aspects of the invention, and is representative, for example, of one or more of the servers or personal computers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC (application specific integrated circuit) or FPGA (field programmable gate array) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700, console 800, or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, for example, on a gaming console; a personal computer; or a virtualized or non-virtualized hardware server implementing one or more of the blocks/sub-blocks 951, 953, 955, 975, 977, 979, 3001, 3002, 3027 and the like, and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement blocks/sub-blocks 951, 953, 955, 975, 977, 979, 3001, 3002, 3027). The method steps can then be carried out using the distinct software modules of the system, as described above, executing on one or more hardware processors (e.g., one or more hardware processors of a gaming console; a personal computer; or a server) and utilizing intermediate network links and network nodes. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
providing, on a game console with an internet protocol network connection, a television application that allows a user to watch internet protocol television via said game console, said internet protocol television being obtained by said television application from a video content network, said game console also having gaming software in communication with an online gaming service;
displaying, on a display associated with said game console by said television application, a first live internet protocol television program obtained by said television application from said video content network;
obtaining, by said gaming software, from said online gaming service, a list of friends of said user together with rich presence strings defining current activities of said friends of said users;
obtaining, by said television application, from said gaming software, said list of friends of said user together with said rich presence strings, via a gaming software application program interface on said game console;
displaying, on a display associated with said game console by said television application, simultaneously with said first live internet protocol television program, a picture-in-picture indication, based on a corresponding one of said rich presence strings, of a second live internet protocol television program currently being watched by a friend selected from said list of friends; and
affording to said user via said game console an opportunity to select said second live internet protocol television program for viewing via said game console.

2. The method of claim 1, further comprising:
obtaining, by said television application, from said user, a selection indicating that said user desires to watch said second live internet protocol television program via said game console.

3. The method of claim 2, further comprising:
responsive to said selection indicating that said user desires to watch said second live internet protocol television program via said game console, querying said user whether said user wishes to share with said online gaming service information indicating that said user is watching said second live internet protocol television program via said game console; and causing said second live internet protocol television program to be displayed to said user via said television application on said game console.

4. The method of claim 3, further comprising:

obtaining a negative response to said query; and refraining from sharing with said online gaming service said information indicating that said user is watching said second live internet protocol television program via said game console.

5. The method of claim 3, further comprising:

obtaining an affirmative response to said query; and sharing with said online gaming service, as a rich presence string of said user, said information indicating that said user is watching said second live internet protocol television program via said game console.

6. The method of claim 1, further comprising affording said user an opportunity to send a message to at least one of said friends via said online gaming service.

* * * * *